US012545728B2

United States Patent
Dooley et al.

(10) Patent No.: US 12,545,728 B2
(45) Date of Patent: Feb. 10, 2026

(54) TREATMENT OF CANCER METASTASIS BY TARGETING EXOSOME PROTEINS

(71) Applicant: LONZA SALES AG, Basel (CH)

(72) Inventors: Kevin P. Dooley, Boston, MA (US); Douglas E. Williams, Boston, MA (US)

(73) Assignee: LONZA SALES AG, Basel (CH)

( * ) Notice: Subject to any disclaimer, the term of this patent is extended or adjusted under 35 U.S.C. 154(b) by 1105 days.

(21) Appl. No.: 17/428,567

(22) PCT Filed: Feb. 4, 2020

(86) PCT No.: PCT/US2020/016625
§ 371 (c)(1),
(2) Date: Aug. 4, 2021

(87) PCT Pub. No.: WO2020/163366
PCT Pub. Date: Aug. 13, 2020

(65) Prior Publication Data
US 2022/0144942 A1    May 12, 2022

Related U.S. Application Data

(60) Provisional application No. 62/800,930, filed on Feb. 4, 2019.

(51) Int. Cl.
*C07K 16/28*    (2006.01)
*A61K 39/00*    (2006.01)
*A61P 35/04*    (2006.01)

(52) U.S. Cl.
CPC .......... *C07K 16/2803* (2013.01); *A61P 35/04* (2018.01); *A61K 2039/505* (2013.01); *C07K 2317/92* (2013.01)

(58) Field of Classification Search
CPC ............ C07K 16/2803; C07K 2317/92; C07K 2317/73; C07K 2317/77; A61P 35/04; A61K 2039/505; A61K 38/177
See application file for complete search history.

(56) References Cited

U.S. PATENT DOCUMENTS 5,011,912 A    4/1991    Hopp et al.
10,195,290 B1    2/2019    Dooley et al.

FOREIGN PATENT DOCUMENTS

WO    2016/172226 A1    10/2016
WO    2019/040920 A1    2/2019
WO    2019183578 A1    9/2019

OTHER PUBLICATIONS

Dooley et al., engEx™: A novel exosome engineering platform enabling targeted transfer of pharmacological molecules, Codiak poster 2150, Presented at the Annual Meeting of the American Association for Cancer Research . Apr. 1, 2019.*
Duijvesz et al., The Prostate, 79:1032-1042, (Year: 2019).*
Xu et al., Methods, 87:11-25, (Year: 2015).*
International Search Report and Written Opinion for Application No. PCT/US2020/016625, European Patent Office, mailed on Jun. 25, 2020.
Nishida-Aoki et al., "Disruption of Circulating Extracellular Vesicles as a Novel Therapeutic Strategy Against Cancer Metastasis", Molecular Therapy 25(1):181-191 (2017).
Murayama et al., "Novel CD9-targeted therapies in gastric cancer," World Journal of Gastroenterology 21(11):3206-3213 (2015).
Akiyama et al., "The F-prostaglandin receptor is a novel marker for tumor endothelial cells in renal cell carcinoma: PTGF receptor in tumor endothelial cells," Pathology International 63(1):37-44 (2013).
Vidal-Laliena et al., "Characterization of antibodies submitted to the B cell section of the 8th Human Leukocyte Differentiation Antigens Workshop by flow cytometry and immunohistochemistry," Cellular Immunology, 236(1-2):6-16 (2005).
Hopp et al., " A Short Polypeptide Marker Sequence Useful for Recombinant Protein Identification and Purification," Nature Biotechnology 6:1204-1210 (1988).

* cited by examiner

*Primary Examiner* — Kimberly Ballard
*Assistant Examiner* — Stacey N Macfarlane
(74) *Attorney, Agent, or Firm* — MEDLER FERRO WOODHOUSE & MILLS PLLC

(57) ABSTRACT

The present disclosure provides a therapeutic method of treating cancer metastasis by inducing clearance of EVs using a binding agent specific to an EV protein. The method utilizes one or more binding agents specific to EV proteins, where the EV proteins are selected from prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); a class of ATP transporter proteins (ATP1A1, ATP1A2, ATP1A3, ATP1A4, ATP1B3, ATP2B1, ATP2B2, ATP2B3, ATP2B4); CD13 (aminopeptidase N); MME (neprilysin), ENPP1 (ectonucleotide pyrophosphatase/phosphodiesterase family member 1); and NRP1 (neuropilin-1). Further provided herein includes a pharmaceutical composition for the treatment of cancer metastasis.

Figure 1:
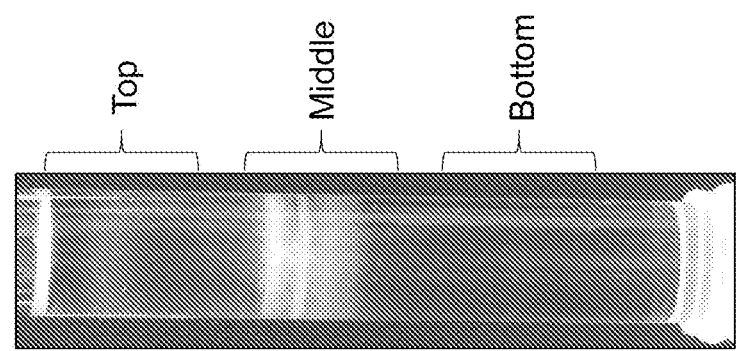

17 Claims, 17 Drawing Sheets
Specification includes a Sequence Listing.

Figure 3

PTGFRN (Q9P2B2)

```
                    1        11         21         31         41         51         61         71         81         91
Modifications                         C        D  D                C                     D   C      D  D
Q9P2B2          1   MGRLASPFLL LALLSLALCR GRVPUPDPET LURVVGTELV IPCNVSDYDG PSRQMFDWSF SSLGSSFVEL ASTMRVGFPA QLYQRRIQRG KILLRETRNP Modifications                                               C                                 D
Q9P2B2        101   AVLHIKRVQ PSDQGHYKCS TSTDRAVDGC NYKHTVQHKV LDSLRVGPS AKPPPSSLSR EGKFELKCT ANSASPLMTH LALLWVHNG FARRSVRALT Modifications                                                      D   C            D   D
Q9P2B2        201   MEGREHPGLG YEQRYTSGHV RLHTVCSHNY PLTUSRALSR DGCSTRTIUS EKIARQCRWQ RIQHKAVEVA TVVIQPSVLR AAVPKNVSVA RGKHLDLTCN Modifications                 Q
Q9P2B2        301   ITTDRADHVR PEVTWSRSRM PBSTLDGSRV LARDRDSLV THRRSYHLIV RDVSKENSGY YYCHVSLMAP GHNPSMHKVA RAVSSPAGVC Modifications                        C                              D                                                    C
Q9P2B2        401   VTWLRPDYQV YLMASKVPCH RDPPTELACR VVDIRSGEAN VDFTVSWTYR HMRESRNVTT SELLAVDGED WTLKTGERSK QRQDGNYIS SKHTDTENE Modifications                  C                            O                                  C
Q9P2B2        501   RIQRTTEEDR GNYYCTVSAV TKQRMNSWVK SHEVTSKPRN IVVALEHSVL VVKAHQPEPE FARGNTFEET CKVSSEMIKS PRYSVLIMAL KPVGDLSSPN Modifications                                            C
Q9P2B2        601   ETKYIISLNQ BSTVKLENVT DASPVNCTVL EKVQREEEYV RMYQTQFSDA GLNTRMTVRW SPVRGSLVRR KGIVTTSPR DRKSRLSIER USVLRRLLQV
                                                                                                                        C
Q9P2B2        701                                                                                       MCSEDUQHEN YYCSVTPVUK Modifications
Q9P2B2        801   SPTGSWQKRA RINSKPVRIT VRMDVLMAFK YPLLIGVGLS TVIGLLSCLI GYCSSHWCCK KEVQGTRPRR RRLMSHRHD
```

Modifications
C: Carbamidomethyl (C)
D: Deamidated (Q, N)
O: Oxidation (M)

Figure 4

IGSF8 (Q969P0)

| | | 1 | 11 | 21 | 31 | 41 | 51 | 61 | 71 | 81 |
|---|---|---|---|---|---|---|---|---|---|---|
| Modifications | | | | | | | | | | |
| Q969P0 | 1 | MGALRPTLLP | PSLPLLLLLM | LCMGCWAEHV | LVPEGPLIYRV | AGTAVSISCN | VTGYEGPAQQ | NFRWFLYRPE | APDTALGIVS | TKDTQFSYAV |
| Modifications | | | | | | | | C | | |
| Q969P0 | 91 | EKSPVVAGEV | QVQRLQEGDAV | VLNIAPLQRQ | DAGIYECRTP | STDTKYLGSY | SGKVELKVLP | DVLQVSAAPP | GPRGRQAPTS | PPRMTVHEGQ |
| Modifications | | | | C | | D | | | | |
| Q969P0 | 181 | ELHLECIART | STQKHTHLAV | SFGRSVPRAP | VGRSTIQEVV | GIRSDLAVEA | GAPYAERLAR | GHIRLCKEGT | DRYRMVVGGA | QAGDAGTYHC |
| Modifications | | | | D | | D | | | | |
| Q969P0 | 271 | TAARWIQPDP | GSWAQIAEKE | AVLHHDPFGT | LSSQLAVTVG | PGEERRIGPGE | PLRLLCNVSG | ALPAGEPHAA | YSVGWEMAPA | GAPGEPELHR |
| Modifications | | D | | | | | C | | | |
| Q969P0 | 361 | QLDTEGWGSL | GPGCEGRHIA | MRKVASRTYR | LRLHHDPGGE | AGTYRCLAKA | YVRGSGTRLR | BAASARSPRL | PVHVREGVT | LEAVRHLAGG |
| Modifications | | | | | | | | | | |
| Q969P0 | 451 | TVVRGHTASL | LCNISVRGGP | PGLRLAASMW | VRPEDGRLS | SVPAQLVGGV | GQDGVARLCV | RPCGGPVSVE | LVGPRSHELR | LHSLGPEDEC |
| Modifications | | | | | | | | | | |
| Q969P0 | 541 | VYHCAPSAWV | QHADYSWYQA | GSARSGPVTV | YPYMHALDTL | FVPLLVGTGV | ALVTGATVLG | TITCCFMKRL | RKR | |

Modifications
C: Carbamidomethyl (C)
D: Deamidated (Q)

Figure 5

BSG (P35613)

```
                  1          11         21         31         41         51         61         71         81         91
                  |          |          |          |          |          |          |          |          |          |
          1   MAAALFVLLG FALLGTHGAS GAAGFVQAPL SQQRMVGGSV ELHCEAVGSP VPEIQWWFEG QGPNDTCSQL WDGARLRVH  IHATYHQHAA STISIDTLVE
                                                                              C                               D
        101   EDTGTYECRA SNDPDENHLT RAPRVKWVRA QAVVLVLEPG TVFTTVEDLG SKILTCSLN  DSRTPTTCHR VLKGGVVLKE DRLPGQKTEF KVDSDDQRGE
              C        O                                                                                         D
                                                                                C      O     D
        201   YSCVFLPEPM GTANIQLHGP PRVKAVKSSE HINEGETAML VCKSESVPPV TDWAWYKITD SEDKALMNGS ESRFFVSSSQ GRSELHIENL NMEADPGQYR
                                                     D                   D                                             O
        301   CNGTSSKGSD QAIITVRVRS HLAALWPFLG IVAEVLVLVT IIAIYEKRRK PEDVLDDDDA GSAPLKSSGQ HQNDKGKNVR QRNSS
```

Modifications

C: Carbamidomethyl (C)
D: Deamidated (N, Q)
O: Oxidation (M)

Figure 9

No. of Peptide Spectrum Matches (PSMs)

| Gene Name | HEK | HT1080 | K562 | MB231 | Raji | NSC* |
|---|---|---|---|---|---|---|
| PTGFRN | 197 | 151 | 37 | 0 | 0 | 111 |
| IGSF8 | 61 | 19 | 31 | 5 | 10 | 52 |
| IGSF3 | 5 | 3 | 14 | 0 | 0 | 0 |
| BSG | 91 | 60 | 62 | 24 | 48 | 82 |
| SLC3A2 | 163 | 117 | 59 | 117 | 95 | 35 |
| ITGB1 | 74 | 400 | 82 | 252 | 95 | 319 |
| CD81 | 34 | 21 | 2 | 9 | 9 | 48 |
| CD9 | 21 | 6 | 0 | 31 | 0 | 41 |

*Performed in a separate experiment

SEQUENCE LISTING

<160> NUMBER OF SEQ ID NOS: 12

<210> SEQ ID NO 1

```
<211> LENGTH: 879
<212> TYPE: PRT
<213> ORGANISM: Artificial sequence
<220> FEATURE:
<223> OTHER INFORMATION: The PTGFRN Protein

<400> SEQUENCE: 1
```

| | | | | | | | | | | | | | | |
|---|---|---|---|---|---|---|---|---|---|---|---|---|---|---|
| Met | Gly | Arg | Leu | Ala | Ser | Arg | Pro | Leu | Leu | Ala | Leu | Leu | Ser | Leu |
| 1 | | | | 5 | | | | | 10 | | | | | 15 |
| Ala | Leu | Cys | Arg | Gly | Arg | Val | Val | Arg | Val | Pro | Thr | Ala | Thr | Leu | Val |
| | | | 20 | | | | 25 | | | | | 30 | | |
| Arg | Val | Val | Gly | Thr | Glu | Leu | Val | Ile | Pro | Cys | Asn | Val | Ser | Asp | Tyr |
| | | 35 | | | | | 40 | | | | | 45 | | |
| Asp | Gly | Pro | Ser | Glu | Gln | Asn | Phe | Asp | Trp | Ser | Phe | Ser | Ser | Leu | Gly |
| | 50 | | | | | 55 | | | | | 60 | | | |
| Ser | Ser | Phe | Val | Glu | Leu | Ala | Ser | Thr | Trp | Glu | Val | Gly | Phe | Pro | Ala |
| 65 | | | | | 70 | | | | | 75 | | | | | 80 |
| Gln | Leu | Tyr | Gln | Glu | Arg | Leu | Gln | Arg | Gly | Glu | Ile | Leu | Leu | Arg | Arg |
| | | | | 85 | | | | | 90 | | | | | 95 |
| Thr | Ala | Asn | Asp | Ala | Val | Glu | Leu | His | Ile | Lys | Asn | Val | Gln | Pro | Ser |
| | | | 100 | | | | | 105 | | | | | 110 | | |
| Asp | Gln | Gly | His | Tyr | Lys | Cys | Ser | Thr | Pro | Ser | Thr | Asp | Ala | Thr | Val |
| | | 115 | | | | | 120 | | | | | 125 | | |
| Gln | Gly | Asn | Tyr | Glu | Asp | Thr | Val | Gln | Val | Lys | Val | Leu | Ala | Asp | Ser |
| | 130 | | | | | 135 | | | | | 140 | | | |
| Leu | His | Val | Gly | Pro | Ser | Ala | Arg | Pro | Pro | Pro | Ser | Leu | Ser | Leu | Arg |
| 145 | | | | | 150 | | | | | 155 | | | | | 160 |
| Glu | Gly | Glu | Pro | Phe | Glu | Leu | Arg | Cys | Thr | Ala | Ala | Ser | Ala | Ser | Pro |
| | | | | 165 | | | | | 170 | | | | | 175 |
| Leu | His | Thr | His | Leu | Ala | Leu | Leu | Trp | Glu | Val | His | Arg | Gly | Pro | Ala |
| | | | 180 | | | | | 185 | | | | | 190 | | |
| Arg | Arg | Ser | Val | Leu | Ala | Leu | Thr | His | Glu | Gly | Arg | Phe | His | Pro | Gly |
| | | 195 | | | | | 200 | | | | | 205 | | |
| Leu | Gly | Tyr | Glu | Gln | Arg | Tyr | His | Ser | Gly | Asp | Val | Arg | Leu | Asp | Thr |
| | 210 | | | | | 215 | | | | | 220 | | | |
| Val | Gly | Ser | Asp | Ala | Tyr | Arg | Leu | Ser | Val | Ser | Arg | Ala | Leu | Ser | Ala |
| 225 | | | | | 230 | | | | | 235 | | | | | 240 |
| Asp | Gln | Gly | Ser | Tyr | Arg | Cys | Ile | Val | Ser | Glu | Trp | Ile | Ala | Glu | Gln |
| | | | | 245 | | | | | 250 | | | | | 255 |
| Gly | Asn | Trp | Gln | Glu | Ile | Gln | Glu | Lys | Ala | Val | Glu | Val | Ala | Thr | Val |
| | | | 260 | | | | | 265 | | | | | 270 | | |
| Val | Ile | Gln | Pro | Ser | Val | Leu | Arg | Ala | Ala | Val | Pro | Lys | Asn | Val | Ser |
| | | 275 | | | | | 280 | | | | | 285 | | |
| Val | Ala | Glu | Gly | Lys | Glu | Leu | Asp | Leu | Thr | Cys | Asn | Ile | Thr | Thr | Asp |
| | 290 | | | | | 295 | | | | | 300 | | | |
| Arg | Ala | Asp | Asp | Val | Arg | Pro | Glu | Val | Thr | Trp | Ser | Phe | Ser | Arg | Met |
| 305 | | | | | 310 | | | | | 315 | | | | | 320 |
| Pro | Asp | Ser | Thr | Leu | Pro | Gly | Ser | Arg | Val | Leu | Ala | Arg | Leu | Asp | Arg |
| | | | | 325 | | | | | 330 | | | | | 335 |
| Asp | Ser | Leu | Val | His | Ser | Ser | Pro | His | Val | Ala | Leu | Ser | His | Val | Asp |
| | | | 340 | | | | | 345 | | | | | 350 | | |
| Ala | Arg | Ser | Tyr | His | Leu | Leu | Val | Arg | Asp | Val | Ser | Lys | Glu | Asn | Ser |
| | | 355 | | | | | 360 | | | | | 365 | | |
| Gly | Tyr | Tyr | Tyr | Cys | His | Val | Ser | Leu | Trp | Ala | Pro | Gly | His | Asn | Arg |
| | 370 | | | | | 375 | | | | | 380 | | | |

```
Ser Trp His Lys Val Ala Glu Ala Val Ser Ser Pro Ala Gly Val Gly
385                 390                 395                 400

Val Thr Trp Leu Glu Pro Asp Tyr Gln Val Tyr Leu Asn Ala Ser Lys
            405                 410                 415

Val Pro Gly Phe Ala Asp Asp Pro Thr Glu Leu Ala Cys Arg Val Val
        420                 425                 430

Asp Thr Lys Ser Gly Glu Ala Asn Val Arg Phe Thr Val Ser Trp Tyr
    435                 440                 445

Tyr Arg Met Asn Arg Arg Ser Asp Asn Val Val Thr Ser Glu Leu Leu
        450                 455                 460

Ala Val Met Asp Gly Asp Trp Thr Leu Lys Tyr Gly Glu Arg Ser Lys
465                 470                 475                 480

Gln Arg Ala Gln Asp Gly Asp Phe Ile Phe Ser Lys Glu His Thr Asp
                485                 490                 495

Thr Phe Asn Phe Arg Ile Gln Arg Thr Thr Glu Glu Asp Arg Gly Asn
            500                 505                 510

Tyr Tyr Cys Val Val Ser Ala Trp Thr Lys Gln Arg Asn Asn Ser Trp
        515                 520                 525

Val Lys Ser Lys Asp Val Phe Ser Lys Pro Val Asn Ile Phe Trp Ala
    530                 535                 540

Leu Glu Asp Ser Val Leu Val Lys Ala Arg Gln Pro Lys Pro Phe
545                 550                 555                 560

Phe Ala Ala Gly Asn Thr Phe Glu Met Thr Cys Lys Val Ser Ser Lys
                565                 570                 575

Asn Ile Lys Ser Pro Arg Tyr Ser Val Leu Ile Met Ala Glu Lys Pro
            580                 585                 590

Val Gly Asp Leu Ser Ser Pro Asn Glu Thr Lys Tyr Ile Ile Ser Leu
        595                 600                 605

Asp Gln Asp Ser Val Val Lys Leu Glu Asn Trp Thr Asp Ala Ser Arg
    610                 615                 620

Val Asp Gly Val Val Leu Glu Lys Val Gln Glu Asp Glu Phe Arg Tyr
625                 630                 635                 640

Arg Met Tyr Gln Thr Gln Val Ser Asp Ala Gly Leu Tyr Arg Cys Met
                645                 650                 655

Val Thr Ala Trp Ser Pro Val Arg Gly Ser Leu Trp Arg Glu Ala Ala
            660                 665                 670

Thr Ser Leu Ser Asn Pro Ile Glu Ile Asp Phe Gln Thr Ser Gly Pro
        675                 680                 685

Ile Phe Asn Ala Ser Val His Ser Asp Thr Pro Ser Val Ile Arg Gly
    690                 695                 700

Asp Leu Ile Lys Leu Phe Cys Ile Ile Thr Val Glu Gly Ala Ala Leu
705                 710                 715                 720

Asp Pro Asp Asp Met Ala Phe Asp Val Ser Trp Phe Ala Val His Ser
                725                 730                 735

Phe Gly Leu Asp Lys Ala Pro Val Leu Leu Ser Ser Leu Asp Arg Lys
            740                 745                 750

Gly Ile Val Thr Thr Ser Arg Arg Asp Trp Lys Ser Asp Leu Ser Leu
        755                 760                 765

Glu Arg Val Ser Val Leu Glu Phe Leu Leu Gln Val His Gly Ser Glu
    770                 775                 780

Asp Gln Asp Phe Gly Asn Tyr Tyr Cys Ser Val Thr Pro Trp Val Lys
785                 790                 795                 800
```

Ser Pro Thr Gly Ser Trp Gln Lys Glu Ala Glu Ile His Ser Lys Pro
                805                 810                 815

Val Phe Ile Thr Val Lys Met Asp Val Leu Asn Ala Phe Lys Tyr Pro
            820                 825                 830

Leu Leu Ile Gly Val Gly Leu Ser Thr Val Ile Gly Leu Leu Ser Cys
            835                 840                 845

Leu Ile Gly Tyr Cys Ser Ser His Trp Cys Cys Lys Lys Glu Val Gln
        850                 855                 860

Glu Thr Arg Arg Glu Arg Arg Arg Leu Met Ser Met Glu Met Asp
865                 870                 875

<210> SEQ ID NO 2
<211> LENGTH: 385
<212> TYPE: PRT
<213> ORGANISM: Artificial sequence
<220> FEATURE:
<223> OTHER INFORMATION: The BSG protein

<400> SEQUENCE: 2

Met Ala Ala Ala Leu Phe Val Leu Leu Gly Phe Ala Leu Leu Gly Thr
1               5                   10                  15

His Gly Ala Ser Gly Ala Ala Gly Phe Val Gln Ala Pro Leu Ser Gln
            20                  25                  30

Gln Arg Trp Val Gly Gly Ser Val Glu Leu His Cys Glu Ala Val Gly
        35                  40                  45

Ser Pro Val Pro Glu Ile Gln Trp Trp Phe Glu Gly Gln Gly Pro Asn
    50                  55                  60

Asp Thr Cys Ser Gln Leu Trp Asp Gly Ala Arg Leu Asp Arg Val His
65                  70                  75                  80

Ile His Ala Thr Tyr His Gln His Ala Ala Ser Thr Ile Ser Ile Asp
                85                  90                  95

Thr Leu Val Glu Glu Asp Thr Gly Thr Tyr Glu Cys Arg Ala Ser Asn
            100                 105                 110

Asp Pro Asp Arg Asn His Leu Thr Arg Ala Pro Arg Val Lys Trp Val
        115                 120                 125

Arg Ala Gln Ala Val Val Leu Val Leu Glu Pro Gly Thr Val Phe Thr
    130                 135                 140

Thr Val Glu Asp Leu Gly Ser Lys Ile Leu Leu Thr Cys Ser Leu Asn
145                 150                 155                 160

Asp Ser Ala Thr Glu Val Thr Gly His Arg Trp Leu Lys Gly Gly Val
                165                 170                 175

Val Leu Lys Glu Asp Ala Leu Pro Gly Gln Lys Thr Glu Phe Lys Val
            180                 185                 190

Asp Ser Asp Asp Gln Trp Gly Glu Tyr Ser Cys Val Phe Leu Pro Glu
        195                 200                 205

Pro Met Gly Thr Ala Asn Ile Gln Leu His Gly Pro Pro Arg Val Lys
    210                 215                 220

Ala Val Lys Ser Ser Glu His Ile Asn Glu Gly Glu Thr Ala Met Leu
225                 230                 235                 240

Val Cys Lys Ser Glu Ser Val Pro Pro Val Thr Asp Trp Ala Trp Tyr
                245                 250                 255

Lys Ile Thr Asp Ser Glu Asp Lys Ala Leu Met Asn Gly Ser Glu Ser
            260                 265                 270

Arg Phe Phe Val Ser Ser Ser Gln Gly Arg Ser Glu Leu His Ile Glu
        275                 280                 285

```
Asn Leu Asn Met Glu Ala Asp Pro Gly Gln Tyr Arg Cys Asn Gly Thr
    290                 295                 300

Ser Ser Lys Gly Ser Asp Gln Ala Ile Ile Thr Leu Arg Val Arg Ser
305                 310                 315                 320

His Leu Ala Ala Leu Trp Pro Phe Leu Gly Ile Val Ala Glu Val Leu
                325                 330                 335

Val Leu Val Thr Ile Ile Phe Ile Tyr Glu Lys Arg Arg Lys Pro Glu
            340                 345                 350

Asp Val Leu Asp Asp Asp Ala Gly Ser Ala Pro Leu Lys Ser Ser
            355                 360                 365

Gly Gln His Gln Asn Asp Lys Gly Lys Asn Val Arg Gln Arg Asn Ser
370                 375                 380

Ser
385

<210> SEQ ID NO 3
<211> LENGTH: 613
<212> TYPE: PRT
<213> ORGANISM: Artificial sequence
<220> FEATURE:
<223> OTHER INFORMATION: The IGSF8 protein

<400> SEQUENCE: 3

Met Gly Ala Leu Arg Pro Thr Leu Leu Pro Pro Ser Leu Pro Leu Leu
1               5                   10                  15

Leu Leu Leu Met Leu Gly Met Gly Cys Trp Ala Arg Glu Val Leu Val
                20                  25                  30

Pro Glu Gly Pro Leu Tyr Arg Val Ala Gly Thr Ala Val Ser Ile Ser
            35                  40                  45

Cys Asn Val Thr Gly Tyr Glu Gly Pro Ala Gln Gln Asn Phe Glu Trp
50                  55                  60

Phe Leu Tyr Arg Pro Glu Ala Pro Asp Thr Ala Leu Gly Ile Val Ser
65                  70                  75                  80

Thr Lys Asp Thr Gln Phe Ser Tyr Ala Val Phe Lys Ser Arg Val Val
                85                  90                  95

Ala Gly Glu Val Gln Val Gln Arg Leu Gln Gly Asp Ala Val Val Leu
            100                 105                 110

Lys Ile Ala Arg Leu Gln Ala Gln Asp Ala Gly Ile Tyr Glu Cys His
            115                 120                 125

Thr Pro Ser Thr Asp Thr Arg Tyr Leu Gly Ser Tyr Ser Gly Lys Val
            130                 135                 140

Glu Leu Arg Val Leu Pro Asp Val Leu Gln Val Ser Ala Ala Pro Pro
145                 150                 155                 160

Gly Pro Arg Gly Arg Gln Ala Pro Thr Ser Pro Pro Arg Met Thr Val
                165                 170                 175

His Glu Gly Gln Glu Leu Ala Leu Gly Cys Leu Ala Arg Thr Ser Thr
            180                 185                 190

Gln Lys His Thr His Leu Ala Val Ser Phe Gly Arg Ser Val Pro Glu
            195                 200                 205

Ala Pro Val Gly Arg Ser Thr Leu Gln Glu Val Val Gly Ile Arg Ser
            210                 215                 220

Asp Leu Ala Val Glu Ala Gly Ala Pro Tyr Ala Glu Arg Leu Ala Ala
225                 230                 235                 240

Gly Glu Leu Arg Leu Gly Lys Glu Gly Thr Asp Arg Tyr Arg Met Val
                245                 250                 255
```

```
Val Gly Gly Ala Gln Ala Gly Asp Ala Gly Thr Tyr His Cys Thr Ala
            260                 265                 270

Ala Glu Trp Ile Gln Asp Pro Asp Gly Ser Trp Ala Gln Ile Ala Glu
            275                 280                 285

Lys Arg Ala Val Leu Ala His Val Asp Val Gln Thr Leu Ser Ser Gln
        290                 295                 300

Leu Ala Val Thr Val Gly Pro Gly Glu Arg Ile Gly Pro Gly Glu
305                 310                 315                 320

Pro Leu Glu Leu Leu Cys Asn Val Ser Gly Ala Leu Pro Pro Ala Gly
                325                 330                 335

Arg His Ala Ala Tyr Ser Val Gly Trp Glu Met Ala Pro Ala Gly Ala
            340                 345                 350

Pro Gly Pro Gly Arg Leu Val Ala Gln Leu Asp Thr Glu Gly Val Gly
            355                 360                 365

Ser Leu Gly Pro Gly Tyr Glu Gly Arg His Ile Ala Met Glu Lys Val
            370                 375                 380

Ala Ser Arg Thr Tyr Arg Leu Arg Leu Glu Ala Ala Arg Pro Gly Asp
385                 390                 395                 400

Ala Gly Thr Tyr Arg Cys Leu Ala Lys Ala Tyr Val Arg Gly Ser Gly
                405                 410                 415

Thr Arg Leu Arg Glu Ala Ala Ser Ala Arg Ser Arg Pro Leu Pro Val
            420                 425                 430

His Val Arg Glu Gly Val Leu Glu Ala Val Ala Trp Leu Ala
            435                 440                 445

Gly Gly Thr Val Tyr Arg Gly Glu Thr Ala Ser Leu Leu Cys Asn Ile
450                 455                 460

Ser Val Arg Gly Gly Pro Pro Gly Leu Arg Leu Ala Ala Ser Trp Trp
465                 470                 475                 480

Val Glu Arg Pro Glu Asp Gly Glu Leu Ser Ser Val Pro Ala Gln Leu
            485                 490                 495

Val Gly Gly Val Gly Gln Asp Gly Val Ala Glu Leu Gly Val Arg Pro
            500                 505                 510

Gly Gly Gly Pro Val Ser Val Glu Leu Val Gly Pro Arg Ser His Arg
            515                 520                 525

Leu Arg Leu His Ser Leu Gly Pro Glu Asp Glu Gly Val Tyr His Cys
530                 535                 540

Ala Pro Ser Ala Trp Val Gln His Ala Asp Tyr Ser Trp Tyr Gln Ala
545                 550                 555                 560

Gly Ser Ala Arg Ser Gly Pro Val Thr Val Tyr Pro Tyr Met His Ala
                565                 570                 575

Leu Asp Thr Leu Phe Val Pro Leu Leu Val Gly Thr Gly Val Ala Leu
            580                 585                 590

Val Thr Gly Ala Thr Val Leu Gly Thr Ile Thr Cys Cys Phe Met Lys
            595                 600                 605

Arg Leu Arg Lys Arg
    610
```

<210> SEQ ID NO 4
<211> LENGTH: 1194
<212> TYPE: PRT
<213> ORGANISM: Artificial sequence
<220> FEATURE:
<223> OTHER INFORMATION: The IGSF3 protein

<400> SEQUENCE: 4

```
Met Lys Cys Phe Phe Pro Val Leu Ser Cys Leu Ala Val Leu Gly Val
1               5                   10                  15

Val Ser Ala Gln Arg Gln Val Thr Val Gln Glu Gly Pro Leu Tyr Arg
            20                  25                  30

Thr Glu Gly Ser His Ile Thr Ile Trp Cys Asn Val Ser Gly Tyr Gln
                35                  40                  45

Gly Pro Ser Glu Gln Asn Phe Gln Trp Ser Ile Tyr Leu Pro Ser Ser
    50                  55                  60

Pro Glu Arg Glu Val Gln Ile Val Ser Thr Met Asp Ser Ser Phe Pro
65                  70                  75                  80

Tyr Ala Ile Tyr Thr Gln Arg Val Arg Gly Gly Lys Ile Phe Ile Glu
                85                  90                  95

Arg Val Gln Gly Asn Ser Thr Leu Leu His Ile Thr Asp Leu Gln Ala
                100                 105                 110

Arg Asp Ala Gly Glu Tyr Glu Cys His Thr Pro Ser Thr Asp Lys Gln
            115                 120                 125

Tyr Phe Gly Ser Tyr Ser Ala Lys Met Asn Leu Val Val Ile Pro Asp
    130                 135                 140

Ser Leu Gln Thr Thr Ala Met Pro Gln Thr Leu His Arg Val Glu Gln
145                 150                 155                 160

Asp Pro Leu Glu Leu Thr Cys Glu Val Ala Ser Glu Thr Ile Gln His
            165                 170                 175

Ser His Leu Ser Val Ala Trp Leu Arg Gln Lys Val Gly Glu Lys Pro
            180                 185                 190

Val Glu Val Ile Ser Leu Ser Arg Asp Phe Met Leu His Ser Ser Ser
        195                 200                 205

Glu Tyr Ala Gln Arg Gln Ser Leu Gly Glu Val Arg Leu Asp Lys Leu
    210                 215                 220

Gly Arg Thr Thr Phe Arg Leu Thr Ile Phe His Leu Gln Pro Ser Asp
225                 230                 235                 240

Gln Gly Glu Phe Tyr Cys Glu Ala Ala Glu Trp Ile Gln Asp Pro Asp
            245                 250                 255

Gly Ser Trp Tyr Ala Met Thr Arg Lys Arg Ser Glu Gly Ala Val Val
        260                 265                 270

Asn Val Gln Pro Thr Asp Lys Glu Phe Thr Val Arg Leu Glu Thr Glu
    275                 280                 285

Lys Arg Leu His Thr Val Gly Glu Pro Val Glu Phe Arg Cys Ile Leu
290                 295                 300

Glu Ala Gln Asn Val Pro Asp Arg Tyr Phe Ala Val Ser Trp Ala Phe
305                 310                 315                 320

Asn Ser Ser Leu Ile Ala Thr Met Gly Pro Asn Ala Val Pro Val Leu
            325                 330                 335

Asn Ser Glu Phe Ala His Arg Glu Ala Arg Gly Gln Leu Lys Val Ala
            340                 345                 350

Lys Glu Ser Asp Ser Val Phe Val Leu Lys Ile Tyr His Leu Arg Gln
            355                 360                 365

Glu Asp Ser Gly Lys Tyr Asn Cys Arg Val Thr Glu Arg Glu Lys Thr
    370                 375                 380

Val Thr Gly Glu Phe Ile Asp Lys Glu Ser Lys Arg Pro Lys Asn Ile
385                 390                 395                 400

Pro Ile Ile Val Leu Pro Leu Lys Ser Ser Ile Ser Val Glu Val Ala
                405                 410                 415

Ser Asn Ala Ser Val Ile Leu Glu Gly Glu Asp Leu Arg Phe Ser Cys
```

```
                420             425             430
Ser Val Arg Thr Ala Gly Arg Pro Gln Gly Arg Phe Ser Val Ile Trp
            435             440             445
Gln Leu Val Asp Arg Gln Asn Arg Arg Ser Asn Ile Met Trp Leu Asp
            450             455             460
Arg Asp Gly Thr Val Gln Pro Gly Ser Ser Tyr Trp Glu Arg Ser Ser
465             470             475             480
Phe Gly Gly Val Gln Met Glu Gln Val Gln Pro Asn Ser Phe Ser Leu
            485             490             495
Gly Ile Phe Asn Ser Arg Lys Glu Asp Glu Gly Gln Tyr Glu Cys His
            500             505             510
Val Thr Glu Trp Val Arg Ala Val Asp Gly Glu Trp Gln Ile Val Gly
            515             520             525
Glu Arg Arg Ala Ser Thr Pro Ile Ser Ile Thr Ala Leu Glu Met Gly
            530             535             540
Phe Ala Val Thr Ala Ile Ser Arg Thr Pro Gly Val Thr Tyr Ser Asp
545             550             555             560
Ser Phe Asp Leu Gln Cys Ile Ile Lys Pro His Tyr Pro Ala Trp Val
            565             570             575
Pro Val Ser Val Thr Trp Arg Phe Gln Pro Val Gly Thr Val Glu Phe
            580             585             590
His Asp Leu Val Thr Phe Thr Arg Asp Gly Gly Val Gln Trp Gly Asp
            595             600             605
Arg Ser Ser Ser Phe Arg Thr Arg Thr Ala Ile Glu Lys Ala Glu Ser
            610             615             620
Ser Asn Asn Val Arg Leu Ser Ile Ser Arg Ala Ser Asp Thr Glu Ala
625             630             635             640
Gly Lys Tyr Gln Cys Val Ala Glu Leu Trp Arg Lys Asn Tyr Asn Asn
            645             650             655
Thr Trp Thr Arg Leu Ala Glu Arg Thr Ser Asn Leu Leu Glu Ile Arg
            660             665             670
Val Leu Gln Pro Val Thr Lys Leu Gln Val Ser Lys Ser Lys Arg Thr
            675             680             685
Leu Thr Leu Val Glu Asn Lys Pro Ile Gln Leu Asn Cys Ser Val Lys
            690             695             700
Ser Gln Thr Ser Gln Asn Ser His Phe Ala Val Leu Trp Tyr Val His
705             710             715             720
Lys Pro Ser Asp Ala Asp Gly Lys Leu Ile Leu Lys Thr Thr His Asn
            725             730             735
Ser Ala Phe Glu Tyr Gly Thr Tyr Ala Glu Glu Gly Leu Arg Ala
            740             745             750
Arg Leu Gln Phe Glu Arg His Val Ser Gly Gly Leu Phe Ser Leu Thr
            755             760             765
Val Gln Arg Ala Glu Val Ser Asp Ser Gly Ser Tyr Tyr Cys His Val
            770             775             780
Glu Glu Trp Leu Leu Ser Pro Asn Tyr Ala Trp Tyr Lys Leu Ala Glu
785             790             795             800
Glu Val Ser Gly Arg Thr Glu Val Thr Val Lys Gln Pro Asp Ser Arg
            805             810             815
Leu Arg Leu Ser Gln Ala Gln Gly Asn Leu Ser Val Leu Glu Thr Arg
            820             825             830
Gln Val Gln Leu Glu Cys Val Val Leu Asn Arg Thr Ser Ile Thr Ser
            835             840             845
```

```
Gln Leu Met Val Glu Trp Phe Val Trp Lys Pro Asn His Pro Glu Arg
    850                 855                 860
Glu Thr Val Ala Arg Leu Ser Arg Asp Ala Thr Phe His Tyr Gly Glu
865                 870                 875                 880
Gln Ala Ala Lys Asn Asn Leu Lys Gly Arg Leu His Leu Glu Ser Pro
                885                 890                 895
Ser Pro Gly Val Tyr Arg Leu Phe Ile Gln Asn Val Ala Val Gln Asp
            900                 905                 910
Ser Gly Thr Tyr Ser Cys His Val Glu Glu Trp Leu Pro Ser Pro Ser
        915                 920                 925
Gly Met Trp Tyr Lys Arg Ala Glu Asp Thr Ala Gly Gln Thr Ala Leu
    930                 935                 940
Thr Val Met Arg Pro Asp Ala Ser Leu Gln Val Asp Thr Val Val Pro
945                 950                 955                 960
Asn Ala Thr Val Ser Glu Lys Ala Ala Phe Gln Leu Asp Cys Ser Ile
                965                 970                 975
Val Ser Arg Ser Ser Gln Asp Ser Arg Phe Ala Val Ala Trp Tyr Ser
            980                 985                 990
Leu Arg Thr Lys Ala Gly Gly Lys Arg Ser Ser Pro Gly Leu Glu Glu
        995                 1000                1005
Gln Glu Glu Glu Arg Glu Glu Glu Glu Glu Asp Asp Asp Asp
        1010                1015                1020
Asp Asp Asp Pro Thr Glu Arg Thr Ala Leu Leu Ser Val Gly Pro
    1025                1030                1035
Asp Ala Val Phe Gly Pro Glu Gly Ser Pro Trp Glu Gly Arg Leu
    1040                1045                1050
Arg Phe Gln Arg Leu Ser Pro Val Leu Tyr Arg Leu Thr Val Leu
    1055                1060                1065
Gln Ala Ser Pro Gln Asp Thr Gly Asn Tyr Ser Cys His Val Glu
    1070                1075                1080
Glu Trp Leu Pro Ser Pro Gln Lys Glu Trp Tyr Arg Leu Thr Glu
    1085                1090                1095
Glu Glu Ser Ala Pro Ile Gly Ile Arg Val Leu Asp Thr Ser Pro
    1100                1105                1110
Thr Leu Gln Ser Ile Ile Cys Ser Asn Asp Ala Leu Phe Tyr Phe
    1115                1120                1125
Val Phe Phe Tyr Pro Phe Pro Ile Phe Gly Ile Leu Ile Ile Thr
    1130                1135                1140
Ile Leu Leu Val Arg Phe Lys Ser Arg Asn Ser Ser Lys Asn Ser
    1145                1150                1155
Asp Gly Lys Asn Gly Val Pro Leu Leu Trp Ile Lys Glu Pro His
    1160                1165                1170
Leu Asn Tyr Ser Pro Thr Cys Leu Glu Pro Pro Val Leu Ser Ile
    1175                1180                1185
His Pro Gly Ala Ile Asp
    1190

<210> SEQ ID NO 5
<211> LENGTH: 748
<212> TYPE: PRT
<213> ORGANISM: Artificial sequence
<220> FEATURE:
<223> OTHER INFORMATION: The ITGB1 protein

<400> SEQUENCE: 5
```

-continued

```
Met Asn Leu Gln Pro Ile Phe Trp Ile Gly Leu Ile Ser Ser Val Cys
1               5                   10                  15

Cys Val Phe Ala Gln Thr Asp Glu Asn Arg Cys Leu Lys Ala Asn Ala
            20                  25                  30

Lys Ser Cys Gly Glu Cys Ile Gln Ala Gly Pro Asn Cys Gly Trp Cys
        35                  40                  45

Thr Asn Ser Thr Phe Leu Gln Glu Gly Met Pro Thr Ser Ala Arg Cys
    50                  55                  60

Asp Asp Leu Glu Ala Leu Lys Lys Lys Gly Cys Pro Pro Asp Asp Ile
65              70                  75                  80

Glu Asn Pro Arg Gly Ser Lys Asp Ile Lys Asn Lys Asn Val Thr
                85                  90                  95

Asn Arg Ser Lys Gly Thr Ala Glu Lys Leu Lys Pro Glu Asp Ile Thr
            100                 105                 110

Gln Ile Gln Pro Gln Gln Leu Val Leu Arg Leu Arg Ser Gly Glu Pro
        115                 120                 125

Gln Thr Phe Thr Leu Lys Phe Lys Arg Ala Glu Asp Tyr Pro Ile Asp
    130                 135                 140

Leu Tyr Tyr Leu Met Asp Leu Ser Tyr Ser Met Lys Asp Asp Leu Glu
145                 150                 155                 160

Asn Val Lys Ser Leu Gly Thr Asp Leu Met Asn Glu Met Arg Arg Ile
                165                 170                 175

Thr Ser Asp Phe Arg Ile Gly Phe Gly Ser Phe Val Glu Lys Thr Val
            180                 185                 190

Met Pro Tyr Ile Ser Thr Thr Pro Ala Lys Leu Arg Asn Pro Cys Thr
        195                 200                 205

Ser Glu Gln Asn Cys Thr Ser Pro Phe Ser Tyr Lys Asn Val Leu Ser
    210                 215                 220

Leu Thr Asn Lys Gly Glu Val Phe Asn Glu Leu Val Gly Lys Gln Arg
225                 230                 235                 240

Ile Ser Gly Asn Leu Asp Ser Pro Glu Gly Gly Phe Asp Ala Ile Met
                245                 250                 255

Gln Val Ala Val Cys Gly Ser Leu Ile Gly Trp Arg Asn Val Thr Arg
            260                 265                 270

Leu Leu Val Phe Ser Thr Asp Ala Gly Phe His Phe Ala Gly Asp Gly
        275                 280                 285

Lys Leu Gly Gly Ile Val Leu Pro Asn Asp Gly Gln Cys His Leu Glu
    290                 295                 300

Asn Asn Met Tyr Thr Met Ser His Tyr Tyr Asp Tyr Pro Ser Ile Ala
305                 310                 315                 320

His Leu Val Gln Lys Leu Ser Glu Asn Asn Ile Gln Thr Ile Phe Ala
                325                 330                 335

Val Thr Glu Glu Phe Gln Pro Val Tyr Lys Glu Leu Lys Asn Leu Ile
            340                 345                 350

Pro Lys Ser Ala Val Gly Thr Leu Ser Ala Asn Ser Ser Asn Val Ile
        355                 360                 365

Gln Leu Ile Ile Asp Ala Tyr Asn Ser Leu Ser Ser Glu Val Ile Leu
    370                 375                 380

Glu Asn Gly Lys Leu Ser Glu Gly Val Thr Ile Ser Tyr Lys Ser Tyr
385                 390                 395                 400

Cys Lys Asn Gly Val Asn Gly Thr Gly Glu Asn Gly Arg Lys Cys Ser
                405                 410                 415
```

```
Asn Ile Ser Ile Gly Asp Glu Val Gln Phe Glu Ile Ser Thr Ser
                420                 425                 430

Asn Lys Cys Pro Lys Lys Asp Ser Asp Ser Phe Lys Ile Arg Pro Leu
                435                 440                 445

Gly Phe Thr Glu Glu Val Glu Val Ile Leu Gln Tyr Ile Cys Glu Cys
450                 455                 460

Glu Cys Gln Ser Glu Gly Ile Pro Glu Ser Pro Lys Cys His Glu Gly
465                 470                 475                 480

Asn Gly Thr Phe Glu Cys Gly Ala Cys Arg Cys Asn Glu Gly Arg Val
                485                 490                 495

Gly Arg His Cys Glu Cys Ser Thr Asp Glu Val Asn Ser Glu Asp Met
                500                 505                 510

Asp Ala Tyr Cys Arg Lys Glu Asn Ser Ser Glu Ile Cys Ser Asn Asn
                515                 520                 525

Gly Glu Cys Val Cys Gly Gln Cys Val Cys Arg Lys Arg Asp Asn Thr
                530                 535                 540

Asn Glu Ile Tyr Ser Gly Ala Ser Asn Gly Gln Ile Cys Asn Gly Arg
545                 550                 555                 560

Gly Ile Cys Glu Cys Gly Val Cys Lys Cys Thr Asp Pro Lys Phe Gln
                565                 570                 575

Gly Gln Thr Cys Glu Met Cys Gln Thr Cys Leu Gly Val Cys Ala Glu
                580                 585                 590

His Lys Glu Cys Val Gln Cys Arg Ala Phe Asn Lys Gly Glu Lys Lys
                595                 600                 605

Asp Thr Cys Thr Gln Glu Cys Ser Tyr Phe Asn Ile Thr Lys Val Glu
                610                 615                 620

Ser Arg Asp Lys Leu Pro Gln Pro Val Gln Pro Asp Pro Val Ser His
625                 630                 635                 640

Cys Lys Glu Lys Asp Val Asp Asp Cys Trp Phe Tyr Phe Thr Tyr Ser
                645                 650                 655

Val Asn Gly Asn Asn Glu Val Met Val His Val Val Glu Asn Pro Glu
                660                 665                 670

Cys Pro Thr Gly Pro Asp Ile Ile Pro Ile Val Ala Gly Val Val Ala
                675                 680                 685

Gly Ile Val Leu Ile Gly Leu Ala Leu Leu Leu Ile Trp Lys Leu Leu
690                 695                 700

Met Ile Ile His Asp Arg Arg Glu Phe Ala Lys Phe Glu Lys Glu Lys
705                 710                 715                 720

Met Asn Ala Lys Trp Asp Thr Gly Glu Asn Pro Ile Tyr Lys Ser Ala
                725                 730                 735

Val Thr Thr Val Val Asn Pro Lys Tyr Glu Gly Lys
                740                 745

<210> SEQ ID NO 6
<211> LENGTH: 1032
<212> TYPE: PRT
<213> ORGANISM: Artificial sequence
<220> FEATURE:
<223> OTHER INFORMATION: The ITGA4 protein

<400> SEQUENCE: 6

Met Ala Trp Glu Ala Arg Arg Glu Pro Gly Pro Arg Arg Ala Ala Val
1               5                   10                  15

Arg Glu Thr Val Met Leu Leu Leu Cys Leu Gly Val Pro Thr Gly Arg
                20                  25                  30
```

```
Pro Tyr Asn Val Asp Thr Glu Ser Ala Leu Leu Tyr Gln Gly Pro His
         35                  40                  45
Asn Thr Leu Phe Gly Tyr Ser Val Val Leu His Ser His Gly Ala Asn
 50                  55                  60
Arg Trp Leu Leu Val Gly Ala Pro Thr Ala Asn Trp Leu Ala Asn Ala
 65                  70                  75                  80
Ser Val Ile Asn Pro Gly Ala Ile Tyr Arg Cys Arg Ile Gly Lys Asn
                 85                  90                  95
Pro Gly Gln Thr Cys Glu Gln Leu Gln Leu Gly Ser Pro Asn Gly Glu
            100                 105                 110
Pro Cys Gly Lys Thr Cys Leu Glu Glu Arg Asp Asn Gln Trp Leu Gly
            115                 120                 125
Val Thr Leu Ser Arg Gln Pro Gly Glu Asn Gly Ser Ile Val Thr Cys
130                 135                 140
Gly His Arg Trp Lys Asn Ile Phe Tyr Ile Lys Asn Glu Asn Lys Leu
145                 150                 155                 160
Pro Thr Gly Gly Cys Tyr Gly Val Pro Pro Asp Leu Arg Thr Glu Leu
                165                 170                 175
Ser Lys Arg Ile Ala Pro Cys Tyr Gln Asp Tyr Val Lys Lys Phe Gly
            180                 185                 190
Glu Asn Phe Ala Ser Cys Gln Ala Gly Ile Ser Ser Phe Tyr Thr Lys
            195                 200                 205
Asp Leu Ile Val Met Gly Ala Pro Gly Ser Ser Tyr Trp Thr Gly Ser
            210                 215                 220
Leu Phe Val Tyr Asn Ile Thr Thr Asn Lys Tyr Lys Ala Phe Leu Asp
225                 230                 235                 240
Lys Gln Asn Gln Val Lys Phe Gly Ser Tyr Leu Gly Tyr Ser Val Gly
                245                 250                 255
Ala Gly His Phe Arg Ser Gln His Thr Thr Glu Val Val Gly Gly Ala
            260                 265                 270
Pro Gln His Glu Gln Ile Gly Lys Ala Tyr Ile Phe Ser Ile Asp Glu
            275                 280                 285
Lys Glu Leu Asn Ile Leu His Glu Met Lys Gly Lys Lys Leu Gly Ser
290                 295                 300
Tyr Phe Gly Ala Ser Val Cys Ala Val Asp Leu Asn Ala Asp Gly Phe
305                 310                 315                 320
Ser Asp Leu Leu Val Gly Ala Pro Met Gln Ser Thr Ile Arg Glu Glu
                325                 330                 335
Gly Arg Val Phe Val Tyr Ile Asn Ser Gly Ser Gly Ala Val Met Asn
            340                 345                 350
Ala Met Glu Thr Asn Leu Val Gly Ser Asp Lys Tyr Ala Ala Arg Phe
            355                 360                 365
Gly Glu Ser Ile Val Asn Leu Gly Asp Ile Asp Asn Asp Gly Phe Glu
            370                 375                 380
Asp Val Ala Ile Gly Ala Pro Gln Glu Asp Asp Leu Gln Gly Ala Ile
385                 390                 395                 400
Tyr Ile Tyr Asn Gly Arg Ala Asp Gly Ile Ser Ser Thr Phe Ser Gln
                405                 410                 415
Arg Ile Glu Gly Leu Gln Ile Ser Lys Ser Leu Ser Met Phe Gly Gln
            420                 425                 430
Ser Ile Ser Gly Gln Ile Asp Ala Asp Asn Asn Gly Tyr Val Asp Val
            435                 440                 445
Ala Val Gly Ala Phe Arg Ser Asp Ser Ala Val Leu Leu Arg Thr Arg
```

```
            450             455             460
Pro Val Val Ile Val Asp Ala Ser Leu Ser His Pro Glu Ser Val Asn
465                     470                 475                 480

Arg Thr Lys Phe Asp Cys Val Glu Asn Gly Trp Pro Ser Val Cys Ile
                    485                 490                 495

Asp Leu Thr Leu Cys Phe Ser Tyr Lys Gly Lys Glu Val Pro Gly Tyr
                500                 505                 510

Ile Val Leu Phe Tyr Asn Met Ser Leu Asp Val Asn Arg Lys Ala Glu
                515                 520                 525

Ser Pro Pro Arg Phe Tyr Phe Ser Ser Asn Gly Thr Ser Asp Val Ile
        530                 535                 540

Thr Gly Ser Ile Gln Val Ser Ser Arg Glu Ala Asn Cys Arg Thr His
545                 550                 555                 560

Gln Ala Phe Met Arg Lys Asp Val Arg Asp Ile Leu Thr Pro Ile Gln
                565                 570                 575

Ile Glu Ala Ala Tyr His Leu Gly Pro His Val Ile Ser Lys Arg Ser
                580                 585                 590

Thr Glu Glu Phe Pro Pro Leu Gln Pro Ile Leu Gln Gln Lys Lys Glu
                595                 600                 605

Lys Asp Ile Met Lys Lys Thr Ile Asn Phe Ala Arg Phe Cys Ala His
        610                 615                 620

Glu Asn Cys Ser Ala Asp Leu Gln Val Ser Ala Lys Ile Gly Phe Leu
625                 630                 635                 640

Lys Pro His Glu Asn Lys Thr Tyr Leu Ala Val Gly Ser Met Lys Thr
                645                 650                 655

Leu Met Leu Asn Val Ser Leu Phe Asn Ala Gly Asp Asp Ala Tyr Glu
                660                 665                 670

Thr Thr Leu His Val Lys Leu Pro Val Gly Leu Tyr Phe Ile Lys Ile
                675                 680                 685

Leu Glu Leu Glu Glu Lys Gln Ile Asn Cys Glu Val Thr Asp Asn Ser
        690                 695                 700

Gly Val Val Gln Leu Asp Cys Ser Ile Gly Tyr Ile Tyr Val Asp His
705                 710                 715                 720

Leu Ser Arg Ile Asp Ile Ser Phe Leu Leu Asp Val Ser Ser Leu Ser
                725                 730                 735

Arg Ala Glu Glu Asp Leu Ser Ile Thr Val His Ala Thr Cys Glu Asn
                740                 745                 750

Glu Glu Glu Met Asp Asn Leu Lys His Ser Arg Val Thr Val Ala Ile
                755                 760                 765

Pro Leu Lys Tyr Glu Val Lys Leu Thr Val His Gly Phe Val Asn Pro
770                 775                 780

Thr Ser Phe Val Tyr Gly Ser Asn Asp Glu Asn Glu Pro Glu Thr Cys
785                 790                 795                 800

Met Val Glu Lys Met Asn Leu Thr Phe His Val Ile Asn Thr Gly Asn
                805                 810                 815

Ser Met Ala Pro Asn Val Ser Val Glu Ile Met Val Pro Asn Ser Phe
                820                 825                 830

Ser Pro Gln Thr Asp Lys Leu Phe Asn Ile Leu Asp Val Gln Thr Thr
                835                 840                 845

Thr Gly Glu Cys His Phe Glu Asn Tyr Gln Arg Val Cys Ala Leu Glu
                850                 855                 860

Gln Gln Lys Ser Ala Met Gln Thr Leu Lys Gly Ile Val Arg Phe Leu
865                 870                 875                 880
```

```
Ser Lys Thr Asp Lys Arg Leu Leu Tyr Cys Ile Lys Ala Asp Pro His
            885                 890                 895

Cys Leu Asn Phe Leu Cys Asn Phe Gly Lys Met Glu Ser Gly Lys Glu
            900                 905                 910

Ala Ser Val His Ile Gln Leu Glu Gly Arg Pro Ser Ile Leu Glu Met
            915                 920                 925

Asp Glu Thr Ser Ala Leu Lys Phe Glu Ile Arg Ala Thr Gly Phe Pro
            930                 935                 940

Glu Pro Asn Pro Arg Val Ile Glu Leu Asn Lys Asp Glu Asn Val Ala
945                 950                 955                 960

His Val Leu Leu Glu Gly Leu His His Gln Arg Pro Lys Arg Tyr Phe
            965                 970                 975

Thr Ile Val Ile Ile Ser Ser Ser Leu Leu Gly Leu Ile Val Leu
            980                 985                 990

Leu Leu Ile Ser Tyr Val Met Trp Lys Ala Gly Phe Phe Lys Arg Gln
            995                 1000                1005

Tyr Lys Ser Ile Leu Gln Glu Glu Asn Arg Arg Asp Ser Trp Ser
        1010                1015                1020

Tyr Ile Asn Ser Lys Ser Asn Asp Asp
        1025                1030

<210> SEQ ID NO 7
<211> LENGTH: 630
<212> TYPE: PRT
<213> ORGANISM: Artificial sequence
<220> FEATURE:
<223> OTHER INFORMATION: The SLC3A2 Protein

<400> SEQUENCE: 7

Met Glu Leu Gln Pro Pro Glu Ala Ser Ile Ala Val Val Ser Ile Pro
1               5                   10                  15

Arg Gln Leu Pro Gly Ser His Ser Glu Ala Gly Val Gln Gly Leu Ser
            20                  25                  30

Ala Gly Asp Asp Ser Glu Leu Gly Ser His Cys Val Ala Gln Thr Gly
        35                  40                  45

Leu Glu Leu Leu Ala Ser Gly Asp Pro Leu Pro Ser Ala Ser Gln Asn
50                  55                  60

Ala Glu Met Ile Glu Thr Gly Ser Asp Cys Val Thr Gln Ala Gly Leu
65                  70                  75                  80

Gln Leu Leu Ala Ser Ser Asp Pro Pro Ala Leu Ala Ser Lys Asn Ala
            85                  90                  95

Glu Val Thr Gly Thr Met Ser Gln Asp Thr Glu Val Asp Met Lys Glu
            100                 105                 110

Val Glu Leu Asn Glu Leu Glu Pro Glu Lys Gln Pro Met Asn Ala Ala
            115                 120                 125

Ser Gly Ala Ala Met Ser Leu Ala Gly Ala Glu Lys Asn Gly Leu Val
        130                 135                 140

Lys Ile Lys Val Ala Glu Asp Glu Ala Glu Ala Ala Ala Ala Ala Lys
145                 150                 155                 160

Phe Thr Gly Leu Ser Lys Glu Glu Leu Leu Lys Val Ala Gly Ser Pro
            165                 170                 175

Gly Trp Val Arg Thr Arg Trp Ala Leu Leu Leu Leu Phe Trp Leu Gly
            180                 185                 190

Trp Leu Gly Met Leu Ala Gly Ala Val Val Ile Ile Val Arg Ala Pro
            195                 200                 205
```

-continued

Arg Cys Arg Glu Leu Pro Ala Gln Lys Trp Trp His Thr Gly Ala Leu
    210                 215                 220

Tyr Arg Ile Gly Asp Leu Gln Ala Phe Gln Gly His Gly Ala Gly Asn
225                 230                 235                 240

Leu Ala Gly Leu Lys Gly Arg Leu Asp Tyr Leu Ser Ser Leu Lys Val
                245                 250                 255

Lys Gly Leu Val Leu Gly Pro Ile His Lys Asn Gln Lys Asp Asp Val
            260                 265                 270

Ala Gln Thr Asp Leu Leu Gln Ile Asp Pro Asn Phe Gly Ser Lys Glu
        275                 280                 285

Asp Phe Asp Ser Leu Leu Gln Ser Ala Lys Lys Ser Ile Arg Val
    290                 295                 300

Ile Leu Asp Leu Thr Pro Asn Tyr Arg Gly Glu Asn Ser Trp Phe Ser
305                 310                 315                 320

Thr Gln Val Asp Thr Val Ala Thr Lys Val Lys Asp Ala Leu Glu Phe
                325                 330                 335

Trp Leu Gln Ala Gly Val Asp Gly Phe Gln Val Arg Asp Ile Glu Asn
            340                 345                 350

Leu Lys Asp Ala Ser Ser Phe Leu Ala Glu Trp Gln Asn Ile Thr Lys
        355                 360                 365

Gly Phe Ser Glu Asp Arg Leu Leu Ile Ala Gly Thr Asn Ser Ser Asp
    370                 375                 380

Leu Gln Gln Ile Leu Ser Leu Leu Glu Ser Asn Lys Asp Leu Leu Leu
385                 390                 395                 400

Thr Ser Ser Tyr Leu Ser Asp Ser Gly Ser Thr Gly Glu His Thr Lys
                405                 410                 415

Ser Leu Val Thr Gln Tyr Leu Asn Ala Thr Gly Asn Arg Trp Cys Ser
            420                 425                 430

Trp Ser Leu Ser Gln Ala Arg Leu Leu Thr Ser Phe Leu Pro Ala Gln
        435                 440                 445

Leu Leu Arg Leu Tyr Gln Leu Met Leu Phe Thr Leu Pro Gly Thr Pro
    450                 455                 460

Val Phe Ser Tyr Gly Asp Glu Ile Gly Leu Asp Ala Ala Ala Leu Pro
465                 470                 475                 480

Gly Gln Pro Met Glu Ala Pro Val Met Leu Trp Asp Glu Ser Ser Phe
                485                 490                 495

Pro Asp Ile Pro Gly Ala Val Ser Ala Asn Met Thr Val Lys Gly Gln
            500                 505                 510

Ser Glu Asp Pro Gly Ser Leu Leu Ser Leu Phe Arg Arg Leu Ser Asp
        515                 520                 525

Gln Arg Ser Lys Glu Arg Ser Leu Leu His Gly Asp Phe His Ala Phe
    530                 535                 540

Ser Ala Gly Pro Gly Leu Phe Ser Tyr Ile Arg His Trp Asp Gln Asn
545                 550                 555                 560

Glu Arg Phe Leu Val Val Leu Asn Phe Gly Asp Val Gly Leu Ser Ala
                565                 570                 575

Gly Leu Gln Ala Ser Asp Leu Pro Ala Ser Ala Ser Leu Pro Ala Lys
            580                 585                 590

Ala Asp Leu Leu Leu Ser Thr Gln Pro Gly Arg Glu Glu Gly Ser Pro
        595                 600                 605

Leu Glu Leu Glu Arg Leu Lys Leu Glu Pro His Glu Gly Leu Leu Leu
    610                 615                 620

Arg Phe Pro Tyr Ala Ala
625             630

<210> SEQ ID NO 8
<211> LENGTH: 1021
<212> TYPE: PRT
<213> ORGANISM: Artificial sequence
<220> FEATURE:
<223> OTHER INFORMATION: The ITGA4 protein

<400> SEQUENCE: 8

Met Ala Gly Ile Ser Tyr Val Ala Ser Phe Phe Leu Leu Leu Thr Lys
1               5                   10                  15

Leu Ser Ile Gly Gln Arg Glu Val Thr Val Gln Lys Gly Pro Leu Phe
            20                  25                  30

Arg Ala Glu Gly Tyr Pro Val Ser Ile Gly Cys Asn Val Thr Gly His
        35                  40                  45

Gln Gly Pro Ser Glu Gln His Phe Gln Trp Ser Val Tyr Leu Pro Thr
    50                  55                  60

Asn Pro Thr Gln Glu Val Gln Ile Ile Ser Thr Lys Asp Ala Ala Phe
65                  70                  75                  80

Ser Tyr Ala Val Tyr Thr Gln Arg Val Arg Ser Gly Asp Val Tyr Val
                85                  90                  95

Glu Arg Val Gln Gly Asn Ser Val Leu Leu His Ile Ser Lys Leu Gln
            100                 105                 110

Met Lys Asp Ala Gly Glu Tyr Glu Cys His Thr Pro Asn Thr Asp Glu
        115                 120                 125

Lys Tyr Tyr Gly Ser Tyr Ser Ala Lys Thr Asn Leu Ile Val Ile Pro
    130                 135                 140

Asp Thr Leu Ser Ala Thr Met Ser Ser Gln Thr Leu Gly Lys Glu Glu
145                 150                 155                 160

Gly Glu Pro Leu Ala Leu Thr Cys Glu Ala Ser Lys Ala Thr Ala Gln
                165                 170                 175

His Thr His Leu Ser Val Thr Trp Tyr Leu Thr Gln Asp Gly Gly Gly
            180                 185                 190

Ser Gln Ala Thr Glu Ile Ile Ser Leu Ser Lys Asp Phe Ile Leu Val
        195                 200                 205

Pro Gly Pro Leu Tyr Thr Glu Arg Phe Ala Ala Ser Asp Val Gln Leu
    210                 215                 220

Asn Lys Leu Gly Pro Thr Thr Phe Arg Leu Ser Ile Glu Arg Leu Gln
225                 230                 235                 240

Ser Ser Asp Gln Gly Gln Leu Phe Cys Glu Ala Thr Glu Trp Ile Gln
                245                 250                 255

Asp Pro Asp Glu Thr Trp Met Phe Ile Thr Lys Lys Gln Thr Asp Gln
            260                 265                 270

Thr Thr Leu Arg Ile Gln Pro Ala Val Lys Asp Phe Gln Val Asn Ile
        275                 280                 285

Thr Ala Asp Ser Leu Phe Ala Glu Gly Lys Pro Leu Glu Leu Val Cys
    290                 295                 300

Leu Val Val Ser Ser Gly Arg Asp Pro Gln Leu Gln Gly Ile Trp Phe
305                 310                 315                 320

Phe Asn Gly Thr Glu Ile Ala His Ile Asp Ala Gly Gly Val Leu Gly
                325                 330                 335

Leu Lys Asn Asp Tyr Lys Glu Arg Ala Ser Gln Gly Gly Leu Gln Val
            340                 345                 350

```
Ser Lys Leu Gly Pro Lys Ala Phe Ser Leu Lys Ile Phe Ser Leu Gly
            355                 360                 365

Pro Glu Asp Glu Gly Ala Tyr Arg Cys Val Val Ala Glu Val Met Lys
            370                 375                 380

Thr Arg Thr Gly Ser Trp Gln Val Leu Gln Arg Lys Gln Ser Pro Asp
385                 390                 395                 400

Ser His Val His Leu Arg Lys Pro Ala Ala Arg Ser Val Val Met Ser
            405                 410                 415

Thr Lys Asn Lys Gln Gln Val Val Trp Glu Gly Glu Thr Leu Ala Phe
            420                 425                 430

Leu Cys Lys Ala Gly Gly Ala Glu Ser Pro Leu Ser Val Ser Trp Trp
            435                 440                 445

His Ile Pro Arg Asp Gln Thr Gln Pro Glu Phe Val Ala Gly Met Gly
            450                 455                 460

Gln Asp Gly Ile Val Gln Leu Gly Ala Ser Tyr Gly Val Pro Ser Tyr
465                 470                 475                 480

His Gly Asn Thr Arg Leu Glu Lys Met Asp Trp Ala Thr Phe Gln Leu
            485                 490                 495

Glu Ile Thr Phe Thr Ala Ile Thr Asp Ser Gly Thr Tyr Glu Cys Arg
            500                 505                 510

Val Ser Glu Lys Ser Arg Asn Gln Ala Arg Asp Leu Ser Trp Thr Gln
            515                 520                 525

Lys Ile Ser Val Thr Val Lys Ser Leu Glu Ser Ser Leu Gln Val Ser
            530                 535                 540

Leu Met Ser Arg Gln Pro Gln Val Met Leu Thr Asn Thr Phe Asp Leu
545                 550                 555                 560

Ser Cys Val Val Arg Ala Gly Tyr Ser Asp Leu Lys Val Pro Leu Thr
            565                 570                 575

Val Thr Trp Gln Phe Gln Pro Ala Ser Ser His Ile Phe His Gln Leu
            580                 585                 590

Ile Arg Ile Thr His Asn Gly Thr Ile Glu Trp Gly Asn Phe Leu Ser
            595                 600                 605

Arg Phe Gln Lys Lys Thr Lys Val Ser Gln Ser Leu Phe Arg Ser Gln
            610                 615                 620

Leu Leu Val His Asp Ala Thr Glu Glu Thr Gly Val Tyr Gln Cys
625                 630                 635                 640

Glu Val Glu Val Tyr Asp Arg Asn Ser Leu Tyr Asn Asn Arg Pro Pro
            645                 650                 655

Arg Ala Ser Ala Ile Ser His Pro Leu Arg Ile Ala Val Thr Leu Pro
            660                 665                 670

Glu Ser Lys Leu Lys Val Asn Ser Arg Ser Gln Val Gln Glu Leu Ser
            675                 680                 685

Ile Asn Ser Asn Thr Asp Ile Glu Cys Ser Ile Leu Ser Arg Ser Asn
            690                 695                 700

Gly Asn Leu Gln Leu Ala Ile Ile Trp Tyr Phe Ser Pro Val Ser Thr
705                 710                 715                 720

Asn Ala Ser Trp Leu Lys Ile Leu Glu Met Asp Gln Thr Asn Val Ile
            725                 730                 735

Lys Thr Gly Asp Glu Phe His Thr Pro Gln Arg Lys Gln Lys Phe His
            740                 745                 750

Thr Glu Lys Val Ser Gln Asp Leu Phe Gln Leu His Ile Leu Asn Val
            755                 760                 765

Glu Asp Ser Asp Arg Gly Lys Tyr His Cys Ala Val Glu Glu Trp Leu
```

```
                    770                 775                 780
Leu Ser Thr Asn Gly Thr Trp His Lys Leu Gly Glu Lys Lys Ser Gly
785                 790                 795                 800

Leu Thr Glu Leu Lys Leu Lys Pro Thr Gly Ser Lys Val Arg Val Ser
                    805                 810                 815

Lys Val Tyr Trp Thr Glu Asn Val Thr Glu His Arg Glu Val Ala Ile
                820                 825                 830

Arg Cys Ser Leu Glu Ser Val Gly Ser Ser Ala Thr Leu Tyr Ser Val
                835                 840                 845

Met Trp Tyr Trp Asn Arg Glu Asn Ser Gly Ser Lys Leu Leu Val His
850                 855                 860

Leu Gln His Asp Gly Leu Leu Glu Tyr Gly Glu Gly Leu Arg Arg
865                 870                 875                 880

His Leu His Cys Tyr Arg Ser Ser Ser Thr Asp Phe Val Leu Lys Leu
                885                 890                 895

His Gln Val Glu Met Glu Asp Ala Gly Met Tyr Trp Cys Arg Val Ala
                900                 905                 910

Glu Trp Gln Leu His Gly His Pro Ser Lys Trp Ile Asn Gln Ala Ser
                915                 920                 925

Asp Glu Ser Gln Arg Met Val Leu Thr Val Leu Pro Ser Glu Pro Thr
930                 935                 940

Leu Pro Ser Arg Ile Cys Ser Ala Pro Leu Leu Tyr Phe Leu Phe
945                 950                 955                 960

Ile Cys Pro Phe Val Leu Leu Leu Leu Leu Ile Ser Leu Leu Cys
                965                 970                 975

Leu Tyr Trp Lys Ala Arg Lys Leu Ser Thr Leu Arg Ser Asn Thr Arg
                980                 985                 990

Lys Glu Lys Ala Leu Trp Val Asp Leu Lys Glu Ala Gly Gly Val Thr
                995                 1000                1005

Thr Asn Arg Arg Glu Asp Glu Glu Glu Asp Glu Gly Asn
        1010                1015                1020

<210> SEQ ID NO 9
<211> LENGTH: 967
<212> TYPE: PRT
<213> ORGANISM: Artificial sequence
<220> FEATURE:
<223> OTHER INFORMATION: The CD13 protein

<400> SEQUENCE: 9

Met Ala Lys Gly Phe Tyr Ile Ser Lys Ser Leu Gly Ile Leu Gly Ile
1               5                   10                  15

Leu Leu Gly Val Ala Ala Val Cys Thr Ile Ile Ala Leu Ser Val Val
                20                  25                  30

Tyr Ser Gln Glu Lys Asn Lys Asn Ala Asn Ser Ser Pro Val Ala Ser
                35                  40                  45

Thr Thr Pro Ser Ala Ser Ala Thr Thr Asn Pro Ala Ser Ala Thr Thr
            50                  55                  60

Leu Asp Gln Ser Lys Ala Trp Asn Arg Tyr Arg Leu Pro Asn Thr Leu
65                  70                  75                  80

Lys Pro Asp Ser Tyr Arg Val Thr Leu Arg Pro Tyr Leu Thr Pro Asn
                85                  90                  95

Asp Arg Gly Leu Tyr Val Phe Lys Gly Ser Ser Thr Val Arg Phe Thr
                100                 105                 110

Cys Lys Glu Ala Thr Asp Val Ile Ile Ile His Ser Lys Lys Leu Asn
```

-continued

```
                115                 120                 125
Tyr Thr Leu Ser Gln Gly His Arg Val Val Leu Arg Gly Val Gly Gly
130                 135                 140
Ser Gln Pro Pro Asp Ile Asp Lys Thr Glu Leu Val Glu Pro Thr Glu
145                 150                 155                 160
Tyr Leu Val Val His Leu Lys Gly Ser Leu Val Lys Asp Ser Gln Tyr
                165                 170                 175
Glu Met Asp Ser Glu Phe Glu Gly Leu Ala Asp Asp Leu Ala Gly
                180                 185                 190
Phe Tyr Arg Ser Glu Tyr Met Glu Gly Asn Val Arg Lys Val Val Ala
                195                 200                 205
Thr Thr Gln Met Gln Ala Ala Asp Ala Arg Lys Ser Phe Pro Cys Phe
210                 215                 220
Asp Glu Pro Ala Met Lys Ala Glu Phe Asn Ile Thr Leu Ile His Pro
225                 230                 235                 240
Lys Asp Leu Thr Ala Leu Ser Asn Met Leu Pro Lys Gly Pro Ser Thr
                245                 250                 255
Pro Leu Pro Glu Asp Pro Asn Trp Asn Val Thr Glu Phe His Thr Thr
                260                 265                 270
Pro Lys Met Ser Thr Tyr Leu Leu Ala Phe Ile Val Ser Glu Phe Asp
                275                 280                 285
Tyr Val Glu Lys Gln Ala Ser Asn Gly Val Leu Ile Arg Ile Trp Ala
                290                 295                 300
Arg Pro Ser Ala Ile Ala Ala Gly His Gly Asp Tyr Ala Leu Asn Val
305                 310                 315                 320
Thr Gly Pro Ile Leu Asn Phe Phe Ala Gly His Tyr Asp Thr Pro Tyr
                325                 330                 335
Pro Leu Pro Lys Ser Asp Gln Ile Gly Leu Pro Asp Phe Asn Ala Gly
                340                 345                 350
Ala Met Glu Asn Trp Gly Leu Val Thr Tyr Arg Glu Asn Ser Leu Leu
                355                 360                 365
Phe Asp Pro Leu Ser Ser Ser Ser Asn Lys Glu Arg Val Val Thr
                370                 375                 380
Val Ile Ala His Glu Leu Ala His Gln Trp Phe Gly Asn Leu Val Thr
385                 390                 395                 400
Ile Glu Trp Trp Asn Asp Leu Trp Leu Asn Glu Gly Phe Ala Ser Tyr
                405                 410                 415
Val Glu Tyr Leu Gly Ala Asp Tyr Ala Glu Pro Thr Trp Asn Leu Lys
                420                 425                 430
Asp Leu Met Val Leu Asn Asp Val Tyr Arg Val Met Ala Val Asp Ala
                435                 440                 445
Leu Ala Ser Ser His Pro Leu Ser Thr Pro Ala Ser Glu Ile Asn Thr
                450                 455                 460
Pro Ala Gln Ile Ser Glu Leu Phe Asp Ala Ile Ser Tyr Ser Lys Gly
465                 470                 475                 480
Ala Ser Val Leu Arg Met Leu Ser Ser Phe Leu Ser Glu Asp Val Phe
                485                 490                 495
Lys Gln Gly Leu Ala Ser Tyr Leu His Thr Phe Ala Tyr Gln Asn Thr
                500                 505                 510
Ile Tyr Leu Asn Leu Trp Asp His Leu Gln Glu Ala Val Asn Asn Arg
                515                 520                 525
Ser Ile Gln Leu Pro Thr Thr Val Arg Asp Ile Met Asn Arg Trp Thr
530                 535                 540
```

-continued

Leu Gln Met Gly Phe Pro Val Ile Thr Val Asp Thr Ser Thr Gly Thr
545                 550                 555                 560

Leu Ser Gln Glu His Phe Leu Leu Asp Pro Asp Ser Asn Val Thr Arg
            565                 570                 575

Pro Ser Glu Phe Asn Tyr Val Trp Ile Val Pro Ile Thr Ser Ile Arg
            580                 585                 590

Asp Gly Arg Gln Gln Asp Tyr Trp Leu Ile Asp Val Arg Ala Gln
            595                 600                 605

Asn Asp Leu Phe Ser Thr Ser Gly Asn Glu Trp Val Leu Leu Asn Leu
610                 615                 620

Asn Val Thr Gly Tyr Tyr Arg Val Asn Tyr Asp Glu Glu Asn Trp Arg
625                 630                 635                 640

Lys Ile Gln Thr Gln Leu Gln Arg Asp His Ser Ala Ile Pro Val Ile
                645                 650                 655

Asn Arg Ala Gln Ile Ile Asn Asp Ala Phe Asn Leu Ala Ser Ala His
                660                 665                 670

Lys Val Pro Val Thr Leu Ala Leu Asn Asn Thr Leu Phe Leu Ile Glu
            675                 680                 685

Glu Arg Gln Tyr Met Pro Trp Glu Ala Ala Leu Ser Ser Leu Ser Tyr
            690                 695                 700

Phe Lys Leu Met Phe Asp Arg Ser Glu Val Tyr Gly Pro Met Lys Asn
705                 710                 715                 720

Tyr Leu Lys Lys Gln Val Thr Pro Leu Phe Ile His Phe Arg Asn Asn
                725                 730                 735

Thr Asn Asn Trp Arg Glu Ile Pro Glu Asn Leu Met Asp Gln Tyr Ser
                740                 745                 750

Glu Val Asn Ala Ile Ser Thr Ala Cys Ser Asn Gly Val Pro Glu Cys
                755                 760                 765

Glu Glu Met Val Ser Gly Leu Phe Lys Gln Trp Met Glu Asn Pro Asn
770                 775                 780

Asn Asn Pro Ile His Pro Asn Leu Arg Ser Thr Val Tyr Cys Asn Ala
785                 790                 795                 800

Ile Ala Gln Gly Gly Glu Glu Trp Asp Phe Ala Trp Glu Gln Phe
                805                 810                 815

Arg Asn Ala Thr Leu Val Asn Glu Ala Asp Lys Leu Arg Ala Ala Leu
                820                 825                 830

Ala Cys Ser Lys Glu Leu Trp Ile Leu Asn Arg Tyr Leu Ser Tyr Thr
            835                 840                 845

Leu Asn Pro Asp Leu Ile Arg Lys Gln Asp Ala Thr Ser Thr Ile Ile
            850                 855                 860

Ser Ile Thr Asn Asn Val Ile Gly Gln Gly Leu Val Trp Asp Phe Val
865                 870                 875                 880

Gln Ser Asn Trp Lys Lys Leu Phe Asn Asp Tyr Gly Gly Gly Ser Phe
            885                 890                 895

Ser Phe Ser Asn Leu Ile Gln Ala Val Thr Arg Arg Phe Ser Thr Glu
            900                 905                 910

Tyr Glu Leu Gln Gln Leu Glu Gln Phe Lys Lys Asp Asn Glu Glu Thr
            915                 920                 925

Gly Phe Gly Ser Gly Thr Arg Ala Leu Glu Gln Ala Leu Glu Lys Thr
            930                 935                 940

Lys Ala Asn Ile Lys Trp Val Lys Glu Asn Lys Glu Val Val Leu Gln
945                 950                 955                 960

Trp Phe Thr Glu Asn Ser Lys
            965

<210> SEQ ID NO 10
<211> LENGTH: 750
<212> TYPE: PRT
<213> ORGANISM: Artificial sequence
<220> FEATURE:
<223> OTHER INFORMATION: The MME protein

<400> SEQUENCE: 10

Met Gly Lys Ser Glu Ser Gln Met Asp Ile Thr Asp Ile Asn Thr Pro
1               5                   10                  15

Lys Pro Lys Lys Lys Gln Arg Trp Thr Pro Leu Glu Ile Ser Leu Ser
            20                  25                  30

Val Leu Val Leu Leu Thr Ile Ile Ala Val Thr Met Ile Ala Leu
            35                  40                  45

Tyr Ala Thr Tyr Asp Asp Gly Ile Cys Lys Ser Ser Asp Cys Ile Lys
    50                  55                  60

Ser Ala Ala Arg Leu Ile Gln Asn Met Asp Ala Thr Thr Glu Pro Cys
65                  70                  75                  80

Thr Asp Phe Phe Lys Tyr Ala Cys Gly Gly Trp Leu Lys Arg Asn Val
                85                  90                  95

Ile Pro Glu Thr Ser Ser Arg Tyr Gly Asn Phe Asp Ile Leu Arg Asp
            100                 105                 110

Glu Leu Glu Val Val Leu Lys Asp Val Leu Gln Glu Pro Lys Thr Glu
        115                 120                 125

Asp Ile Val Ala Val Gln Lys Ala Lys Ala Leu Tyr Arg Ser Cys Ile
    130                 135                 140

Asn Glu Ser Ala Ile Asp Ser Arg Gly Gly Glu Pro Leu Leu Lys Leu
145                 150                 155                 160

Leu Pro Asp Ile Tyr Gly Trp Pro Val Ala Thr Glu Asn Trp Glu Gln
                165                 170                 175

Lys Tyr Gly Ala Ser Trp Thr Ala Glu Lys Ala Ile Ala Gln Leu Asn
            180                 185                 190

Ser Lys Tyr Gly Lys Lys Val Leu Ile Asn Leu Phe Val Gly Thr Asp
        195                 200                 205

Asp Lys Asn Ser Val Asn His Val Ile His Ile Asp Gln Pro Arg Leu
    210                 215                 220

Gly Leu Pro Ser Arg Asp Tyr Tyr Glu Cys Thr Gly Ile Tyr Lys Glu
225                 230                 235                 240

Ala Cys Thr Ala Tyr Val Asp Phe Met Ile Ser Val Ala Arg Leu Ile
                245                 250                 255

Arg Gln Glu Glu Arg Leu Pro Ile Asp Glu Asn Gln Leu Ala Leu Glu
            260                 265                 270

Met Asn Lys Val Met Glu Leu Glu Lys Glu Ile Ala Asn Ala Thr Ala
        275                 280                 285

Lys Pro Glu Asp Arg Asn Asp Pro Met Leu Leu Tyr Asn Lys Met Thr
    290                 295                 300

Leu Ala Gln Ile Gln Asn Asn Phe Ser Leu Glu Ile Asn Gly Lys Pro
305                 310                 315                 320

Phe Ser Trp Leu Asn Phe Thr Asn Glu Ile Met Ser Thr Val Asn Ile
                325                 330                 335

Ser Ile Thr Asn Glu Glu Asp Val Val Val Tyr Ala Pro Glu Tyr Leu
            340                 345                 350

-continued

```
Thr Lys Leu Lys Pro Ile Leu Thr Lys Tyr Ser Ala Arg Asp Leu Gln
            355                 360                 365

Asn Leu Met Ser Trp Arg Phe Ile Met Asp Leu Val Ser Ser Leu Ser
370                 375                 380

Arg Thr Tyr Lys Glu Ser Arg Asn Ala Phe Arg Lys Ala Leu Tyr Gly
385                 390                 395                 400

Thr Thr Ser Glu Thr Ala Thr Trp Arg Arg Cys Ala Asn Tyr Val Asn
                405                 410                 415

Gly Asn Met Glu Asn Ala Val Gly Arg Leu Tyr Val Glu Ala Ala Phe
                420                 425                 430

Ala Gly Glu Ser Lys His Val Val Glu Asp Leu Ile Ala Gln Ile Arg
            435                 440                 445

Glu Val Phe Ile Gln Thr Leu Asp Asp Leu Thr Trp Met Asp Ala Glu
            450                 455                 460

Thr Lys Lys Arg Ala Glu Glu Lys Ala Leu Ala Ile Lys Glu Arg Ile
465                 470                 475                 480

Gly Tyr Pro Asp Asp Ile Val Ser Asn Asp Asn Lys Leu Asn Asn Glu
                485                 490                 495

Tyr Leu Glu Leu Asn Tyr Lys Glu Asp Glu Tyr Phe Glu Asn Ile Ile
                500                 505                 510

Gln Asn Leu Lys Phe Ser Gln Ser Lys Gln Leu Lys Lys Leu Arg Glu
            515                 520                 525

Lys Val Asp Lys Asp Glu Trp Ile Ser Gly Ala Ala Val Val Asn Ala
            530                 535                 540

Phe Tyr Ser Ser Gly Arg Asn Gln Ile Val Phe Pro Ala Gly Ile Leu
545                 550                 555                 560

Gln Pro Pro Phe Phe Ser Ala Gln Gln Ser Asn Ser Leu Asn Tyr Gly
                565                 570                 575

Gly Ile Gly Met Val Ile Gly His Glu Ile Thr His Gly Phe Asp Asp
                580                 585                 590

Asn Gly Arg Asn Phe Asn Lys Asp Gly Asp Leu Val Asp Trp Trp Thr
            595                 600                 605

Gln Gln Ser Ala Ser Asn Phe Lys Glu Gln Ser Gln Cys Met Val Tyr
            610                 615                 620

Gln Tyr Gly Asn Phe Ser Trp Asp Leu Ala Gly Gly Gln His Leu Asn
625                 630                 635                 640

Gly Ile Asn Thr Leu Gly Glu Asn Ile Ala Asp Asn Gly Gly Leu Gly
                645                 650                 655

Gln Ala Tyr Arg Ala Tyr Gln Asn Tyr Ile Lys Lys Asn Gly Glu Glu
                660                 665                 670

Lys Leu Leu Pro Gly Leu Asp Leu Asn His Lys Gln Leu Phe Phe Leu
            675                 680                 685

Asn Phe Ala Gln Val Trp Cys Gly Thr Tyr Arg Pro Glu Tyr Ala Val
            690                 695                 700

Asn Ser Ile Lys Thr Asp Val His Ser Pro Gly Asn Phe Arg Ile Ile
705                 710                 715                 720

Gly Thr Leu Gln Asn Ser Ala Glu Phe Ser Glu Ala Phe His Cys Arg
                725                 730                 735

Lys Asn Ser Tyr Met Asn Pro Glu Lys Lys Cys Arg Val Trp
                740                 745                 750

<210> SEQ ID NO 11
<211> LENGTH: 925
<212> TYPE: PRT
```

-continued

<213> ORGANISM: Artificial sequence
<220> FEATURE:
<223> OTHER INFORMATION: The ENPP1 protein

<400> SEQUENCE: 11

```
Met Glu Arg Asp Gly Cys Ala Gly Gly Ser Arg Gly Gly Glu Gly
1               5                   10                  15

Gly Arg Ala Pro Arg Glu Gly Pro Ala Gly Asn Gly Arg Asp Arg Gly
            20                  25                  30

Arg Ser His Ala Ala Glu Ala Pro Gly Asp Pro Gln Ala Ala Ser
        35                  40                  45

Leu Leu Ala Pro Met Asp Val Gly Glu Glu Pro Leu Glu Lys Ala Ala
50                  55                  60

Arg Ala Arg Thr Ala Lys Asp Pro Asn Thr Tyr Lys Val Leu Ser Leu
65                  70                  75                  80

Val Leu Ser Val Cys Val Leu Thr Thr Ile Leu Gly Cys Ile Phe Gly
                85                  90                  95

Leu Lys Pro Ser Cys Ala Lys Glu Val Lys Ser Cys Lys Gly Arg Cys
            100                 105                 110

Phe Glu Arg Thr Phe Gly Asn Cys Arg Cys Asp Ala Ala Cys Val Glu
        115                 120                 125

Leu Gly Asn Cys Cys Leu Asp Tyr Gln Glu Thr Cys Ile Glu Pro Glu
130                 135                 140

His Ile Trp Thr Cys Asn Lys Phe Arg Cys Gly Glu Lys Arg Leu Thr
145                 150                 155                 160

Arg Ser Leu Cys Ala Cys Ser Asp Asp Cys Lys Asp Lys Gly Asp Cys
                165                 170                 175

Cys Ile Asn Tyr Ser Ser Val Cys Gln Gly Glu Lys Ser Trp Val Glu
            180                 185                 190

Glu Pro Cys Glu Ser Ile Asn Glu Pro Gln Cys Pro Ala Gly Phe Glu
        195                 200                 205

Thr Pro Pro Thr Leu Leu Phe Ser Leu Asp Gly Phe Arg Ala Glu Tyr
210                 215                 220

Leu His Thr Trp Gly Gly Leu Leu Pro Val Ile Ser Lys Leu Lys Lys
225                 230                 235                 240

Cys Gly Thr Tyr Thr Lys Asn Met Arg Pro Val Tyr Pro Thr Lys Thr
                245                 250                 255

Phe Pro Asn His Tyr Ser Ile Val Thr Gly Leu Tyr Pro Glu Ser His
            260                 265                 270

Gly Ile Ile Asp Asn Lys Met Tyr Asp Pro Lys Met Asn Ala Ser Phe
        275                 280                 285

Ser Leu Lys Ser Lys Glu Lys Phe Asn Pro Glu Trp Tyr Lys Gly Glu
290                 295                 300

Pro Ile Trp Val Thr Ala Lys Tyr Gln Gly Leu Lys Ser Gly Thr Phe
305                 310                 315                 320

Phe Trp Pro Gly Ser Asp Val Glu Ile Asn Gly Ile Phe Pro Asp Ile
                325                 330                 335

Tyr Lys Met Tyr Asn Gly Ser Val Pro Phe Glu Glu Arg Ile Leu Ala
            340                 345                 350

Val Leu Gln Trp Leu Gln Leu Pro Lys Asp Glu Arg Pro His Phe Tyr
        355                 360                 365

Thr Leu Tyr Leu Glu Glu Pro Asp Ser Ser Gly His Ser Tyr Gly Pro
370                 375                 380

Val Ser Ser Glu Val Ile Lys Ala Leu Gln Arg Val Asp Gly Met Val
```

```
            385                 390                 395                 400
        Gly Met Leu Met Asp Gly Leu Lys Glu Leu Asn Leu His Arg Cys Leu
                        405                 410                 415

Asn Leu Ile Leu Ile Ser Asp His Gly Met Glu Gln Gly Ser Cys Lys
                        420                 425                 430

Lys Tyr Ile Tyr Leu Asn Lys Tyr Leu Gly Asp Val Lys Asn Ile Lys
                        435                 440                 445

Val Ile Tyr Gly Pro Ala Ala Arg Leu Arg Pro Ser Asp Val Pro Asp
                450                 455                 460

Lys Tyr Tyr Ser Phe Asn Tyr Glu Gly Ile Ala Arg Asn Leu Ser Cys
        465                 470                 475                 480

Arg Glu Pro Asn Gln His Phe Lys Pro Tyr Leu Lys His Phe Leu Pro
                        485                 490                 495

Lys Arg Leu His Phe Ala Lys Ser Asp Arg Ile Glu Pro Leu Thr Phe
                        500                 505                 510

Tyr Leu Asp Pro Gln Trp Gln Leu Ala Leu Asn Pro Ser Glu Arg Lys
                        515                 520                 525

Tyr Cys Gly Ser Gly Phe His Gly Ser Asp Asn Val Phe Ser Asn Met
                        530                 535                 540

Gln Ala Leu Phe Val Gly Tyr Gly Pro Gly Phe Lys His Gly Ile Glu
        545                 550                 555                 560

Ala Asp Thr Phe Glu Asn Ile Glu Val Tyr Asn Leu Met Cys Asp Leu
                        565                 570                 575

Leu Asn Leu Thr Pro Ala Pro Asn Asn Gly Thr His Gly Ser Leu Asn
                        580                 585                 590

His Leu Leu Lys Asn Pro Val Tyr Thr Pro Lys His Pro Lys Glu Val
                        595                 600                 605

His Pro Leu Val Gln Cys Pro Phe Thr Arg Asn Pro Arg Asp Asn Leu
                        610                 615                 620

Gly Cys Ser Cys Asn Pro Ser Ile Leu Pro Ile Glu Asp Phe Gln Thr
        625                 630                 635                 640

Gln Phe Asn Leu Thr Val Ala Glu Glu Lys Ile Ile Lys His Glu Thr
                        645                 650                 655

Leu Pro Tyr Gly Arg Pro Arg Val Leu Gln Lys Glu Asn Thr Ile Cys
                        660                 665                 670

Leu Leu Ser Gln His Gln Phe Met Ser Gly Tyr Ser Gln Asp Ile Leu
                        675                 680                 685

Met Pro Leu Trp Thr Ser Tyr Thr Val Asp Arg Asn Asp Ser Phe Ser
                        690                 695                 700

Thr Glu Asp Phe Ser Asn Cys Leu Tyr Gln Asp Phe Arg Ile Pro Leu
        705                 710                 715                 720

Ser Pro Val His Lys Cys Ser Phe Tyr Lys Asn Asn Thr Lys Val Ser
                        725                 730                 735

Tyr Gly Phe Leu Ser Pro Pro Gln Leu Asn Lys Asn Ser Ser Gly Ile
                        740                 745                 750

Tyr Ser Glu Ala Leu Leu Thr Thr Asn Ile Val Pro Met Tyr Gln Ser
                        755                 760                 765

Phe Gln Val Ile Trp Arg Tyr Phe His Asp Thr Leu Leu Arg Lys Tyr
                        770                 775                 780

Ala Glu Glu Arg Asn Gly Val Asn Val Val Ser Gly Pro Val Phe Asp
        785                 790                 795                 800

Phe Asp Tyr Asp Gly Arg Cys Asp Ser Leu Glu Asn Leu Arg Gln Lys
                        805                 810                 815
```

```
Arg Arg Val Ile Arg Asn Gln Glu Ile Leu Ile Pro Thr His Phe Phe
            820                 825                 830

Ile Val Leu Thr Ser Cys Lys Asp Thr Ser Gln Thr Pro Leu His Cys
            835                 840                 845

Glu Asn Leu Asp Thr Leu Ala Phe Ile Leu Pro His Arg Thr Asp Asn
850                 855                 860

Ser Glu Ser Cys Val His Gly Lys His Asp Ser Ser Trp Val Glu Glu
865                 870                 875                 880

Leu Leu Met Leu His Arg Ala Arg Ile Thr Asp Val Glu His Ile Thr
                885                 890                 895

Gly Leu Ser Phe Tyr Gln Gln Arg Lys Glu Pro Val Ser Asp Ile Leu
                900                 905                 910

Lys Leu Lys Thr His Leu Pro Thr Phe Ser Gln Glu Asp
            915                 920                 925

<210> SEQ ID NO 12
<211> LENGTH: 923
<212> TYPE: PRT
<213> ORGANISM: Artificial sequence
<220> FEATURE:
<223> OTHER INFORMATION: The NRP1 protein

<400> SEQUENCE: 12

Met Glu Arg Gly Leu Pro Leu Leu Cys Ala Val Leu Ala Leu Val Leu
1               5                   10                  15

Ala Pro Ala Gly Ala Phe Arg Asn Asp Lys Cys Gly Asp Thr Ile Lys
            20                  25                  30

Ile Glu Ser Pro Gly Tyr Leu Thr Ser Pro Gly Tyr Pro His Ser Tyr
        35                  40                  45

His Pro Ser Glu Lys Cys Glu Trp Leu Ile Gln Ala Pro Asp Pro Tyr
    50                  55                  60

Gln Arg Ile Met Ile Asn Phe Asn Pro His Phe Asp Leu Glu Asp Arg
65                  70                  75                  80

Asp Cys Lys Tyr Asp Tyr Val Glu Val Phe Asp Gly Glu Asn Glu Asn
                85                  90                  95

Gly His Phe Arg Gly Lys Phe Cys Gly Lys Ile Ala Pro Pro Pro Val
            100                 105                 110

Val Ser Ser Gly Pro Phe Leu Phe Ile Lys Phe Val Ser Asp Tyr Glu
        115                 120                 125

Thr His Gly Ala Gly Phe Ser Ile Arg Tyr Glu Ile Phe Lys Arg Gly
    130                 135                 140

Pro Glu Cys Ser Gln Asn Tyr Thr Thr Pro Ser Gly Val Ile Lys Ser
145                 150                 155                 160

Pro Gly Phe Pro Glu Lys Tyr Pro Asn Ser Leu Glu Cys Thr Tyr Ile
                165                 170                 175

Val Phe Val Pro Lys Met Ser Glu Ile Ile Leu Glu Phe Glu Ser Phe
            180                 185                 190

Asp Leu Glu Pro Asp Ser Asn Pro Pro Gly Gly Met Phe Cys Arg Tyr
        195                 200                 205

Asp Arg Leu Glu Ile Trp Asp Gly Phe Pro Asp Val Gly Pro His Ile
    210                 215                 220

Gly Arg Tyr Cys Gly Gln Lys Thr Pro Gly Arg Ile Arg Ser Ser Ser
225                 230                 235                 240

Gly Ile Leu Ser Met Val Phe Tyr Thr Asp Ser Ala Ile Ala Lys Glu
                245                 250                 255
```

-continued

```
Gly Phe Ser Ala Asn Tyr Ser Val Leu Gln Ser Ser Val Ser Glu Asp
            260                 265                 270

Phe Lys Cys Met Glu Ala Leu Gly Met Glu Ser Gly Glu Ile His Ser
            275                 280                 285

Asp Gln Ile Thr Ala Ser Ser Gln Tyr Ser Thr Asn Trp Ser Ala Glu
            290                 295                 300

Arg Ser Arg Leu Asn Tyr Pro Glu Asn Gly Trp Thr Pro Gly Glu Asp
305                 310                 315                 320

Ser Tyr Arg Glu Trp Ile Gln Val Asp Leu Gly Leu Leu Arg Phe Val
            325                 330                 335

Thr Ala Val Gly Thr Gln Gly Ala Ile Ser Lys Glu Thr Lys Lys Lys
            340                 345                 350

Tyr Tyr Val Lys Thr Tyr Lys Ile Asp Val Ser Ser Asn Gly Glu Asp
            355                 360                 365

Trp Ile Thr Ile Lys Glu Gly Asn Lys Pro Val Leu Phe Gln Gly Asn
            370                 375                 380

Thr Asn Pro Thr Asp Val Val Ala Val Phe Pro Lys Pro Leu Ile
385                 390                 395                 400

Thr Arg Phe Val Arg Ile Lys Pro Ala Thr Trp Glu Thr Gly Ile Ser
            405                 410                 415

Met Arg Phe Glu Val Tyr Gly Cys Lys Ile Thr Asp Tyr Pro Cys Ser
            420                 425                 430

Gly Met Leu Gly Met Val Ser Gly Leu Ile Ser Asp Ser Gln Ile Thr
            435                 440                 445

Ser Ser Asn Gln Gly Asp Arg Asn Trp Met Pro Glu Asn Ile Arg Leu
            450                 455                 460

Val Thr Ser Arg Ser Gly Trp Ala Leu Pro Pro Ala Pro His Ser Tyr
465                 470                 475                 480

Ile Asn Glu Trp Leu Gln Ile Asp Leu Gly Glu Glu Lys Ile Val Arg
            485                 490                 495

Gly Ile Ile Ile Gln Gly Gly Lys His Arg Glu Asn Lys Val Phe Met
            500                 505                 510

Arg Lys Phe Lys Ile Gly Tyr Ser Asn Asn Gly Ser Asp Trp Lys Met
            515                 520                 525

Ile Met Asp Asp Ser Lys Arg Lys Ala Lys Ser Phe Glu Gly Asn Asn
530                 535                 540

Asn Tyr Asp Thr Pro Glu Leu Arg Thr Phe Pro Ala Leu Ser Thr Arg
545                 550                 555                 560

Phe Ile Arg Ile Tyr Pro Glu Arg Ala Thr His Gly Gly Leu Gly Leu
            565                 570                 575

Arg Met Glu Leu Leu Gly Cys Glu Val Glu Ala Pro Thr Ala Gly Pro
            580                 585                 590

Thr Thr Pro Asn Gly Asn Leu Val Asp Glu Cys Asp Asp Gln Ala
            595                 600                 605

Asn Cys His Ser Gly Thr Gly Asp Asp Phe Gln Leu Thr Gly Gly Thr
            610                 615                 620

Thr Val Leu Ala Thr Glu Lys Pro Thr Val Ile Asp Ser Thr Ile Gln
625                 630                 635                 640

Ser Glu Phe Pro Thr Tyr Gly Phe Asn Cys Glu Phe Gly Trp Gly Ser
            645                 650                 655

His Lys Thr Phe Cys His Trp Glu His Asp Asn His Val Gln Leu Lys
            660                 665                 670
```

-continued

```
Trp Ser Val Leu Thr Ser Lys Thr Gly Pro Ile Gln Asp His Thr Gly
        675                 680                 685

Asp Gly Asn Phe Ile Tyr Ser Gln Ala Asp Glu Asn Gln Lys Gly Lys
690             695                 700

Val Ala Arg Leu Val Ser Pro Val Val Tyr Ser Gln Asn Ser Ala His
705                 710                 715                 720

Cys Met Thr Phe Trp Tyr His Met Ser Gly Ser His Val Gly Thr Leu
                725                 730                 735

Arg Val Lys Leu Arg Tyr Gln Lys Pro Glu Glu Tyr Asp Gln Leu Val
            740                 745                 750

Trp Met Ala Ile Gly His Gln Gly Asp His Trp Lys Glu Gly Arg Val
        755                 760                 765

Leu Leu His Lys Ser Leu Lys Leu Tyr Gln Val Ile Phe Glu Gly Glu
    770                 775                 780

Ile Gly Lys Gly Asn Leu Gly Gly Ile Ala Val Asp Asp Ile Ser Ile
785                 790                 795                 800

Asn Asn His Ile Ser Gln Glu Asp Cys Ala Lys Pro Ala Asp Leu Asp
                805                 810                 815

Lys Lys Asn Pro Glu Ile Lys Ile Asp Glu Thr Gly Ser Thr Pro Gly
            820                 825                 830

Tyr Glu Gly Glu Gly Glu Gly Asp Lys Asn Ile Ser Arg Lys Pro Gly
        835                 840                 845

Asn Val Leu Lys Thr Leu Asp Pro Ile Leu Ile Thr Ile Ile Ala Met
    850                 855                 860

Ser Ala Leu Gly Val Leu Leu Gly Ala Val Cys Gly Val Val Leu Tyr
865                 870                 875                 880

Cys Ala Cys Trp His Asn Gly Met Ser Glu Arg Asn Leu Ser Ala Leu
                885                 890                 895

Glu Asn Tyr Asn Phe Glu Leu Val Asp Gly Val Lys Leu Lys Lys Asp
            900                 905                 910

Lys Leu Asn Thr Gln Ser Thr Tyr Ser Glu Ala
        915                 920
```

TREATMENT OF CANCER METASTASIS BY TARGETING EXOSOME PROTEINS

CROSS-REFERENCE TO RELATED APPLICATIONS

This PCT application claims the priority benefit of U.S. Provisional Application No. 62/800,930, filed Feb. 4, 2019, which is herein incorporated by reference in its entirety.

REFERENCE TO SEQUENCE LISTING SUBMITTED ELECTRONICALLY VIA EFS-WEB

The content of the electronically submitted sequence listing in ASCII text file (Name: 4000_030_PC02_SeqListing_ST25.txt; Size: 87,321; and Date of Creation: Feb. 3, 2020) filed with the application is herein incorporated by reference in its entirety.

FIELD OF THE DISCLOSURE

The present disclosure relates to methods of treating cancer metastasis by inducing clearance of extracellular vesicles ("EVs").

1. BACKGROUND OF THE DISCLOSURE

One of the greatest problems in the treatment of cancerous tumors is metastasis, i.e., the transmission of cells of the primary tumor to other locations in the patient and the establishment of new tumors at such locations. Metastasis is difficult to control because it often occurs before the primary tumor is diagnosed and treated. Also, the metastatic lesions may be locations which limit the effective dosages of the treatments, e.g., radiation, due to the sensitivity of the surrounding tissue to such treatments. Further, metastatic cells are heterogeneous and cells which are resistant to conventional therapy tend to emerge. Therefore, metastasis remains the main cause of cancer mortality for many types of cancer.

Conventional methods for treating metastasis include surgery, radiotherapy and/or chemotherapy. Other approaches including the use of hyperthermia, radiation sensitizing and protective drugs, and stimulated macrophages have been tried. More recently, several metastatic suppressor candidates, such as intercellular communication factors (e.g., NM23-H1/H2, KISS1 and RHOGDI2), cell surface proteins and receptors (e.g., KAI1 [CD82]), and transcription factors (e.g., LSD1), were identified. Drugs that recover these metastatic suppressor candidates were developed, such as medroxyprogesterone acetate, which targets NM23, and atrasentan, which is an endothelin receptor antagonist regulated by RhoGDI2. However, most of these drugs were found ineffective in clinical trials.

Therefore, new therapeutic methods are needed for treating cancer by preventing and suppressing metastasis.

2. SUMMARY OF THE DISCLOSURE

The present disclosure provides a therapeutic method of treating cancer metastasis by inducing clearance of extracellular vesicles ("EVs") using a binding agent specific to an EV protein. Specifically, the method utilizes one or more binding agents specific to EV proteins, such as prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and a class of ATP transporter proteins (ATP1A1, ATP1A2, ATP1A3, ATP1A4, ATP1B3, ATP2B1, ATP2B2, ATP2B3, ATP2B4). Clearance of EVs using binding agents specific to one or more of these EV proteins reduces or prevents cancer metastasis, by inhibiting activities of EVs released from cancer cells that support cancer metastasis at multiple stages, such as angiogenesis at the primary tumor, immune reaction modulation, modification of the microenvironment, preparation of metastasis-supportive microenvironments (pre-metastatic niche), and even the determination of organ specificity in metastasis.

Administration of antibodies specific to an EV protein removes EVs in vivo, for example, by inducing internalization of EVs by macrophages. A binding agent can be also used to remove EVs ex vivo, for example, with an affinity platform technology removing EVs bound to the binding agent. Therefore, the present disclosure provides effective methods for decreasing tumor metastasis. The present disclosure further provides a pharmaceutical composition for treatment of cancer metastasis comprising the binding agent and a pharmaceutically acceptable carrier.

Accordingly, in one aspect, the present disclosure provides: a method of treating cancer metastasis by administering to a subject with cancer an effective amount of a binding agent that specifically binds to an EV protein, wherein the EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein.

In some embodiments, the effective amount is sufficient to induce clearance of EVs in the subject. In some embodiments, the clearance comprises reduction of the concentration of EVs expressing the EV protein in the subject. In some embodiments, the clearance comprises reduction of the concentration of EVs in the subject by at least 10%, 20%, 30%, 40%, 50%, 60%, 70%, 80%, 90% or 95%. In some embodiments, the clearance comprises reduction of the concentration of EVs expressing the EV protein in the subject by at least 10%, 20%, 30%, 40%, 50%, 60%, 70%, 80%, 90% or 95%. In some embodiments, the clearance comprises reduction of the concentration of EVs released from cancer cells in the subject by at least 10%, 20%, 30%, 40%, 50%, 60%, 70%, 80%, 90%, or 95%. In some embodiments, the concentration of EVs are measured in blood of the subject. In some embodiments, the concentration of EVs is measured in the lymph fluid, saliva, urine, semen or breast milk of the subject.

In some embodiments, the subject has metastatic cancer. In some embodiments, the subject does not have metastatic cancer.

In some embodiments, the EV protein is expressed on EVs released from cancer cells of the subject. In some embodiments, the method further comprises the step of identifying the EV protein present on EVs released from cancer cells of the subject.

In some embodiments, the binding agent binds to the EV protein with a $K_D$ of less than 500 nM. In some embodiments, the binding agent binds to the EV protein with a $K_D$ of less than 200 nM. In some embodiments, the binding agent binds to the EV protein with a $K_D$ of less than 50 nM.

In some embodiments, the binding agent comprises an antigen binding protein (ABP). In some embodiments, the binding agent comprises an antibody fragment, scFab, or scFv. In some embodiments, the binding agent comprises an immunoglobulin constant region. In some embodiments, the binding agent is a divalent or a multivalent antibody.

In some embodiments, the binding agent comprises an aptamer, or a receptor or ligand against the EV protein.

In some embodiments, the EV protein is ATP transporter protein, wherein the ATP transporter is selected from the group consisting of: ATP1A1, ATP1A2, ATP1A3, ATP1A4, ATP1B3, ATP2B1, ATP2B2, ATP2B3, ATP2B4.

In some embodiments, the EV protein is PTGFRN.

In some embodiments, the method further comprises the step of administering to the subject a second binding agent that specifically binds to a second EV protein, wherein the second EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein.

In some embodiments, the step of administering the second binding agent is performed concurrently with the step of administering the binding agent. In some embodiments, the step of administering the second binding agent is performed separately from the step of administering the binding agent. In some embodiments, the binding agent and the second binding agent are different.

In another aspect, the present disclosure provides a method of treating cancer metastasis comprising the steps of: a. treating blood from a subject with cancer ex vivo with an effective amount of a binding agent that specifically binds to an EV protein, wherein the EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein, and b. reinfusing treated blood to the subject.

In some embodiments, the effective amount is sufficient to induce clearance of EVs in the blood. In some embodiments, the clearance comprises reduction of the concentration of EVs expressing the EV protein in the blood. In some embodiments, the clearance comprises reduction of the concentration of EVs in the blood by at least 10%, 20%, 30%, 40%, 50%, 60%, 70%, 80%, 90% or 95%. 30. In some embodiments, the clearance comprises reduction of the concentration of EVs expressing the EV protein in the blood by at least 10%, 20%, 30%, 40%, 50%, 60%, 70%, 80%, 90% or 95%. In some embodiments, the clearance comprises reduction of the concentration of EVs released from cancer cells in the blood by at least 10%, 20%, 30%, 40%, 50%, 60%, 70%, 80%, 90%, or 95%.

In some embodiments, the subject has metastatic cancer. In some embodiments, the subject does not have metastatic cancer.

In some embodiments, the EV protein is expressed on EVs released from cancer cells of the subject. In some embodiments, the method further comprises the step of identifying the EV protein present on EVs released from cancer cells of the subject.

In some embodiments, the binding agent binds to the EV protein with a $K_D$ of less than 500 nM. In some embodiments, the binding agent binds to the EV protein with a $K_D$ of less than 200 nM. In some embodiments, the binding agent binds to the EV protein with a $K_D$ of less than 50 nM.

In some embodiments, the binding agent comprises an antigen binding protein (ABP). In some embodiments, the binding agent comprises an antibody fragment, scFab, or scFv. In some embodiments, the binding agent comprises an immunoglobulin constant region. In some embodiments, the binding agent is a divalent or a multivalent antibody.

In some embodiments, the binding agent comprises an aptamer, or a receptor or ligand against the EV protein.

In some embodiments, the EV protein is ATP transporter protein, wherein the ATP transporter is selected from the group consisting of: ATP1A1, ATP1A2, ATP1A3, ATP1A4, ATP1B3, ATP2B1, ATP2B2, ATP2B3, ATP2B4.

In some embodiments, the EV protein is PTGFRN.

In some embodiments, the method further comprises the step of administering to the subject a second binding agent that specifically binds to a second EV protein, wherein the second EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein.

In some embodiments, the step of administering the second binding agent is performed concurrently with the step of administering the binding agent. In some embodiments, the step of administering the second binding agent is performed separately from the step of administering the binding agent. In some embodiments, the binding agent and the second binding agent are different.

In yet another aspect, the present disclosure provides a pharmaceutical composition comprising a binding agent that specifically binds to an EV protein, and a pharmaceutically acceptable carrier, wherein the EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein.

In some embodiments, the pharmaceutical composition comprises the binding agent in an amount sufficient to induce clearance of EVs released from cancer cells when administered to a subject. In some embodiments, the clearance comprises reduction of the concentration of EVs expressing the EV protein. In some embodiments, the clearance comprises reduction of the concentration of EVs in the subject by at least 10%, 20%, 30%, 40%, 50%, 60%, 70%, 80%, 90% or 95%. In some embodiments, the clearance comprises reduction of the concentration of EVs expressing the EV protein in the subject by at least 10%, 20%, 30%, 40%, 50%, 60%, 70%, 80%, 90% or 95%. In some embodiments, the clearance comprises reduction of the concentration of EVs released from cancer cells in the subject by at least 10%, 20%, 30%, 40%, 50%, 60%, 70%, 80%, 90%, or 95%. In some embodiments, the concentration of EVs are measured in blood of the subject.

In some embodiments, the binding agent binds the EV protein with a $K_D$ of less than 500 nM. In some embodiments, the binding agent binds to the EV protein with a $K_D$ of less than 200 nM. In some embodiments, the binding agent binds to the EV protein with a $K_D$ of less than 50 nM.

In some embodiments, the EV protein is ATP transporter protein, wherein the ATP transporter is selected from the group consisting of: ATP1A1, ATP1A2, ATP1A3, ATP1A4, ATP1B3, ATP2B1, ATP2B2, ATP2B3, and ATP2B4. In some embodiments, the EV protein is PTGFRN.

In some embodiments, the binding agent comprises an antibody fragment. In some embodiments, the binding agent comprises an immunoglobulin constant region. In some embodiments, the binding agent is a divalent or a multivalent antibody.

In some embodiments, the binding agent binds to two EV proteins, each of the two EV proteins is selected from the group consisting of prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein.

Certain aspects of the present disclosure are directed to a method of treating cancer metastasis comprising administering to a subject with cancer an effective amount of a binding agent that specifically binds to an extracellular vesicle (EV) protein, wherein the EV protein is selected from the group consisting of: CD13 (aminopeptidase N), MME (neprilysin), ENPP1 (ectonucleotide pyrophosphatase/phosphodiesterase family member 1), or NRP1 (neuropilin-1).

Certain aspects of the present disclosure are directed to a method of treating cancer metastasis comprising: (a) treating blood from a subject with cancer ex vivo with an effective amount of a binding agent that specifically binds to an EV protein, wherein the EV protein is selected from the group consisting of: CD13 (aminopeptidase N), MME (neprilysin), ENPP1 (ectonucleotide pyrophosphatase/phosphodiesterase family member 1), or NRP1 (neuropilin-1); and (b) reinfusing the treated blood to the subject.

In some aspects, the effective amount is sufficient to induce clearance of EVs in the subject. In some aspects, the subject has metastatic cancer. In some aspects, the EV protein is expressed on EVs released from cancer cells of the subject.

In some aspects, the binding agent binds to the EV protein with a $K_D$ of less than about 500 nM, less than about 200 nM, or less than about 50 nM. In some aspects, the binding agent comprises an antigen binding protein (ABP). In some aspects, the binding agent further comprises an immunoglobulin constant region. In some aspects, the binding agent comprises an antibody fragment, scFab, or scFv. In some aspects, the binding agent is a divalent or a multivalent antibody or antibody fragment. In some aspects, the binding agent is a human, humanized, or chimeric antibody. In some aspects, the binding agent comprises an aptamer, or a receptor or ligand against the EV protein.

In some aspects, the method further comprises administering to the subject a second binding agent that specifically binds to a second EV protein, wherein the second EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); an ATP transporter protein; CD13 (aminopeptidase N); MME (neprilysin); ENPP1 (ectonucleotide pyrophosphatase/phosphodiesterase family member 1); and NRP1 (neuropilin-1).

In some aspects, the administration of the second binding agent is performed concurrently with the administration of the binding agent. In some aspects, the administration of the second binding agent is performed separately from the administration of the binding agent. In some aspects, the binding agent and the second binding agent are different.

Certain aspects of the present disclosure are directed to a pharmaceutical composition comprising a binding agent that specifically binds to an EV protein, and a pharmaceutically acceptable carrier, wherein the EV protein is selected from the group consisting of: CD13 (aminopeptidase N), MME (neprilysin), ENPP1 (ectonucleotide pyrophosphatase/phosphodiesterase family member 1), and NRP1 (neuropilin-1).

In some aspects, the binding agent in an amount sufficient to induce clearance of EVs released from cancer cells when administered to a subject.

In some aspects, the binding agent binds the EV protein with a $K_D$ of less than about 500 nM, less than about 200 nM, or less than about 50 nM. In some aspects, the binding agent comprises an antibody fragment. In some aspects, the binding agent further comprises an immunoglobulin constant region. In some aspects, the binding agent is a divalent or a multivalent antibody.

In some aspects, the binding agent binds to two EV proteins, each of the two EV proteins is selected from the group consisting of prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); ATP transporter protein; CD13 (aminopeptidase N); MME (neprilysin); ENPP1 (ectonucleotide pyrophosphatase/phosphodiesterase family member 1); or NRP1 (neuropilin-1).

3. BRIEF DESCRIPTION OF THE DRAWINGS

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

FIG. 1 provides an image of sample-containing OPTIPREP™ density gradient after ultracentrifugation. Marked with brackets are the top fraction containing exosomes ("Top"), the middle fraction containing cell debris ("Middle") and the bottom fraction containing high density aggregates and cellular debris ("Bottom").

Figure 2:
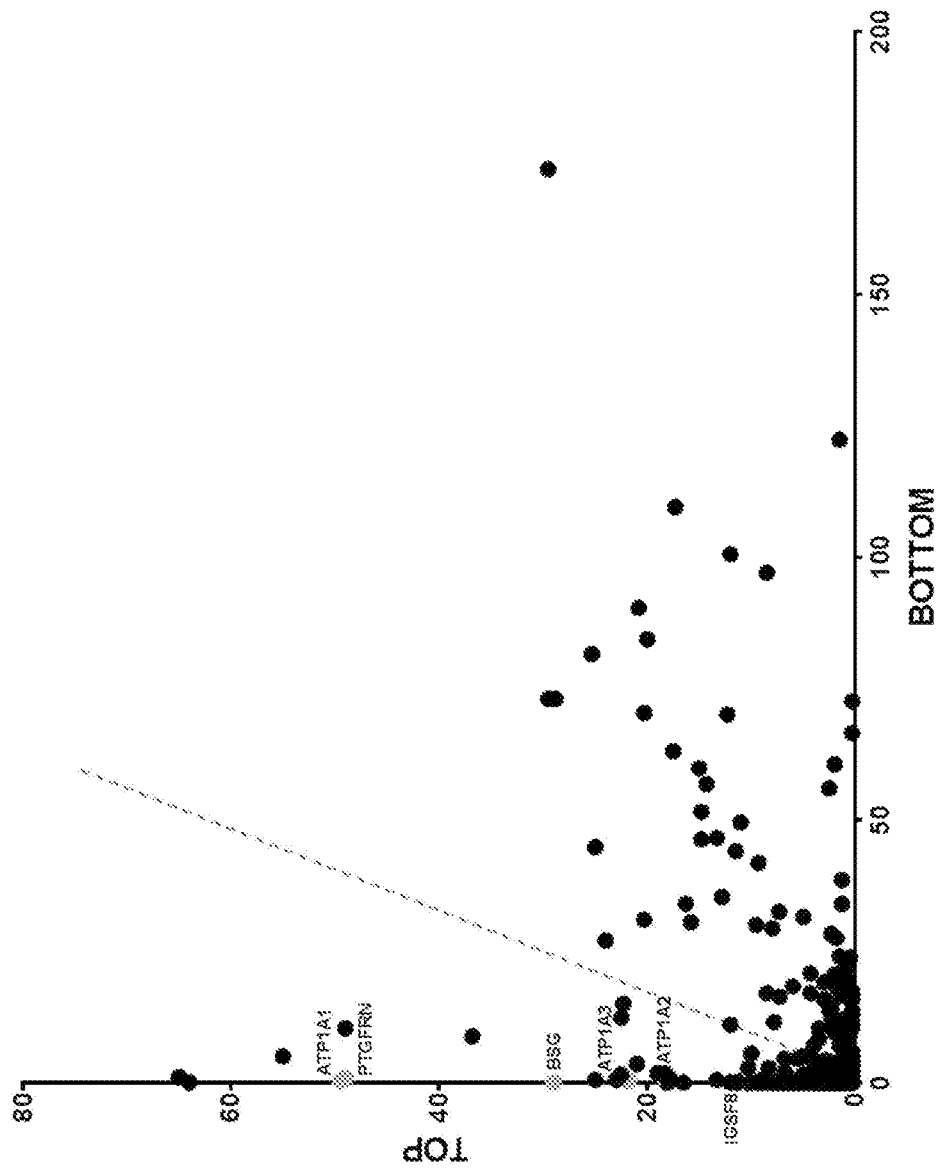

FIG. 2 is a dot-graph showing proteins identified from the top fraction (Y-axis) and proteins identified from the bottom fraction (X-axis) of OPTIPREP™ ultracentrifugation. Proteins plotted above the dotted line represent exosome-enriched proteins, while those below the dotted line represent proteins not specific to exosomes.

FIG. 3 provides a tryptic peptide coverage map of PTGFRN.

FIG. 4 provides a tryptic peptide coverage map of IGSF8.

FIG. 5 provides a tryptic peptide coverage map of Basigin (BSG).

Figures 6A, 6B:
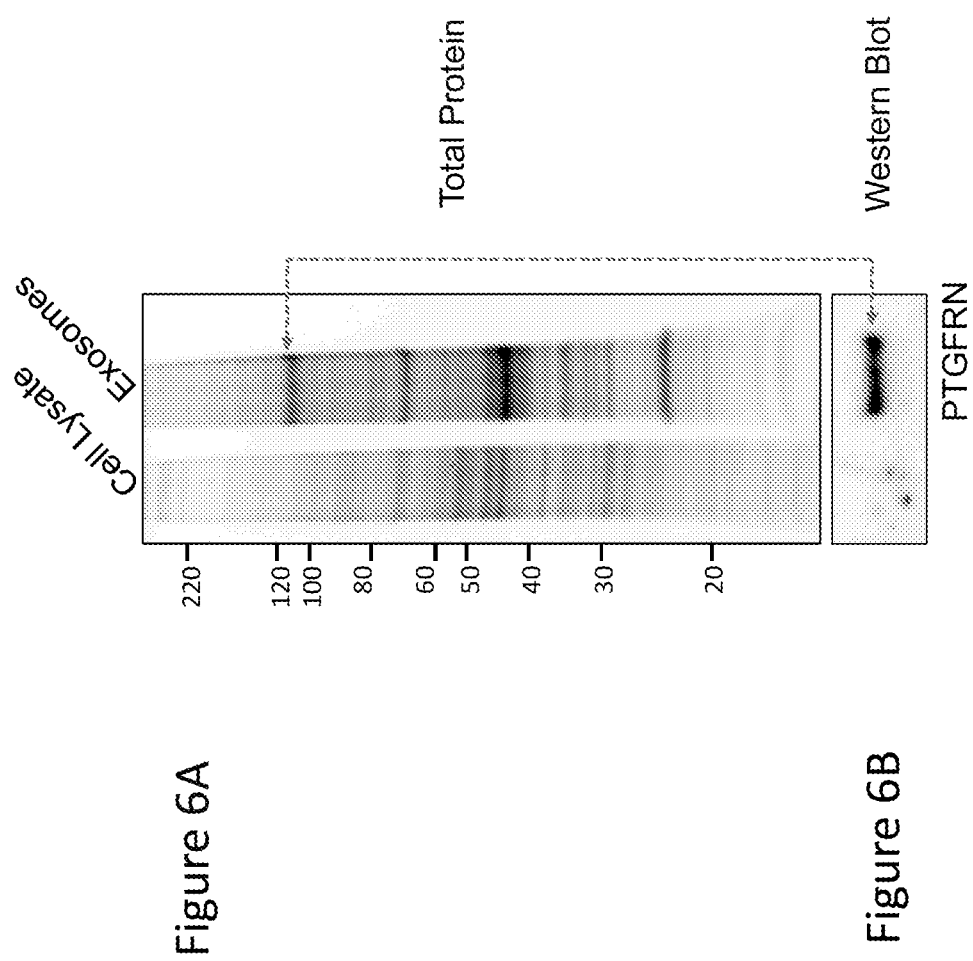

FIG. 6A shows a picture from protein blotting of total cell lysate (left) and purified exosome populations (right) collected from HEK293 cells. FIG. 6B shows a result of western blotting of the gel provided in FIG. 6A with an antibody against PTGFRN. The band detected on the right column corresponds to a band at ~110 kDa in FIG. 6A.

Figures 7A, 7B:
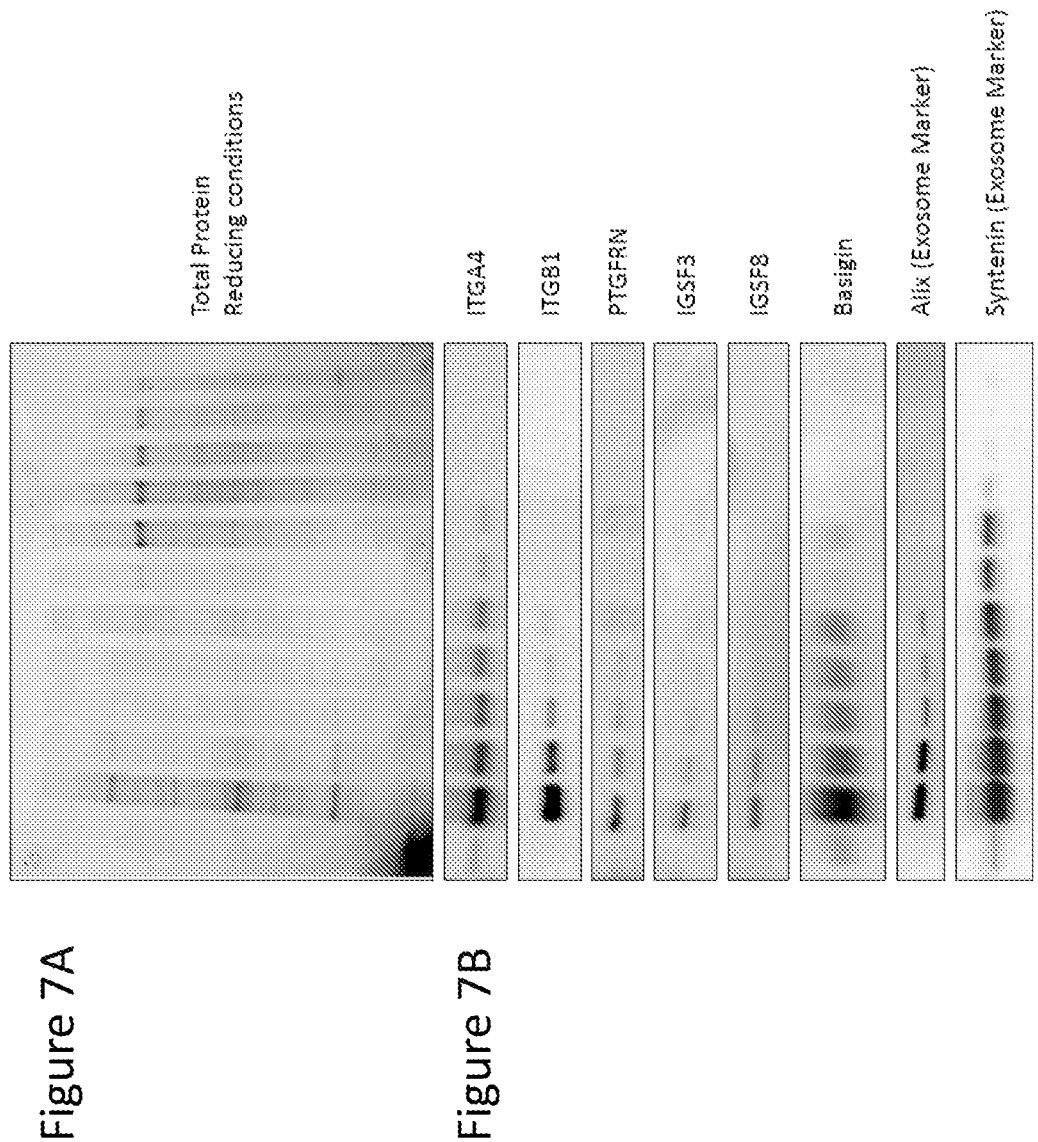

FIG. 7A shows protein blotting of twelve fractions collected from a purification using self-forming OPTIPREP™ gradients. FIG. 7B shows a result of western blotting of the gel presented in FIG. 7A with antibodies against ITGA4, ITGB1, PTGFRN, IGSF3, IGSF8, Basigin, Alix, or Syntenin. Each of the novel exosome surface proteins (ITGA4, ITGB1, PTGFRN, IGSF8, Basigin) is detected in the same fractions as the well-known exosome marker proteins (Alix, Syntenin).

Figure 8:
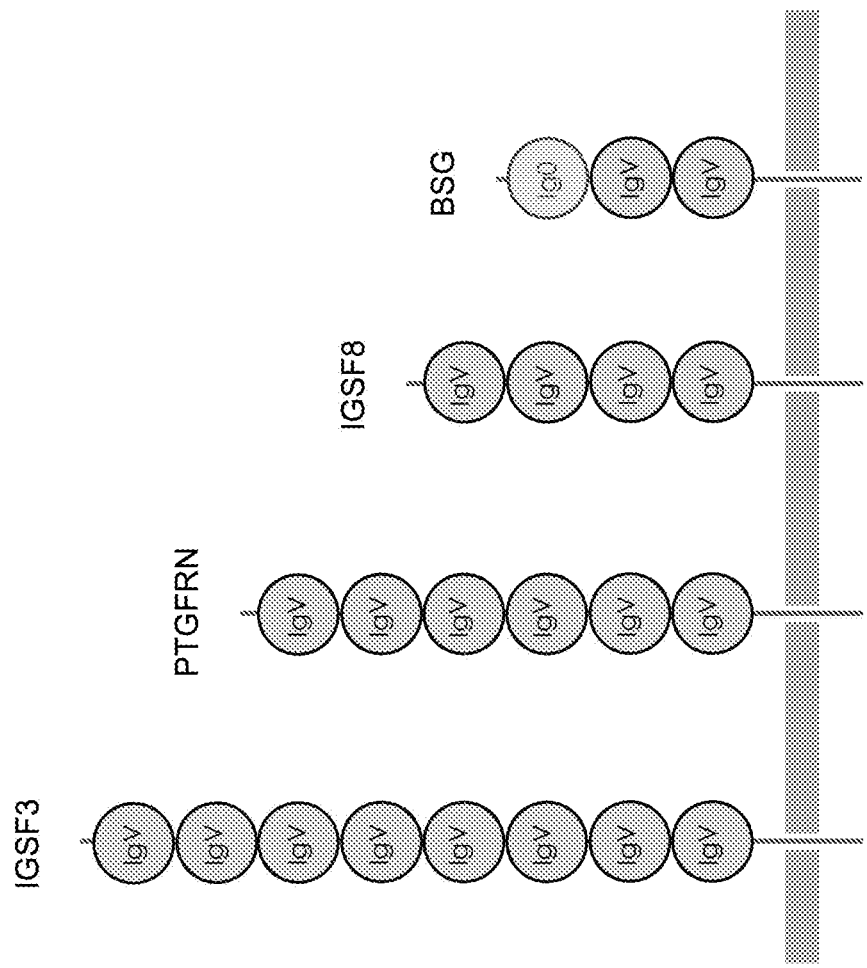

FIG. 8 illustrates exosome surface proteins (ITGA4, ITGB1, PTGFRN, IGSF8, BSG) that are used for various embodiments of the present disclosure, for example, for targeting a fusion protein on the surface of an exosome, or as a target for affinity purification of an exosome.

FIG. 9 provides the number of peptide spectrum matches (PSMs) of surface proteins (PTGFRN, IGSF8, IGSF3, BSG, SLC3A2, ITGB1, CD81, and CD9) for exosomes purified from various cell lines of different origins (HEK293SF, kidney; HT1080, connective tissue; K562, bone marrow; MDA-MB-231, breast; Raji, lymphoblast; mesenchymal stem cell (MSC), bone marrow).

Figure 10:
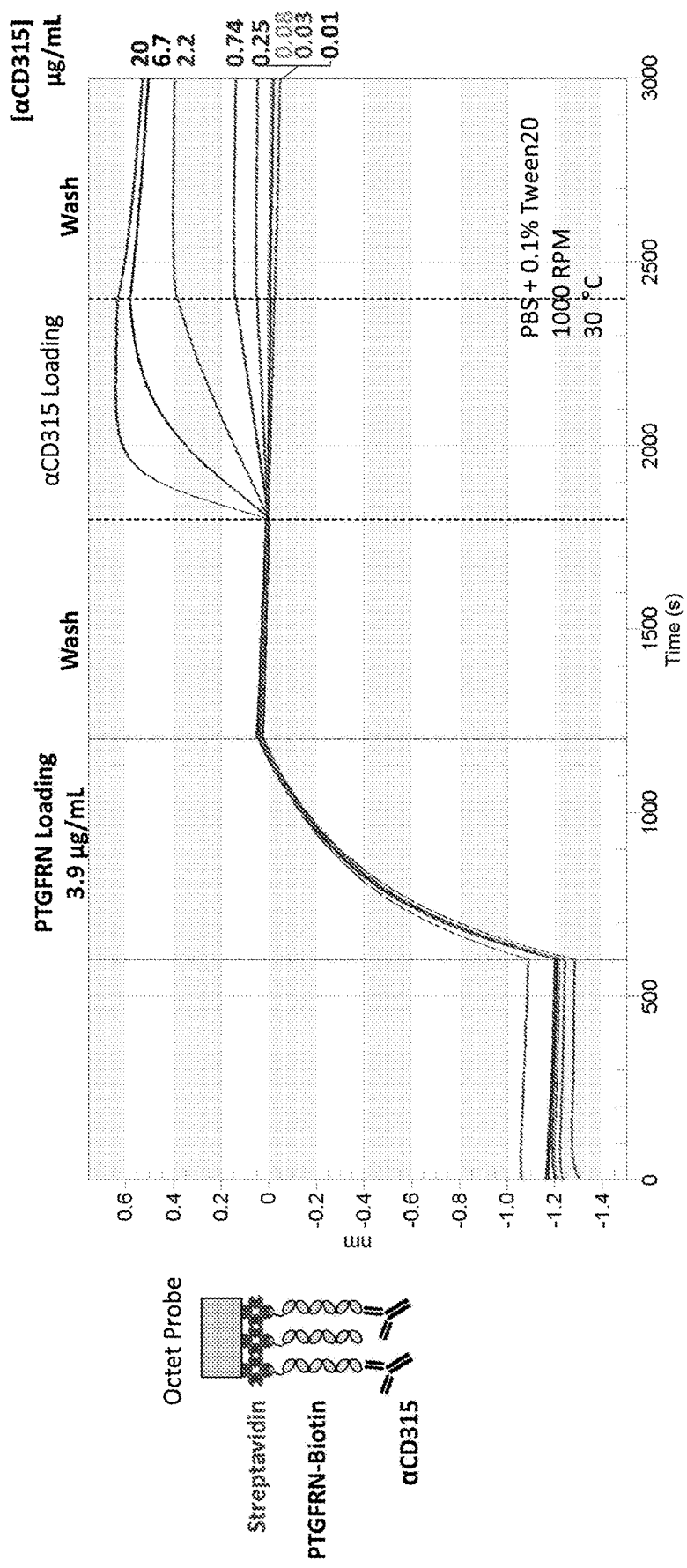

FIG. 10 provides bio-layer interferometry (BLI) results for studying the interaction between PTGFRN and anti-CD315 antibody in the presence of increasing concentrations of anti-CD315 antibody.

Figure 11:
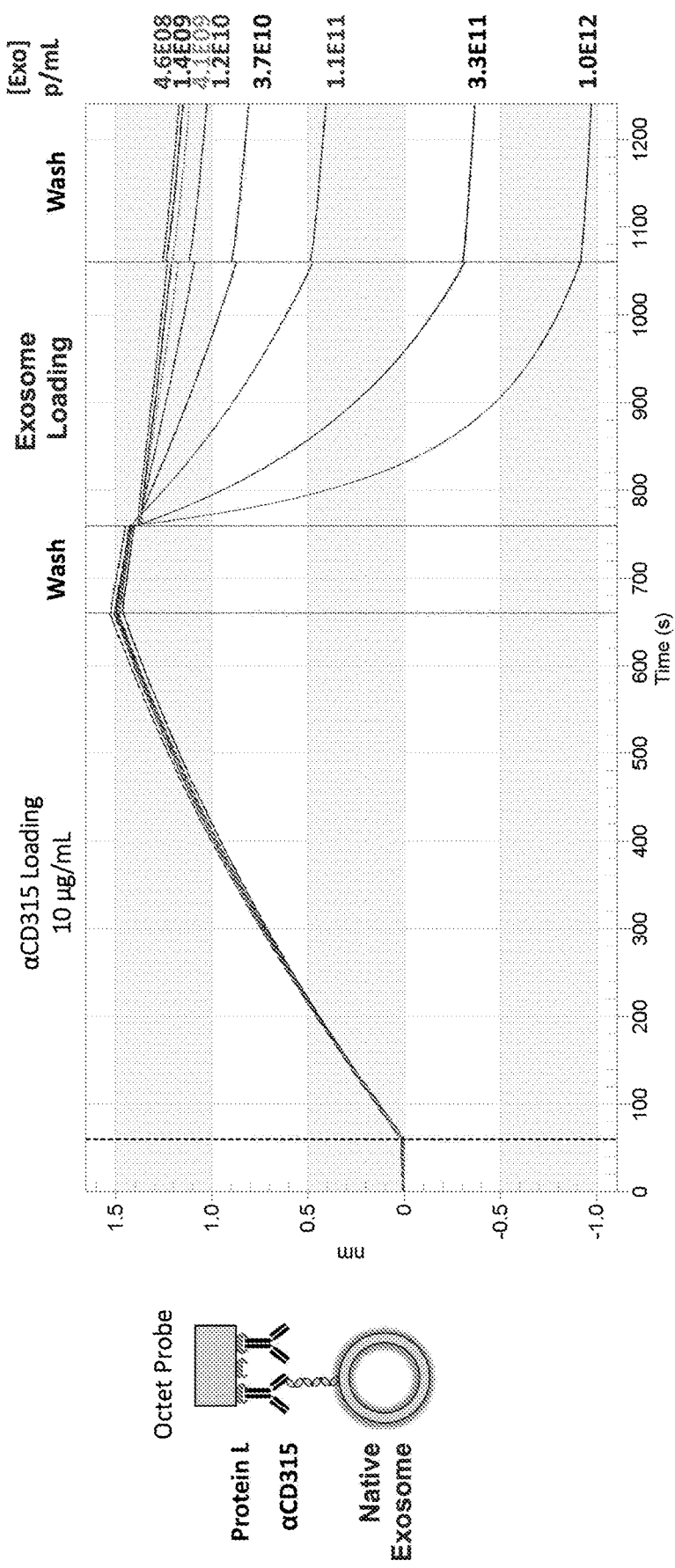

FIG. 11 provides bio-layer interferometry (BLI) results for studying the interaction between anti-CD315 antibody and native exosomes in the presence of increasing concentrations of native exosomes isolated from HEK293.

Figure 12:
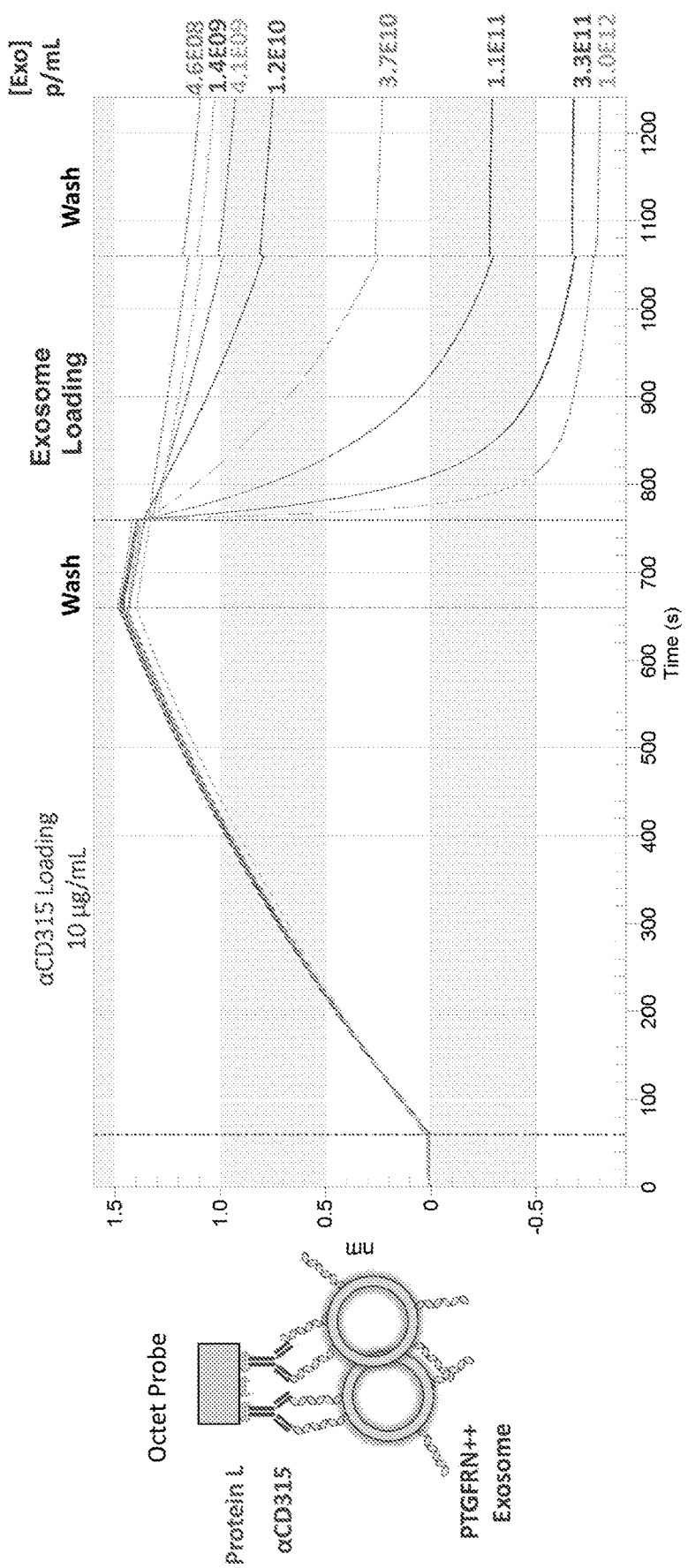

FIG. 12 provides bio-layer interferometry (BLI) results for studying the interaction between anti-CD315 antibody and exosomes modified to overexpress PTGFRN (PTG-FRN++ exosomes) in the presence of increasing concentrations of the modified exosomes.

Figure 13:
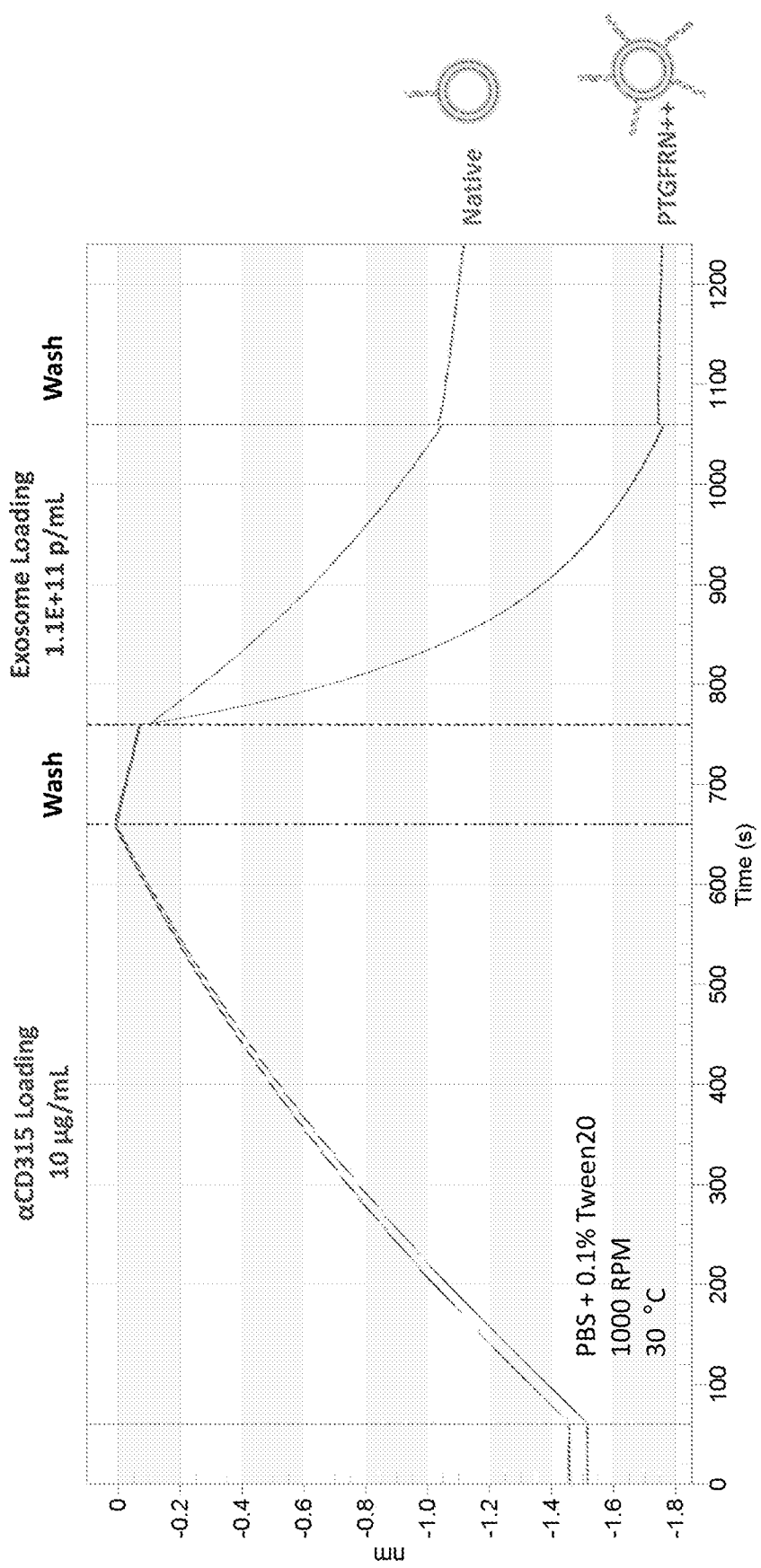

FIG. 13 provides bio-layer interferometry (BLI) results for comparing the interaction between anti-CD315 antibody and native exosomes, or between anti-CD315 antibody and modified exosomes overexpressing PTGFRN (PTG-FRN++).

Figure 14:
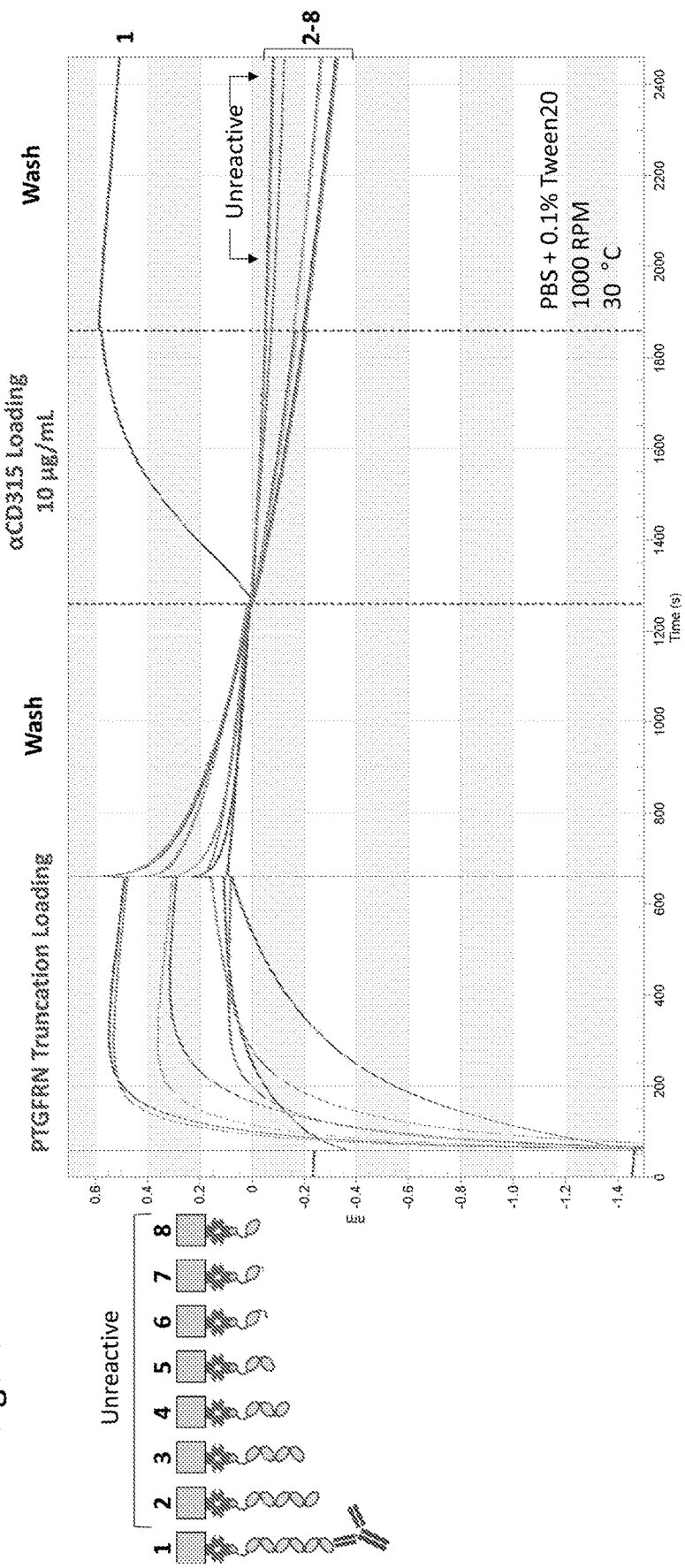

FIG. 14 provides bio-layer interferometry (BLI) results for studying the interaction between anti-CD315 antibody and full-length PTGFRN or between anti-CD315 antibody and a series of truncated mutants of PTGFRN.

Figure 15B:
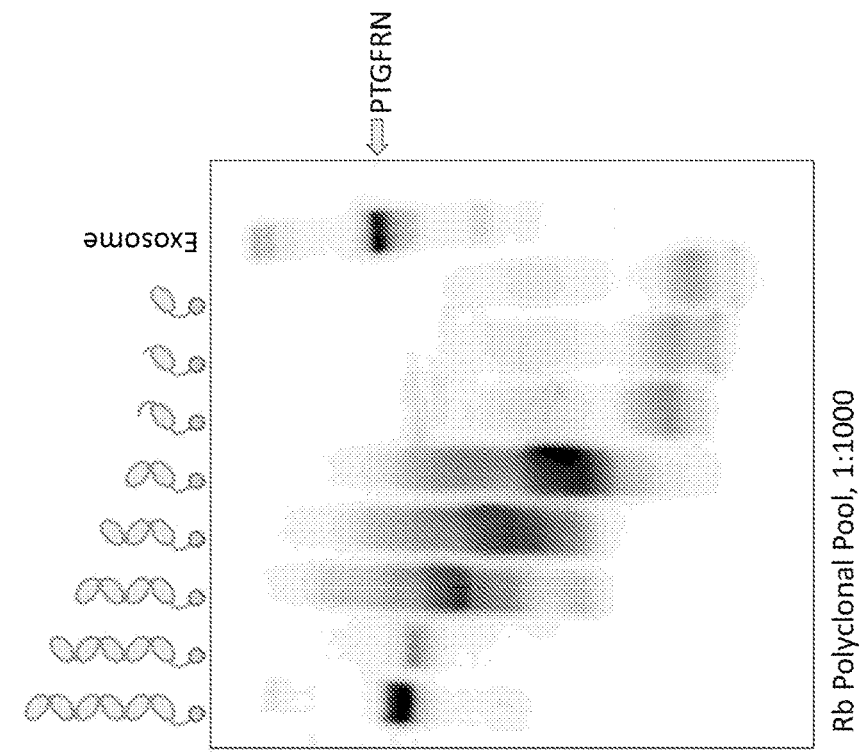
Figure 15A:
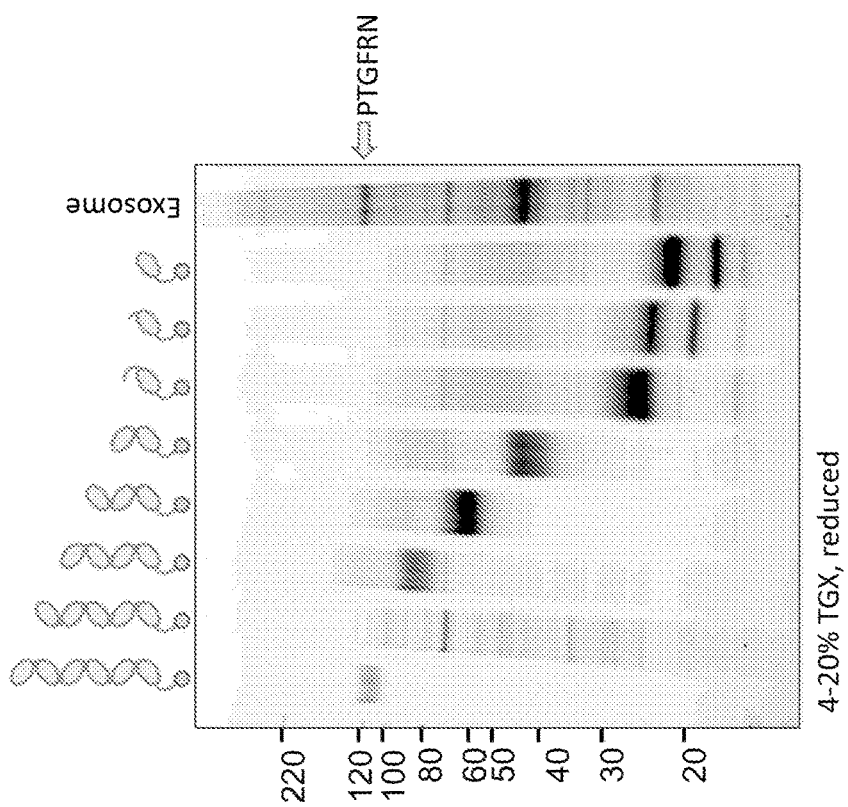

FIG. 15A provides a gel picture running in vivo biotinylated proteins including truncated mutants of recombinant PTGFRN isolated from transfected HEK cells, and purified exosomes from HEK293 cells. FIG. 15B provides a gel picture from western blotting the sample of FIG. 15A using pooled polyclonal PTGFRN antibodies.

Figure 16:
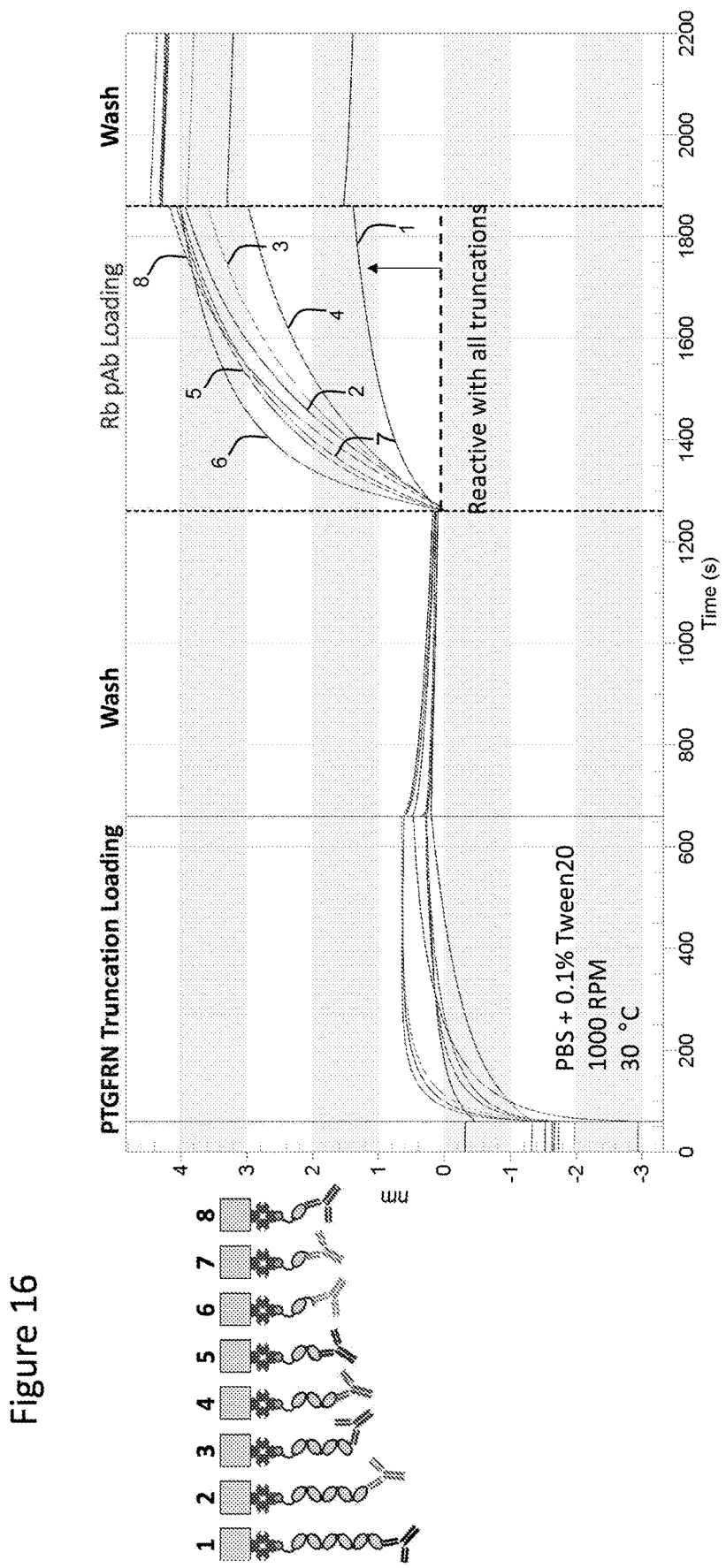

FIG. 16 provides bio-layer interferometry (BLI) results for studying the interaction between polyclonal PTGFRN antibodies and various truncation mutants of PTGFRN.

Figures 17A, 17B:
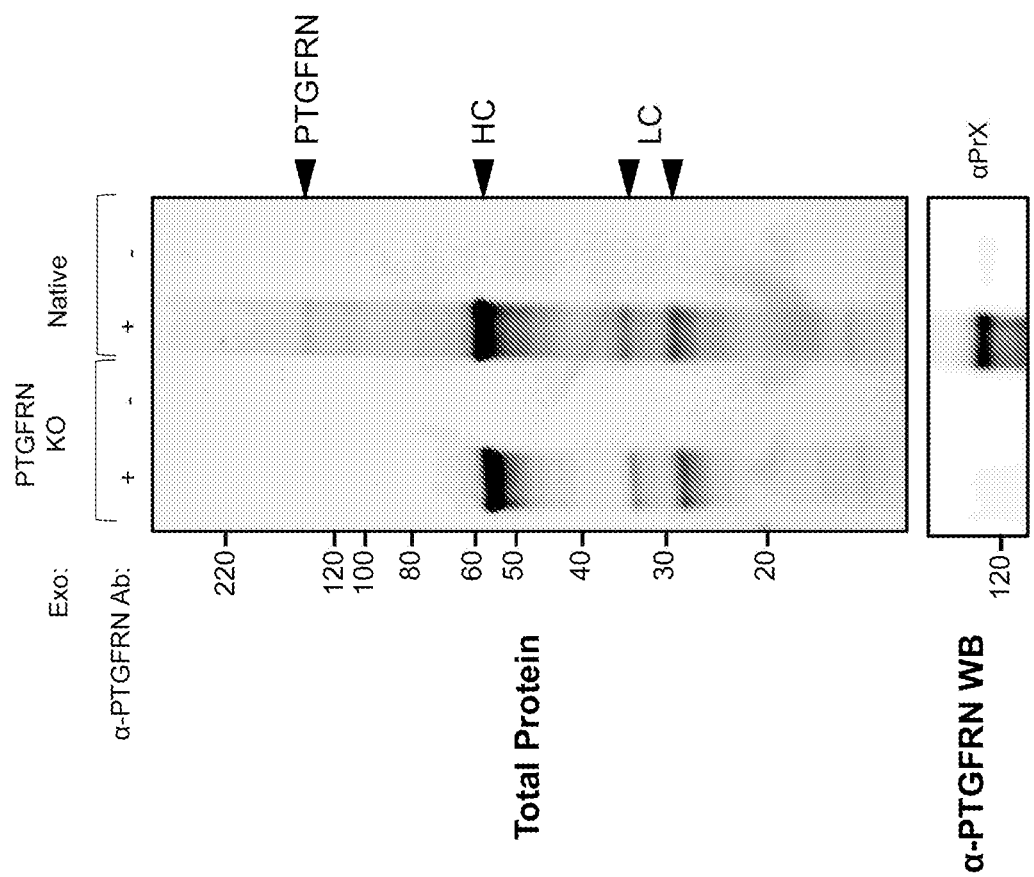

FIG. 17A provides a picture of a polyacrylamide gel from an in vitro exosome purification of native and PTGFRN knockout (KO) exosomes using an immobilized monoclonal anti-PTGFRN antibody. FIG. 17B provides a gel picture from western blotting the samples of FIG. 17A using an anti-PTGFRN antibody.

4. DETAILED DESCRIPTION

4.1. Definitions

Unless defined otherwise, all technical and scientific terms used herein have the meaning commonly understood by a person skilled in the art to which this disclosure belongs. As used herein, the following terms have the meanings ascribed to them below.

As used herein, the term "extracellular vesicle" or "EV" refers to a cell-derived vesicle comprising a membrane that encloses an internal space. Extracellular vesicles comprise all membrane-bound vesicles that have a smaller diameter than the cell from which they are derived. Generally extracellular vesicles range in diameter from 20 nm to 1000 nm, and can comprise various macromolecular cargo either within the internal space, displayed on the external surface of the extracellular vesicle, and/or spanning the membrane. Said cargo can comprise nucleic acids, proteins, carbohydrates, lipids, small molecules, and/or combinations thereof. By way of example and without limitation, extracellular vesicles include apoptotic bodies, fragments of cells, vesicles derived from cells by direct or indirect manipulation (e.g., by serial extrusion or treatment with alkaline solutions), vesiculated organelles, and vesicles produced by living cells (e.g., by direct plasma membrane budding or fusion of the late endosome with the plasma membrane). Extracellular vesicles can be derived from a living or dead organism, explanted tissues or organs, and/or cultured cells.

As used herein the term "exosome" refers to a cell-derived small (between 20-300 nm in diameter, more preferably 40-200 nm in diameter) vesicle comprising a membrane that encloses an internal space, and which is generated from said cell by direct plasma membrane budding or by fusion of the late endosome with the plasma membrane. The exosome comprises lipid or fatty acid and polypeptide and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. The exosome can be derived from a producer cell, and isolated from the producer cell based on its size, density, biochemical parameters, or a combination thereof. An exosome is a species of extracellular vesicle. Generally, exosome production/biogenesis does not result in the destruction of the producer cell.

As used herein, the term "nanovesicle" refers to a cell-derived small (between 20-250 nm in diameter, more preferably 30-150 nm in diameter) vesicle comprising a membrane that encloses an internal space, and which is generated from said cell by direct or indirect manipulation such that said nanovesicle would not be produced by said producer cell without said manipulation. Appropriate manipulations of said producer cell include but are not limited to serial extrusion, treatment with alkaline solutions, sonication, or combinations thereof. The production of nanovesicles may, in some instances, result in the destruction of said producer cell. Preferably, populations of nanovesicles are substantially free of vesicles that are derived from producer cells by way of direct budding from the plasma membrane or fusion of the late endosome with the plasma membrane. The nanovesicle comprises lipid or fatty acid and polypeptide, and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. The nanovesicle, once it is derived from a producer cell according to said manipulation, may be isolated from the producer cell based on its size, density, biochemical parameters, or a combination thereof. A nanovesicle is a species of extracellular vesicle.

The term "cancer" as used herein refers to a solid tumor, metastatic cancer, or non-metastatic cancer. In certain embodiments, the cancer may originate in the bladder, blood, bone, bone marrow, brain, breast, colon, esophagus, duodenum, small intestine, large intestine, colon, rectum, anus, gum, head, kidney, liver, lung, nasopharynx, neck, ovary, pancreas, prostate, skin, stomach, testis, tongue, or uterus. The cancer may specifically be one of the followings, though it is not limited to these:

| | | | |
|---|---|---|---|
| Acute lymphoblastic leukaemia (ALL) | Colorectal cancer | Macroglobulinemia, Waldenström | Pleuropulmonary Blastoma, Childhood |
| Acute myeloid leukaemia (AML) | Craniopharyngioma, Childhood | Male Breast Cancer | Pregnancy and Breast Cancer |
| Adrenocortical Carcinoma | Cutaneous T-Cell Lymphoma | Malignant Fibrous Histiocytoma of Bone and Osteosarcoma | Primary Central Nervous System (CNS) Lymphoma |
| AIDS-Related Kaposi Sarcoma | Ductal Carcinoma In Situ (DCIS) | Melanoma | Prostate Cancer |
| AIDS-Related lymphoma | Embryonal Tumors, Childhood | Merkel Cell Carcinoma | Rare cancers |
| Anal Cancer | Endometrial Cancer | Mesothelioma | Rectal Cancer |
| Appendix Cancer | Ependymoma, Childhood | Metastatic Squamous Neck Cancer with Occult Primary | Renal cell carcinoma |
| Astrocytomas, Childhood | Epithelial cancer | Midline Tract Carcinoma Involving NUT Gene | Renal Pelvis and Ureter, Transitional Cell Cancer |
| Atypical Teratoid/Rhabdoid Tumor, Childhood | Esophageal Cancer | Molar pregnancy | Retinoblastoma |
| Basal Cell Carcinoma | Esthesioneuroblastoma, Childhood | Mouth and oropharyngeal cancer | Rhabdomyosarcoma |
| Bile duct cancer | Ewing sarcoma | Multiple Endocrine Neoplasia Syndromes, Childhood | Salivary Gland Cancer |
| Bladder cancer | Extragonadal Germ Cell Tumor | Multiple Myeloma/Plasma Cell Neoplasm | Sarcoma |
| Bone cancer | Extrahepatic Bile Duct Cancer | Mycosis Fungoides | Secondary cancers |
| Bowel cancer | Eye Cancer | Myelodysplastic Syndromes | Sézary Syndrome |
| Brain Stem Glioma, Childhood | Gallbladder Cancer | Myelodysplastic/ Myeloproliferative Neoplasms | Skin Cancer |
| Brain tumours | Gastric cancer | Myeloproliferative Disorders, Chronic | Skin cancer (non melanoma) |
| Breast cancer | Gastrointestinal Carcinoid Tumor | Nasal Cavity and Paranasal Sinus Cancer | Small Cell Lung Cancer |
| Bronchial Tumors, Childhood | Germ Cell Tumor | Nasopharyngeal cancer | Small Intestine Cancer |
| Burkitt Lymphoma | Gestational trophoblastic tumours (GTT) | Neuroblastoma | Soft Tissue Sarcoma |
| Cancer of unknown primary | Glioma | Non-Hodgkin Lymphoma | Squamous Cell Carcinoma |
| Cancer spread to bone | Hairy cell leukaemia | Non-Small Cell Lung Cancer | Squamous Neck Cancer with Occult Primary, Metastatic |
| Cancer spread to brain | Head and neck cancer | Oesophageal cancer | Stomach (Gastric) Cancer |
| Cancer spread to liver | Heart Cancer, Childhood | Oral Cancer | Stomach cancer |
| Cancer spread to lung | Hepatocellular (Liver) Cancer | Oral Cavity Cancer | T-Cell Lymphoma, Cutaneous - see Mycosis Fungoides and Sézary Syndrome |
| Carcinoid Tumor | Histiocytosis, Langerhans Cell | Oropharyngeal Cancer | Testicular cancer |
| Carcinoma of Unknown Primary | Hodgkin Lymphoma | Osteosarcoma (Bone Cancer) | Throat Cancer |
| Cardiac (Heart) Tumors, Childhood | Hypopharyngeal Cancer | Osteosarcoma and Malignant Fibrous Histiocytoma | Thymoma and Thymic Carcinoma |
| Central Nervous System Atypical Teratoid/Rhabdoid Tumor, Childhood | Intraocular Melanoma | Ovarian Cancer | Thyroid Cancer |
| Central Nervous System Embryonal Tumors, Childhood | Islet Cell Tumors, Pancreatic Neuroendocrine Tumors | Pancreatic Cancer | Transitional Cell Cancer of the Renal Pelvis and Ureter |
| Central Nervous System, Childhood | Kidney cancer | Pancreatic Neuroendocrine Tumors (Islet Cell Tumors) | Unknown primary cancer |

-continued

| | | | |
|---|---|---|---|
| Cervical cancer | Langerhans Cell Histiocytosis | Papillomatosis, Childhood | Ureter and Renal Pelvis, Transitional Cell Cancer |
| Chordoma, Childhood | Laryngeal Cancer | Paraganglioma | Urethral Cancer |
| Choriocarcinoma | Leukemia | Parathyroid Cancer | Uterine Cancer, Endometrial |
| Chronic Lymphocytic Leukemia (CLL) | Lip and Oral Cavity Cancer | Penile Cancer | Uterine Sarcoma |
| Chronic myeloid leukaemia (CML) | Liver cancer | Pharyngeal Cancer | Vaginal cancer |
| Chronic Myeloproliferative Disorders | Lobular Carcinoma In Situ (LCIS) | Pheochromocytoma | Vulvar Cancer |
| Colon cancer | Low Malignant Potential Tumor | Pituitary Tumor | Waldenström Macroglobulinemia |
| Lymphoma | Lung Cancer | Plasma Cell Neoplasm/Multiple Myeloma | Wilms Tumor |

The term "clearance" as used herein refers to the action or process of removing, getting rid of or decreasing the amount of something.

The term "binding agent" as used herein refers to a molecule having a specific affinity to an EV protein. The binding agent can be a large molecule comprising a protein, peptide, nucleic acid, or synthetic or biological polymer. A binding agent can be antigen binding protein (ABP), including but not limited to an antibody fragment, scFab, or scFv. In some embodiments, a binding agent is an aptamer, or a receptor or a ligand binding to an EV protein.

The term "affinity" as used herein refers to the strength of the sum of non-covalent interactions between a single binding site of a molecule (e.g., a binding agent) and its binding partner (e.g., an EV protein). Unless indicated otherwise, as used herein, "affinity" refers to intrinsic binding affinity, which reflects a 1:1 interaction between members of a binding pair (e.g., a binding agent and an EV protein). The affinity of a molecule X for its partner Y can be represented by the dissociation equilibrium constant ($K_D$). Affinity can be measured by common methods known in the art, including those described herein. Affinity can be determined, for example, using surface plasmon resonance (SPR) technology (e.g., BIACORE) or biolayer interferometry (e.g., FORTEBIO®).

With regard to a binding agent, the terms "specific binding," "specifically binds to," "specific for," "selectively binds," and "selective for" a particular EV protein mean binding that is measurably different from a non-specific or non-selective interaction (e.g., with a non-target molecule). Specific binding can be measured, for example, by measuring binding to a target molecule and comparing it to binding to a non-target molecule. Specific binding can also be determined by competition with a control molecule that mimics the epitope recognized on the target molecule. In that case, specific binding is indicated if the binding of a binding agent to the target molecule is competitively inhibited by the control molecule. In some aspects, the affinity of a binding agent for a non-target molecule is less than about 50% of the affinity for a target protein. In some aspects, the affinity of a binding agent for a non-target molecule is less than about 40% of the affinity for a target protein. In some aspects, the affinity of a binding agent for a non-target molecule is less than about 30% of the affinity for a target protein. In some aspects, the affinity of a binding agent for a non-target molecule is less than about 20% of the affinity for a target protein. In some aspects, the affinity of a binding agent for a non-target molecule is less than about 10% of the affinity for a target protein. In some aspects, the affinity of a binding agent for a non-target molecule is less than about 1% of the affinity for a target protein. In some aspects, the affinity of a binding agent for a non-target molecule is less than about 0.1% of the affinity for a target protein.

The term "EV protein" as used herein refers to a protein present on EVs. EV protein can be a membrane protein, such as a transmembrane protein, integral protein and peripheral protein. In preferred embodiments, EV protein is enriched on the exosome membranes. EV proteins include, but not limited to, (1) prostaglandin F2 receptor negative regulator (PTGFRN), (2) basigin (BSG), (3) immunoglobulin superfamily member 3 (IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), (8) a class of ATP transporter proteins (ATP1A1, ATP1A2, ATP1A3, ATP1A4, ATP1B3, ATP2B1, ATP2B2, ATP2B3, ATP2B4), (9) immunoglobulin superfamily member 2 (IGSF2), (10) CD13 (aminopeptidase N), (11) MME (neprilysin) (12) ENPP1 (ectonucleotide pyrophosphatase/phosphodiesterase family member 1), and (13) NRP1 (neuropilin-1).

The term "conventional EV protein" as used herein refers to a protein previously known to be enriched in EVs, including but not limited to CD9, CD63, CD81, PDGFR, GPI anchor proteins, lactadherin LAMP2, and LAMP2B, a fragment thereof, or a peptide that binds thereto.

The term "excipient" or "carrier" refers to an inert substance added to a pharmaceutical composition to further facilitate administration of a compound. The term "pharmaceutically-acceptable carrier" or "pharmaceutically-acceptable excipient" encompasses any of the agents approved by a regulatory agency of the US Federal government or listed in the US Pharmacopeia for use in animals, including humans, as well as any carrier or diluent that does not cause significant irritation to a subject and does not abrogate the biological activity and properties of the administered compound. Included are excipients and carriers that are useful in preparing a pharmaceutical composition and are generally safe, non-toxic, and desirable.

As used herein, "a mammalian subject" includes all mammals, including without limitation, humans, domestic animals (e.g., dogs, cats and the like), farm animals (e.g., cows, sheep, pigs, horses and the like) and laboratory animals (e.g., monkey, rats, mice, rabbits, guinea pigs and the like).

The terms "individual," "subject," "host," and "patient," are used interchangeably herein and refer to any mammalian subject for whom diagnosis, treatment, or therapy is desired, particularly humans. The methods described herein are applicable to both human therapy and veterinary applications. In some embodiments, the subject is a mammal, and in other embodiments the subject is a human.

The term "treating" (and variations thereof such as "treat" or "treatment") refers to clinical intervention in an attempt to alter the natural course of a disease or condition in a subject in need thereof. Treatment can be performed both for prophylaxis and during the course of clinical pathology. Desirable effects of treatment include preventing occurrence or recurrence of disease, alleviation of symptoms, diminish of any direct or indirect pathological consequences of the disease, preventing metastasis, decreasing the rate of disease progression, amelioration or palliation of the disease state, and remission or improved prognosis.

As used herein, the term "effective amount" refers to an amount of a targeting agent or a pharmaceutical composition provided herein that is effective to obtain a desired outcome.

4.2. Other Interpretational Conventions

Ranges recited herein are understood to be shorthand for all of the values within the range, inclusive of the recited endpoints. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

4.3. Method of Treatment

The present disclosure provides a method of treating cancer metastasis by inducing clearance of EVs using a binding agent specific to an EV protein. In some aspects, the disclosure is directed to a method of treating tumor metastasis in a subject in need thereof comprising administering a binding agent against an EV protein in the subject. In other aspects, the disclosure is directed to a method of reducing tumor metastasis in a subject in need thereof comprising administering a binding agent against an EV protein in the subject. In some aspects, the present disclosure therefore can result in removing or reducing the number of EVs, e.g., tumor-derived EVs, in the subject.

In some embodiments, the method involves administration to a subject with cancer an effective amount of a binding agent that specifically binds to an EV protein. In some embodiments, the method involves treating blood of a subject with a cancer ex vivo with an effective amount of a binding agent that specifically binds to an EV protein and reinfusing treated blood to the subject.

4.3.1. EV Proteins

In one aspect, the present disclosure provides EV proteins that can be targeted for treatment of cancer metastasis. In preferred embodiments, an EV protein highly enriched on EV membranes is used. Such EV proteins can be identified by analyzing highly purified EV with mass spectrometry or other methods known in the art, for example, as described in PCT/US2018/048026, U.S. application Ser. No. 16/112,547 and U.S. Pat. No. 10,195,290, which are incorporated by reference in their entireties herein.

The EV proteins include various membrane proteins, such as transmembrane proteins, integral proteins and peripheral proteins, enriched on the EV membranes. They include various CD proteins, transporters, integrins, lectins and cadherins. Specifically, the proteins include, but are not limited to, (1) prostaglandin F2 receptor negative regulator (PTGFRN), (2) basigin (BSG), (3) immunoglobulin superfamily member 3 (IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), (8) a class of ATP transporter proteins (ATP1A1, ATP1A2, ATP1A3, ATP1A4, ATP1B3, ATP2B1, ATP2B2, ATP2B3, ATP2B4), (9) immunoglobulin superfamily member 2 (IGSF2), (10) CD13 (aminopeptidase N), (11) MME (neprilysin) (12) ENPP1 (ectonucleotide pyrophosphatase/phosphodiesterase family member 1), and (13) NRP1 (neuropilin-1). The EV proteins were newly identified.

In some embodiments, one or more EV proteins can be selectively targeted depending on the subject condition to be treated, such as cancer type, cancer stage, stage or condition of metastasis, cancer tissue of origin, etc. For example, EV proteins enriched on a specific population of EVs can be used to remove the specific population of EVs. In particular embodiments, EV proteins enriched on EVs released from cancer cells are used to remove the population of EVs produced by cancer cells. Accordingly, in some embodiments, the treatment method provided herein comprises the step of identifying EV proteins present on EVs produced by cancer cells. In some embodiments, the screening is performed specific to the EV proteins, (1) prostaglandin F2 receptor negative regulator (PTGFRN), (2) basigin (BSG), (3) immunoglobulin superfamily member 3 (IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), (8) a class of ATP transporter proteins (ATP1A1, ATP1A2, ATP1A3, ATP1A4, ATP1B3, ATP2B1, ATP2B2, ATP2B3, ATP2B4), (9) immunoglobulin superfamily member 2 (IGSF2), (10) CD13 (aminopeptidase N), (11) MME (neprilysin) (12) ENPP1 (ectonucleotide pyrophosphatase/phosphodiesterase family member 1), and (13) NRP1 (neuropilin-1). EV proteins enriched on the surface of certain EVs with a specific size range, a targeting moiety, a charge density, a payload, etc. can be identified and used in some embodiments of the present disclosure.

In some aspects the EV protein comprises Prostaglandin F2 receptor negative regulator (the PTGFRN polypeptide). The PTGFRN protein can be also referred to as CD9 partner 1 (CD9P-1), Glu-Trp-Ile EWI motif-containing protein F (EWI-F), Prostaglandin F2-alpha receptor regulatory protein, Prostaglandin F2-alpha receptor-associated protein, or CD315. The full length amino acid sequence of the human PTGFRN protein (Uniprot Accession No. Q9P2B2) is shown at Table 1 as SEQ ID NO: 1. The PTGFRN polypeptide contains a signal peptide (amino acids 1 to 25 of SEQ ID NO: 1), the extracellular domain (amino acids 26 to 832 of SEQ ID NO: 1), a transmembrane domain (amino acids 833 to 853 of SEQ ID NO: 1), and a cytoplasmic domain (amino acids 854 to 879 of SEQ ID NO: 1). The mature PTGFRN polypeptide consists of SEQ ID NO: 1 without the signal peptide, i.e., amino acids 26 to 879 of SEQ ID NO: 1.

TABLE 2

Exemplary EV protein Sequences

| Protein | Sequence |
|---|---|
| The PTGFRN Protein (SEQ ID NO: 1) | MGRLASRPLLLALLSLALCRGRVVRVPTATLVRVVGTELVIPCNVSDYDGPSEQNFDWSF SSLGSSFVELASTWEVGFPAQLYQERLQRGEILLRRTANDAVELHIKNVQPSDQGHYKCS TPSTDATVQGNYEDTVQVKVLADSLHVGPSARPPPSLSLREGEPPFELRCTAASASPLHTH LALLWEVHRGPARRSVLALTHEGRFHPGLGYEQRYHSGDVRLDTVGSDAYRLSVSRALSA DQGSYRCIVSEWIAEQGNWQEIQEKAVEVATVVIQPSVLRAAVPKNVSVAEGKELDLTCN ITTDRADDVRPEVTWSFSRMPDSTLPGSRVLARLDRDSLVHSSPHVALSHVDARSYHLLV RDVSKENSGYYYCHVSLWAPGHNRSWHKVAEAVSSPAGVGVTWLEPDYQVYLNASKVPGF ADDPTELACRVVDTKSGEANVRFTVSWYYRMNRRSDNVVTSELLAVMDGDWTLKYGERSK QRAQDGDFIFSKEHTDTFNFRIQRTTEEDRGNYYCVVSAWTKQRNNSWVKSKDVFSKPVN IFWALEDSVLVVKARQPKPFFAAGNTFEMTCKVSSKNIKSPRYSVLIMAEKPVGDLSSPN ETKYIISLDQDSVVKLENWTDASRVDGVVLEKVQEDEFRYRMYQTQVSDAGLYRCMVTAW SPVRGSLWREAATSLSNPIEIDFQTSGPIFNASVHSDTPSVIRGDLIKLFCIITVEGAAL DPDDMAFDVSWFAVHSFGLDKAPVLLSSLDRKGIVTTSRRDWKSDLSLERVSVLEFLLQV HGSEDQDFGNYYCSVTPWVKSPTGSWQKEAEIHSKPVFITVKMDVLNAFKYPLLIGVGLS TVIGLLSCLIGYCSSHWCCKKEVQETRRERRRLMSMEMD |
| The BSG protein (SEQ ID NO: 2) | MAAALFVLLGFALLGTHGASGAAGFVQAPLSQQRWVGGSVELHCEAVGSPVPEIQWWFEG QGPNDTCSQLWDGARLDRVHIHATYHQHAASTISIDTLVEEDTGTYECRASNDPDRNHLT RAPRVKWVRAQAVVLVLEPGTVFTTVEDLGSKILLTCSLNDSATEVTGHRWLKGGVVLKE DALPGQKTEFKVDSDDQWGEYSCVFLPEPMGTANIQLHGPPRVKAVKSSEHINEGETAML VCKSESVPVTDWAWYKITDSEDKALMNGSESRFFVSSSQGRSELHIENLNMEADPGQYR CNGTSSKGSDQAIITLRVRSHLAALWPFLGIVAEVLVLVTIIFIYEKRRKPEDVLDDDDA GSAPLKSSGQHQNDKGKNVRQRNSS |
| The IGSF8 protein (SEQ ID NO: 3) | MGALRPTLLPPSLPLLLLLMLGMGCWAREVLVPEGPLYRVAGTAVSISCNVTGYEGPAQQ NFEWFLYRPEAPDTALGIVSTKDTQFSYAVFKSRVVAGEVQVQRLQGDAVVLKIARLQAQ DAGIYECHTPSTDTRYLGSYSGKVELRVLPDVLQVSAAPPGPRGRQAPTSPPRMTVHEGQ ELALGCLARTSTQKHTHLAVSFGRSVPEAPVGRSTLQEVVGIRSDLAVEAGAPYAERLAA GELRLGKEGTDRYRMVVGGAQAGDAGTYHCTAAEWIQDPDGSWAQIAEKRAVLAHVDVQT LSSQLAVTVGPGERRIGPGEPLELLCNVSGALPPAGRHAAYSVGWEMAPAGAPGPGRLVA QLDTEGVGSLGPGYEGRHIAMEKVASRTYRLRLEAARPGDAGTYRCLAKAYVRGSGTRLR EAASARSRPLPVHVREEGVVLEAVAWLAGGTVYRGETASLLCNISVRGGPPGLRLAASWW VERPEDGELSSVPAQLVGGVGQDGVAELGVRPGGGPVSVELVGPRSHRLRLHSLGPEDEG VYHCAPSAWVQHADYSWYQAGSARSGPVTVYPYMHALDTLFVPLLVGTGVALVTGATVLG TITCCFMKRLRKR |
| The IGSF3 protein (SEQ ID NO: 4) | MKCFFPVLSCLAVLGVVSAQRQVTVQEGPLYRTEGSHITIWCNVSGYQGPSEQNFQWSIY LPSSPEREVQIVSTMDSSFPYAIYTQRVRGGKIFIERVQGNSTLLHITDLQARDAGEYEC HTPSTDKQYFGSYSAKMNLVVIPDSLQTTAMPQTLHRVEQDPLELTCEVASETIQHSHLS VAWLRQKVGEKPVEVISLSRDFMLHSSSEYAQRQSLGEVRLDKLGRTTFRLTIFHLQPSD QGEFYCEAAEWIQDPDGSWYAMTRKRSEGAVVNVQPTDKEFTVRLETEKRLHTVGEPVEF RCILEAQNVPDRYFAVSWAFNSSLIATMGPNAVPVLNSEFAHREARGQLKVAKESDSVFV LKIYHLRQEDSGKYNCRVTEREKTVTGEFIDKESKRPKNIPIIVLPLKSSISVEVASNAS VILEGEDLRFSCSVRTAGRPQGRFSVIWQLVDRQNRRSNIMWLDRDGTVQPGSSYWERSS FGGVQMEQVQPNSFSLGIFNSRKEDEGQYECHVTEWVRAVDGEWQIVGERRASTPISITA LEMGFAVTAISRTPGVTYSDSFDLQCIIKPHYPAWVPVSVTWRFQPVGTVEFHDLVTFTR DGGVQWGDRSSSFRTRTAIEKAESSNNVRLSISRASDTEAGKYQCVAELWRKNYNNTWTR LAERTSNLLEIRVLQPVTKLQVSKSKRTLTLVENKPIQLNCSVKSQTSQNHSFAVLWYVH KPSDADGKLILKTTHNSAFEYGTYAEEEGLRARLQFERHVSGGLFSLTVQRAEVSDSGSY YCHVEEWLLSPNYAWYKLAEEVSGRTEVTVKQPDSRLRLSQAQGNLSVLETRQVQLECVV LNRTSITSQLMVEWFVWKPNHPERETVARLSRDATFHYGEQAAKNNLKGRLHLESPSPGV YRLFIQNVAVQDSGTYSCHVEEWLPSPSGMWYKRAEDTAGQTALTVMRPDASLQVDTVVP NATVSEKAAFQLDCSIVSRSSQDSRFAVAWYSLRTKAGGKRSSPGLEEQEEEREEEEED DDDDDDPTERTALLSVGPDAVFGPEGSPWEGRLRFQRLSPVLYRLTVLQASPQDTGNYSC HVEEWLPSPQKEWYRLTEEESAPIGIRVLDTSPTLQSIICSNDALFYFVFFYPFPIFGIL IITILLVRFKSRNSSKNSDGKNGVPLLWIKEPHLNYSPTCLEPPVLSIHPGAID |
| The ITGB1 protein (SEQ ID NO: 5) | MNLQPIFWIGLISSVCCVFAQTDENRCLKANAKSCGECIQAGPNCGWCTNSTFLQEGMPT SARCDDLEALKKKGCPPDDIENPRGSKDIKKNKNVTNRSKGTAEKLKPEDITQIQPQQLV LRLRSGEPQTFTLKFKRAEDYPIDLYYLMDLSYSMKDDLENVKSLGTDLMNEMRRITSDF RIGFGSFVEKTVMPYISTTPAKLRNPCTSEQNCTSPFSYKNVLSLTNKGEVFNELVGKQR ISGMLDSPEGGFDAIMQVAVCGSLIGWRNVTRLLVFSTDAGFHFAGDGKLGGIVLPNDGQ CHLENNMYTMSHYYDYPSIAHLVQKLSENNIQTIFAVTEEFQPVYKELKNLIPKSAVYLS SANSSNVIQLIIDAYNSLSSEVILENGKLSEGVTISYKSYCKNGVNGTGENGRKCSNISI GDEVQFEISITSNKCPKKDSDSFKIRPLGFTEEVEVILQYICECECQSEGIPESPKCHEG NGTFECGACRCNEGRVGRHCECSTDEVNSEDMDAYCRKENSSEICSNNGECVCGQCVCRK RDNTNEIYSGASNGQICNGRGICECGVCKCTDPKFQGQTCEMCQTCLGVCAEHKECVQCR AFNKGEKKDTCTQECSYFNITKVESRDKLPQPVQPDPVSHCKEKDVDDCWFYFTYSVNGN NEVMVHVVENPECPTGPDIIPIVAGVVAGIVLIGLALLLIWKLLMIIHDRREFAKFEKEK MNAKWDTGENPIYKSAVTTVVNPKYEGK |
| The ITGA4 protein (SEQ ID NO: 6) | MAWEARREPGPRRAAVRETVMLLLCLGVPTGRPYNVDTESALLYQGPHNTLFGYSVVLHS HGANRWLLVGAPTANWLANASVINPGAIYRCRIGKNPGQTCEQLQLGSPNGEPCGKTCLE ERDNQWLGVTLSRQPGENGSIVTCGHRWKNIFYIKNENKLPTGGCYGVPPDLRTELSKRI APCYQDYVKKFGENFASCQAGISSFYTKDLIVMGAPGSSYWTGSLFVYNITTNKYKAFLD KQNQVKFGSYLGYSVGAGHFRSQHTTEVVGGAPQHEQIGKAYIFSIDEKELNILHEMKGK |

TABLE 2-continued

Exemplary EV protein Sequences

| Protein | Sequence |
|---|---|
| | KLGSYFGASVCAVDLNADGFSDLLVGAPMQSTIREEGRVFVYINSGSGAVMNAMETNLVG<br>SDKYAARFGESIVNLGDIDNDGFEDVAIGAPQEDDLQGAIYIYNGRADGISSTFSQRIEG<br>LQISKSLSMFGQSISGQIDADNNGYVDVAVGAFRSDSAVLLRTRPVVIVDASLSHPESVN<br>RTKFDCVENGWPSVCIDLTLCFSYKGKEVPGYIVLFYNMSLDVNRKAESPPRFYFSSNGT<br>SDVITGSIQVSSREANCRTHQAFMRKDVRDILTPIQIEAAYHLGPHVISKRSTEEFPPLQ<br>PILQQKKEKDIMKKTINFARFCAHENCSADLQVSAKIGFLKPHENKTYLAVGSMKTLMLN<br>VSLFNAGDDAYETTLHVKLPVGLYFIKILELEEKQINCEVTDNSGVVQLDCSIGYIYVDH<br>LSRIDISFLLDVSSLSRAEEDLSITVHATCENEEEMDNLKHSRVTVAIPLKYEVKLTVHG<br>FVMPTSFVYGSNDENEPETCMVEKMNLTFHVINTGNSMAPNVSVEIMVPNSFSPQTDKLF<br>NILDVQTTTGECHFENYQRVCALEQQKSAMQTLKGIVRFLSKTDKRLLYCIKADPHCLNF<br>LCMFGKMESGKEASVHIQLEGRPSILEMDETSALKFEIRATGFPEPNPRVIELNKDENVA<br>HVLLEGLHHQRPKRYFTIVIISSSLLLGLIVLLLISYVMWKAGFFKRQYKSILQEENRRD<br>SWSYINSKSNDD |
| The SLC3A2<br>Protein,<br>where<br>the first<br>Met is<br>processed.<br>(SEQ ID NO:<br>7) | MELQPPEASIAVVSIPRQLPGSHSEAGVQGLSAGDDSELGSHCVAQTGLELLASGDPLPS<br>ASQNAEMIETGSDCVTQAGLQLLASSDPPALASKNAEVTGTMSQDTEVDMKEVELNELEP<br>EKQPMNAASGAAMSLAGAEKNGLVKIKVAEDEAEAAAAAKFTGLSKEELLKVAGSPGWVR<br>TRWALLLLFWLGWLGMLAGAVVIIVRAPRCRELPAQKWWHTGALYRIGDLQAFQGHGAGN<br>LAGLKGRLDYLSSLKVKGLVLGPIHKNQKDDVAQTDLLQIDPNFGSKEDFDSLLQSAKKK<br>SIRVILDLTPNYRGENSWFSTQVDTVATKVKDALEFWLQAGVDGFQVRDIENLKDASSFL<br>AEWQNITKGFSEDRLLIAGTNSSDLQQILSLLESNKDLLLTSSYLSDSGSTGEHTKSLVT<br>QYLNATGNRWCSWSLSQARLLTSFLPAQLLRLYQLMLFTLPGTPVFSYGDEIGLDAAALP<br>GQPMEAPVMLWDESSFPDIPGAVSANMTVKGQSEDPGSLLSLFRRLSDQRSKERSLLHGD<br>FHAFSAGPGLFSYIRHWDQNERFLVVLNFGDVGLSAGLQASDLPASASLPAKADLLLSTQ<br>PGREEGSPLELERLKLEPHEGLLLRFPYAA |
| The ITGA4<br>protein<br>(SEQ ID NO:<br>8) | MAGISYVASFFLLLTKLSIGQREVTVQKGPLFRAEGYPVSIGCNVTGHQGPSEQHFQWSV<br>YLPTNPTQEVQIISTKDAAFSYAVYTQRVRSGDVYVERVQGNSVLLHISKLQMKDAGEYE<br>CHTPNTDEKYYGSYSAKTNLIVIPDTLSATMSSQTLGKEEGEPLALTCEASKATAQHTHL<br>SVTWYLTQDGGGSQATEIISLSKDFILVPGPLYTERFAASDVQLNKLGPTTFRLSIERLQ<br>SSDQGQLFCEATEWIQDPDETWMFITKKQTDQTTLRIQPAVKDFQVNITADSLFAEGKPL<br>ELVCLVVSSGRDPQLQGIWFFNGTEIAHIDAGGVLGLKNDYKERASQGELQVSKLGPKAF<br>SLKIFSLGPEDEGAYRCVVAEVMKTRTGSWQVLRKQSPDSHVLRKPAARSVVMSTKNK<br>QQVVWEGETLAFLCKAGGAESPLSVSWWHIPRDQTQPEFVAGMGQDGIVQLGASYGVPSY<br>HGNTRLEKMDWATFQLEITFTAITDSGTYECRVSEKSRNQARDLSWTQKISVTVKSLESS<br>LQVSLMSRQPQVMLTNTFDLSCVVRAGYSDLKVPLTVTWQFQPASSHIFHQLIRITHNGT<br>IEWGNFLSRFQKKTKVSQSLFRSQLLVHDATEEETGVYQCEVEVYDRNSLYNNRPPRASA<br>ISHPLRIAVTLPESKLKVNSRSQVQELSINSNTDIECSILSRSNGNLQLAIIWYFSPVST<br>NASWLKILEMDQTNVIKTGDEFHTPQRKQKFHTEKVSQDLFQLHILNVEDSDRGKYHCAV<br>EEWLLSTNGTWHKLGEKKSGLTELKLKPTGSKVRVSKVYWTENVTEHREVAIRCSLESVG<br>SSATLYSVMWYWNRENSGSKLLVHLQHDGLLEYGEEGLRRHLHCYRSSSTDFVLKLHQVE<br>MEDAGMYWCRVAEWQLHGHPSKWINQASDESQRMVLTVLPSEPTLPSRICSSAPLLYFLF<br>ICPFVLLLLLLISLLCYWKARKLSTLRSNTRKEKALWVDLKEAGGVTTNRREDEEEDEG<br>N |
| The CD13<br>protein<br>(SEQ ID NO:<br>9) | MAKGFYISKSLGILGILLGVAAVCTIIALSVVYSQEKNKNANSSPVASTTPSASATTNPA<br>SATTLDQSKAWNRYRLPNTLKPDSYRVTLRPYLTPNDRGLYVFKGSSTVRFTCKEATDVI<br>IIHSKKLNYTLSQGHRVVLRGVGGSQPPDIDKTELVEPTEYLVVHLKGSLVKDSQYEMDS<br>EFEGELADDLAGFYRSEYMEGNVRKVVATTQMQAADARKSFPCFDEPAMKAEFNITLIHP<br>KDLTALSNMLPKGPSTPLPEDPNWNVTEFHTTPKMSTYLLAFIVSEFDYVEKQASNGVLI<br>RIWARPSAIAAGHGDYALNVTGPILNFFAGHYDTPYPLPKSDQIGLPDFNAGAMENWGLV<br>TYRENSLLFDPLSSSSSNKERVVTVIAHELAHQWFGNLVTIEWWNDLWLNEGFASYVEYL<br>GADYAEPTWNLKDLMVLNDVYRVMAVDALASSHPLSTPASEINTPAQISELFDAISYSKG<br>ASVLRMLSSFLSEDVFKQGLASYLHTFAYQNTIYLNLWDHLQEAVNNRSIQLPTTVRDIM<br>NRWTLQMGFPVITVDTSTGTLSQEHFLLDPDSNVTRPSEFNYVWIVPITSIRDGRQQQDY<br>WLIDVRAQNDLFSTSGNEWVLLNLNVTGYYRVNYDEENWRKIQTQLQRDHSAIPVINRAQ<br>IINDAFNLASAHKVPVTLALNNTLFLIEERQYMPWEAALSSLSYFKLMFDRSEVYGPMKN<br>YLKKQVTPLFIHFRNNTNNWREIPENLMDQYSEVNAISTACSNGVPECEEMVSGLFKQWM<br>ENPNNNPIHPNLRSTVYCNAIAQGGEEEWDFAWEQFRNATLVNEADKLRAALACSKELWI<br>LNRYLSYTLNPDLIRKQDATSTIISITNNVIGQGLVWDFVQSNWKKLFNDYGGGSFSFSN<br>LIQAVTRRFSTEYELQQLEQFKKDNEETGFGSGTRALEQALEKTKANIKWVKENKEVVLQ<br>WFTENSK |
| The MME<br>protein<br>(SEQ ID NO:<br>10) | MGKSESQMDITDINTPKPKKKQRWTPLEISLSVLVLLLTIIAVTMIALYATYDDGICKSS<br>DCIKSAARLIQNMDATTEPCTDFFKYACGGWLKRNVIPETSSRYGNFDILRDELEVVLKD<br>VLQEPKTEDIVAVQKAKALYRSCINESAIDSRGGEPLLKLLPDIYGWPVATENWEQKYGA<br>SWTAEKAIAQLNSKYGKKVLINLFVGTDDKNSVNHVIHIDQPRLGLPSRDYYECTGIYKE<br>ACTAYVDFMISVARLIRQEERLPIDENQLALEMNKVMELEKEIANATAKPEDRNDPMLLY<br>NKMTLAQIQNNFSLEINGKPFSWLNFTNEIMSTVNISITNEEDVVVYAPEYLTKLKPILT<br>KYSARDLQNLMSWRFIMDLVSSLSRTYKESRNAFRKALYGTTSETATWRRCANYVNGNME<br>NAVGRLYVEAAFAGESKHVVEDLIAQIREVFIQTLDDLTWMDAETKKRAEEKALAIKERI<br>GYPDDIVSNDNKLNNEYLELNYKEDEYFENIIQNLKFSQSKQLKKLREKVDKDEWISGAA<br>VVNAFYSSGRNQIVFPAGILQPPFFSAQQSNSLNYGGIGMVIGHEITHGFDDNGRNFNKD<br>GDLVDWWTQQSASNFKEQSQCMVYQYGNFSWDLAGGQHLNGINTLGENIADNGGLGQAYR<br>AYQNYIKKNGEEKLLPGLDLNHKQLFFLNFAQVWCGTYRPEYAVNSIKTDVHSPGNFRII<br>GTLQNSAEFSEAHFCRKNSYMNPEKKCRVW |

TABLE 2-continued

Exemplary EV protein Sequences

| Protein | Sequence |
|---|---|
| The ENPP1 protein (SEQ ID NO: 11) | MERDGCAGGGSRGGEGGRAPREGPAGNGRDRGRSHAAEAPGDPQAAASLLAPMDVGEEPL<br>EKAARARTAKDPNTYKVLSLVLSVCVLTTILGCIFGLKPSCAKEVKSCKGRCFERTFGNC<br>RCDAACVELGNCCLDYQETCIEPEHIWTCNKFRCGEKRLTRSLCACSDDCKDKGDCCINY<br>SSVCQGEKSWVEEPCESINEPQCPAGFETPPTLLFSLDGFRAEYLHTWGGLLPVISKLKK<br>CGTYTKNMRPVYPTKTFPNHYSIVTGLYPESHGIIDNKMYDPKMNASFSLKSKEKFNPEW<br>YKGEPIWVTAKYQGLKSGTFFWPGSDVEINGIFPDIYKMYNGSVPFEERILAVLQWLQLP<br>KDERPHFYTLYLEEPDSSGHSYGPVSSEVIKALQRVDGMVGMLMDGLKELNLHRCLNLIL<br>ISDHGMEQGSCKKYIYLNKYLGDVKNIKVIYGPAARLRPSDVPDKYYSFNYEGIARNLSC<br>REPNQHFKPYLKHFLPKRLHFAKSDRIEPLTFYLDPQWQLALNPSERKYCGSGFHGSDNV<br>FSNMQALFVGYGPGFKHGIEADTFENIEVYNLMCDLLNLTPAPNNGTHGSLNHLLKNPVY<br>TPKHPKEVHPLVQCPFTRNPRDNLGCSCNPSILPIEDFQTQFNLTVAEEKIIKHETLPYG<br>RPRVLQKENTICLLSQHQFMSGYSQDILMPLWTSYTVDRNDSFSTEDFSNCLYQDFRIPL<br>SPVHKCSFYKNNTKVSYGFLSPPQLNKNSSGIYSEALLTTNIVPMYQSFQVIWRYFHDTL<br>LRKYAEERNGVNVVSGPVFDFDYDGRCDSLENLRQKRRVIRNQEILIPTHFFIVLTSCKD<br>TSQTPLHCENLDTLAFILPHRTDNSESCVHGKHDSSWVEELLMLHRARITDVEHITGLSF<br>YQQRKEPVSDILKLKTHLPTFSQED |
| The NRP1 protein (SEQ ID NO: 12) | MERGLPLLCAVLALVLAPAGAFRNDKCGDTIKIESPGYLTSPGYPHSYHPSEKCEWLIQA<br>PDPYQRIMINFNPHFDLEDRDCKYDYVEVFDGENENGHFRGKFCGKIAPPPVVSSGPFLF<br>IKFVSDYETHGAGFSIRYEIFKRGPECSQNYTTPSGVIKSPGFPEKYPNSLECTYIVFVP<br>KMSEIILEFESFDLEPDSNPPGGMFCRYDRLEIWDGFPDVGPHIGRYCGQKTPGRIRSSS<br>GILSMVFYTDSAIAKEGFSANYSVLQSSVSEDFKCMEALGMESGEIHSDQITASSQYSTN<br>WSAERSRLNYPENGWTPGEDSYREWIQVDLGLLRFVTAVGTQGAISKETKKKYYVKTYKI<br>DVSSNGEDWITIKEGNKPVLFQGNTNPTDVVVAVFPKPLITRFVRIKPATWETGISMRFE<br>VYGCKITDYPCSGMLGMVSGLISDSQITSSNQGDRNWMPENIRLVTSRSGWALPPAPHSY<br>INEWLQIDLGEEKIVRGIIIQGGKHRENKVFMRKFKIGYSNNGSDWKMIMDDSKRKAKSF<br>EGNNNYDTPELRTFPALSTRFIRIYPERATHGGLGLRMELLGCEVEAPTAGPTTPNGNLV<br>DECDDDQANCHSGTGDDFQLTGGTTVLATEKPTVIDSTIQSEFPTYGFNCEFGWGSHKTF<br>CHWEHDNHVQLKWSVLTSKTGPIQDHTGDGNFIYSQADENQKGKVARLVSPVVYSQNSAB<br>CMTFWYHMSGSHVGTLRVKLRYQKPEEYDQLVWMAIGHQGDHWKEGRVLLHKSLKLYQVI<br>FEGEIGKGNLGGIAVDDISINNHISQEDCAKPADLDKKNPEIKIDETGSTPGYEGEGEGD<br>KNISRKPGNVLKTLDPILITIIAMSALGVLLGAVCGVVLYCACWHNGMSERNLSALENYN<br>FELVDGVKLKKDKLNTQSTYSEA |

In some aspects, the EV protein comprises Basigin (the BSG protein), represented by SEQ ID NO: 2. The BSG protein is also known as 5F7, Collagenase stimulatory factor, Extracellular matrix metalloproteinase inducer (EMMPRIN), Leukocyte activation antigen M6, OK blood group antigen, Tumor cell-derived collagenase stimulatory factor (TCSF), or CD147. The Uniprot number for the human BSG protein is P35613. The signal peptide of the BSG protein is amino acid 1 to 21 of SEQ ID NO: 2. Amino acids 138-323 of SEQ ID NO: 2 is the extracellular domain, amino acids 324 to 344 is the transmembrane domain, and amino acids 345 to 385 of SEQ ID NO: 2 is the cytoplasmic domain.

In some aspects, the EV protein comprises Immunoglobulin superfamily member 8 (IgSF8 or the IGSF8 protein), which is also known as CD81 partner 3, Glu-Trp-Ile EWI motif-containing protein 2 (EWI-2), Keratinocytes-associated transmembrane protein 4 (KCT-4), LIR-D1, Prostaglandin regulatory-like protein (PGRL) or CD316. The full length human IGSF8 protein is accession no. Q969P0 in Uniprot and is shown as SEQ ID NO: 3 herein. The human IGSF8 protein has a signal peptide (amino acids 1 to 27 of SEQ ID NO: 3), an extracellular domain (amino acids 28 to 579 of SEQ ID NO: 3), a transmembrane domain (amino acids 580 to 600 of SEQ ID NO: 3), and a cytoplasmic domain (amino acids 601 to 613 of SEQ ID NO: 3).

In some aspects, the EV protein comprises Immunoglobulin superfamily member 3 (IgSF3 or the IGSF3 protein), which is also known as Glu-Trp-Ile EWI motif-containing protein 3 (EWI-3), and is shown as the amino acid sequence of SEQ ID NO: 4. The human IGSF3 protein has a signal peptide (amino acids 1 to 19 of SEQ ID NO: 4), an extracellular domain (amino acids 20 to 1124 of SEQ ID NO: 240), a transmembrane domain (amino acids 1125 to 1145 of SEQ ID NO: 4), and a cytoplasmic domain (amino acids 1146 to 1194 of SEQ ID NO: 4).

In some aspects, a EV protein comprises Integrin beta-1 (the ITGB1 protein), which is also known as Fibronectin receptor subunit beta, Glycoprotein IIa (GPIIA), VLA-4 subunit beta, or CD29, and is shown as the amino acid sequence of SEQ ID NO: 5. The human ITGB1 protein has a signal peptide (amino acids 1 to 20 of SEQ ID NO: 5), an extracellular domain (amino acids 21 to 728 of SEQ ID NO: 5), a transmembrane domain (amino acids 729 to 751 of SEQ ID NO: 5), and a cytoplasmic domain (amino acids 752 to 798 of SEQ ID NO: 5).

In other aspects, the EV protein comprises the Integrin alpha-4 (ITGA4) protein. The ITGA4 protein is also called CD49 antigen-like family member D, Integrin alpha-IV, VLA-4 subunit alpha, CD49d. The human ITGA4 protein is known as UniProtKB-P13612, and is shown as the amino acid sequence of SEQ ID NO: 6. The human ITGA4protein has a signal peptide (amino acids 1 to 34 of SEQ ID NO: 6), an extracellular domain (amino acids 35 to 977 of SEQ ID NO: 6), a transmembrane domain (amino acids 978 to 1001 of SEQ ID NO: 6), and a cytoplasmic domain (amino acids 1002 to 1032 of SEQ ID NO: 6).

In other aspects, the EV protein comprises the 4F2 cell-surface antigen heavy chain (SLC3A2) protein. The SLC3A2 protein is also called 4F2hc, 4F2 heavy chain antigen, Lymphocyte activation antigen 4F2 large subunit, Solute carrier family 3 member 2, or CD98. The gene encoding the SLC3A2 protein is called SLC3A2 or MDU1. The human SLC3A2 protein is UniProtKB-P08195, and is shown as the amino acid sequence of SEQ ID NO: 7. The human SLC3A2 protein has a signal peptide (amino acids 1 to 101 of SEQ ID NO: 7), a cytoplasmic domain (amino acids 102 to 184 of SEQ ID NO: 7), a transmembrane domain (amino acids acids 185 to 205 of SEQ ID NO: 7), and an extracellular domain (amino acids 206 to 630 of SEQ ID NO: 7).

In other aspects, the EV protein comprises the Sodium/potassium-transporting ATPase subunit alpha-1 (ATP1A1) protein. The ATP1A1 protein is also known as Na(+)/K(+) ATPase alpha-1 subunit, or Sodium pump subunit alpha-1. The gene encoding the ATP1A1 protein is ATP1A1. The ATP1A1 protein sequence is known as UniProtKB-P05023.

In other aspects, the EV protein comprises the Sodium/potassium-transporting ATPase subunit alpha-2 (ATP1A2) protein. The ATP1A2 protein is also known as ATP1A2, FHM2, MHP2, Sodium pump subunit alpha-2, or ATPase Na+/K+ transporting subunit alpha 2. The gene encoding ATP1A2 protein is known as ATP1A2 or KIAA0778. The sequence of the ATP1A2 protein is known as UniProtKB-P50993.

In other aspects, the EV protein comprises the Sodium/potassium-transporting ATPase subunit alpha-3 (ATP1A3) protein. The ATP1A3 protein is also known as Na(+)/K(+) ATPase alpha-3 subunit, Na(+)/K(+) ATPase alpha(III) subunit, or Sodium pump subunit alpha-3. The gene encoding the ATP1A3 protein is ATP1A3. The sequence of the ATP1A3 protein is known as UniProtKB-P13637.

In other aspects, the EV protein comprises the ATP1A4 protein, which comprises an amino acid sequence at least about 70%, at least about 75%, at least about 80%, at least about 85%, at least about 90%, at least about 95%, at least about 96%, at least about 97%, at least about 98%, at least about 99%, or about 100% identical to SEQ ID NO: 27 without the signal peptide. In some aspects, the ATP1A4 protein lacks one or more functional or structural domains, such as IgV.

In other aspects, the EV protein comprises the ATP1A5 protein, which comprises an amino acid sequence at least about 70%, at least about 75%, at least about 80%, at least about 85%, at least about 90%, at least about 95%, at least about 96%, at least about 97%, at least about 98%, at least about 99%, or about 100% identical to SEQ ID NO: 28 without the signal peptide. In some aspects, the ATP1A5 protein lacks one or more functional or structural domains, such as IgV.

In other aspects, the EV protein comprises the Plasma membrane calcium-transporting ATPase 1 (ATP2B1) protein. The ATP2B1 protein is also known as plasma membrane calcium ATPase isoform 11, PMCA11, or Plasma membrane calcium pump isoform 1. The gene encoding the ATP2B1 protein is Atp2b1. The sequence of the ATP2B1 protein is known as UniProtKB-P20020.

In other aspects, the EV protein comprises the Plasma membrane calcium-transporting ATPase 2 (ATP2B2) protein. The ATP2B2 protein is also known as PMCA2, Plasma membrane calcium ATPase isoform 2, or Plasma membrane calcium pump isoform 2. The gene encoding the ATP2B2 protein is ATP2B2 or PMCA2.

In other aspects, the EV protein comprises the Plasma membrane calcium-transporting ATPase 3 (ATP2B3) protein. The ATP2B3 protein is also known as PMCA3, Plasma membrane calcium ATPase isoform 3, or Plasma membrane calcium pump isoform 3. The gene encoding the ATP2B3 protein is known as ATP2B3. The protein sequence is known as UniProtKB-Q16720.

In other aspects, the EV protein comprises the Plasma membrane calcium-transporting ATPase 4 (ATP2B4) protein. The ATP2B4 protein is also called PMCA41, Matrix-remodeling-associated protein 1, Plasma membrane calcium ATPase isoform 4, or Plasma membrane calcium pump isoform 4. The gene encoding the APT2B4 protein is also known as ATP2B4, ATP2B2, or MXRA1.

In other aspects, the EV protein comprises the Immunoglobulin superfamily member 2 (IGSF2) protein. The IGSF2 protein is also called IgSF2, Cell surface glycoprotein V7, Glu-Trp-Ile EWI motif-containing protein 101, EWI-101, or CD101. The gene encoding the IGSF2 protein is known as CD101, EWI101, IGSF2, or 177. The sequence of IGSF2 protein is known as UniProtKB-Q93033, and is shown as the amino acid sequence of SEQ ID NO: 8. The human SLC3A2 protein has a signal peptide (amino acids 1 to 20 of SEQ ID NO: 8), an extracellular domain (amino acids 21 to 954 of SEQ ID NO: 8), a transmembrane domain (amino acids 955 to 975 of SEQ ID NO: 8), and a cytoplasmic domain (amino acids 976 to 1021 of SEQ ID NO: 8).

In other aspects, the EV protein comprises the CD13 protein. The CD13 protein is also called aminopeptidase N. The gene encoding the CD13 protein is known as ANPEP. The sequence of CD13 protein is known as UniProtKB-15144, and is shown as the amino acid sequence of SEQ ID NO: 9. The human CD13 protein has an extracellular domain (amino acids 33 to 967 of SEQ ID NO: 9), a transmembrane domain (amino acids 9 to 32 of SEQ ID NO: 9), and a cytoplasmic domain (amino acids 2 to 8 of SEQ ID NO: 9).

In other aspects, the EV protein comprises the MME protein. The MME protein is also called neprilysin, striopeptidase, common acute lymphocytic leukemia antigen, enkephalinase, and neutral endopeptidase. The gene encoding the MME protein is known as MME. The sequence of MIME protein is known as UniProtKB-P08473, and is shown as the amino acid sequence of SEQ ID NO: 10. The human MME protein has an extracellular domain (amino acids 52 to 750 of SEQ ID NO: 10), a transmembrane domain (amino acids 29 to 51 of SEQ ID NO: 10), and a cytoplasmic domain (amino acids 2 to 28 of SEQ ID NO: 10).

In other aspects, the EV protein comprises the ENPP1 protein. The ENPP1 protein is also called ectonucleotide pyrophosphatase/phosphodiesterase family member 1. The gene encoding the ENPP1 protein is known as ENPP1. The sequence of ENPP1 protein is known as UniProtKB-P22413, and is shown as the amino acid sequence of SEQ ID NO: 11. The human ENPP1 protein has an extracellular domain (amino acids 98 to 925 of SEQ ID NO: 11), a transmembrane domain (amino acids 77 to 97 of SEQ ID NO: 11), and a cytoplasmic domain (amino acids 1 to 76 of SEQ ID NO: 11).

In other aspects, the EV protein comprises the NRP1 protein. The NRP1 protein is also called neuropilin-1, vascular endothelial cell growth factor 165 receptor, and CD304. The gene encoding the NRP1 protein is known as NRP1. The sequence of NRP1 protein is known as UniProtKB-014786, and is shown as the amino acid sequence of SEQ ID NO: 12. The human NRP1 protein has a signal peptide (amino acids 1 to 21 of SEQ ID NO: 12), an extracellular domain (amino acids 22 to 856 of SEQ ID NO: 12), a transmembrane domain (amino acids 857 to 879 of SEQ ID NO: 12), and a cytoplasmic domain (amino acids 880 to 923 of SEQ ID NO: 12).

Non-limiting examples of other EV protein proteins can be found at U.S. Pat. No. 10,195,290B1, issued Feb. 5, 2019, which is incorporated by reference in its entireties.

4.3.2. Binding Agents

In some embodiments, a binding agent used for treatment of cancer metastasis is an antigen binding protein (ABP) having specific affinity to an EV protein. ABP refers to a protein comprising one or more antigen-binding domains that specifically bind to an antigen or epitope. In some embodiments, the ABP binds the antigen or epitope with specificity and affinity similar to that of naturally occurring antibodies. In some embodiments, the ABP comprises an antibody. In some embodiments, the ABP consists of an antibody. In some embodiments, the ABP consists essentially of an antibody. In some embodiments, the ABP comprises an alternative scaffold. In some embodiments, the ABP consists of an alternative scaffold. In some embodiments, the ABP consists essentially of an alternative scaffold. In some embodiments, the ABP comprises an antibody fragment. In some embodiments, the ABP consists of an antibody fragment. In some embodiments, the ABP consists essentially of an antibody fragment.

The antibody that can be used in various embodiments include immunoglobulin molecules comprising one or more antigen-binding domains that specifically bind to an antigen or epitope. An antibody specifically includes intact antibodies (e.g., intact immunoglobulins), antibody fragments, and multi-specific antibodies. One example of an antigen-binding domain is an antigen-binding domain formed by a $V_H$-$V_L$ dimer. An antibody is one type of ABP.

In some embodiments, a binding agent is an antibody fragment comprising a portion of an intact antibody, such as the antigen-binding or variable region of an intact antibody. Antibody fragments include, for example, Fv fragments, Fab fragments, F(ab')2 fragments, Fab' fragments, scFab fragments, scFv (sFv) fragments, and scFv-Fc fragments.

In some embodiments, an ABP is a multivalent antibody having at least two antigen-binding sites. In some embodiments, two antigen-binding sites bind to two different EV proteins. In some embodiments, two antigen-binding sites bind to an identical EV protein. In some embodiments, one of the two antigen-binding site binds to an EV protein, and the second of the two antigen-binding site binds to a non-EV protein.

In some embodiments, the antibody is a monoclonal antibody. In some embodiments, the antibody is selected from a human antibody, a humanized antibody, or a chimeric antibody. The term "chimeric antibody" refers to an antibody in which a portion of the heavy and/or light chain is derived from a particular source or species, while the remainder of the heavy and/or light chain is derived from a different source or species.

In some embodiments, the antibody is a single chain variable fragment (scFv). In some embodiments, the ABP binds more than one antigen or more than one epitope on a single antigen. In some embodiments, the ABP comprises an antibody fragment. In some embodiments, the ABP comprises an immunoglobulin constant region.

The selected antibody can be further altered, for example, to improve affinity for the target ("affinity maturation"), to humanize the antibody, to improve its production in cell culture, and/or to reduce its immunogenicity in a subject.

In some embodiments, a binding agent is an aptamer, e.g., an oligonucleotide or peptide molecule, that binds to an EV protein. In some embodiments, an aptamer is created by selecting from a large random sequence pool. Various methods known in the art for aptamer selection can be used. For example, peptide aptamer selection can be made using yeast two-hybrid system. Peptide aptamers can be also selected from combinatorial peptide libraries constructed by phage display and other surface display technologies such as mRNA display, ribosome display, bacterial display and yeast display. These experimental procedures are also known as biopannings. In some embodiments, an aptamer is selected from synthetic compositions or those existing in nature.

In some embodiments, a binding agent is a ligand or a receptor. When an EV protein is a ligand to a target receptor, the target receptor or a modification thereof can be used as a binding agent. When an EV protein is a receptor to a target ligand, the target ligand or a modification thereof can be used as a binding agent.

In some embodiments, a binding agent comprises a functional group that can facilitate clearance of EVs in various embodiments. For example, a binding agent is conjugated to a peptide that facilitates purification or isolation (e.g., poly-His). An antigen binding protein also can be linked to the FLAG peptide Asp-Tyr-Lys-Asp-Asp-Asp-Asp-Lys (DYKDDDDK) as described in Hopp et al., Bio/Technology 6:1204, 1988, and U.S. Pat. No. 5,011,912. The FLAG peptide is highly antigenic and provides an epitope reversibly bound by a specific monoclonal antibody (mAb), enabling rapid assay and facile purification of expressed recombinant protein. Reagents useful for preparing fusion proteins in which the FLAG peptide is fused to a given polypeptide are commercially available (Sigma, St. Louis, MO).

In some embodiments, a binding agent comprises an immunoglobulin constant region. Immunoglobulin constant region that is known to stimulate removal by immune cells, e.g., macrophages, or trigger destruction of the target by stimulating other immune responses such as the complementary pathway can be also used. Such immunoglobulin constant regions are known in the art, for example, as described in Ravetch and Bolland, IgG Fc receptors, Annu Rev Immuno 2001; 19:275-90.

In some embodiments, a binding agent of the present disclosure binds to an EV protein with a specific affinity. In some embodiments, a binding agent binds to an EV protein with a $K_D$ of less than 500 nM, less than 400 nM, less than 300 nM, less than 200 nM, less than 50 nM, less than 40 nM, less than 30 nM, less than 20 nM, less than 10 nM, or less than 5 nM.

In some embodiments, the binding agent is an ABP that specifically binds to an EV protein selected from consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein. In some embodiments, the binding agent is an ABP that specifically binds to PTGFRN.

In some aspects, the binding agent is an ABP that specifically binds to prostaglandin F2 receptor negative regulator (PTGFRN). In some aspects, the binding agent is an ABP that specifically binds to the extracellular domain of PTGFRN. In some aspects, the binding agent, e.g., the ABP, specifically binds to an epitope within the extracellular domain of PTGFRN. In some aspects, the epitope overlaps all or a portion of an amino acid sequence corresponding to amino acids 26 to 832 of SEQ ID NO: 1. In some aspects, the epitope overlaps all or a portion of an amino acid sequence corresponding to amino acids 26 to 50 of SEQ ID NO: 1. In some aspects, the epitope overlaps all or a portion of an amino acid sequence corresponding to amino acids 50 to 75 of SEQ ID NO: 1. In some aspects, the epitope overlaps all or a portion of an amino acid sequence corresponding to amino acids 75 to 100 of SEQ ID NO: 1. In some aspects, the epitope overlaps all or a portion of an amino acid sequence corresponding to amino acids 100 to 125 of SEQ ID NO: 1. In some aspects, the epitope overlaps all or a portion of an amino acid sequence corresponding to amino acids 125-150 of SEQ ID NO: 1. In some aspects, the epitope overlaps all or a portion of an amino acid sequence corresponding to amino acids 150 to 175 of SEQ ID NO: 1. In some aspects, the epitope overlaps all or a portion of an amino acid sequence corresponding to amino acids 175 to 200 of SEQ ID NO: 1. In some aspects, the epitope overlaps all or a portion of an amino acid sequence corresponding to amino acids 200 to 225 of SEQ ID NO: 1. In some aspects, the epitope overlaps all or a portion of an amino acid sequence corresponding to amino acids 225 to 250 of SEQ ID NO: 1. In some aspects, the epitope overlaps all or a portion of an amino acid sequence corresponding to amino acids 250 to 275 of SEQ ID NO: 1. In some aspects, the epitope overlaps all or a portion of an amino acid sequence corresponding to amino acids 275 to 300 of SEQ ID NO: 1. In some aspects, the epitope overlaps all or a portion of an amino acid sequence corresponding to amino acids 300 to 325 of SEQ ID NO: 1. In some aspects, the epitope overlaps all or a portion of an amino acid sequence corresponding to amino acids 325 to 350 of SEQ ID NO: 1. In some aspects, the epitope overlaps all or a portion of an amino acid sequence corresponding to amino acids 350 to 375 of SEQ ID NO: 1. In some aspects, the epitope overlaps all or a portion of an amino acid sequence corresponding to amino acids 375 to 400 of SEQ ID NO: 1. In some aspects, the epitope overlaps all or a portion of an amino acid sequence corresponding to amino acids 400 to 425 of SEQ ID NO: 1. In some aspects, the epitope overlaps all or a portion of an amino acid sequence corresponding to amino acids 425-450 of SEQ ID NO: 1. In some aspects, the epitope overlaps all or a portion of an amino acid sequence corresponding to amino acids 450 to 475 of SEQ ID NO: 1. In some aspects, the epitope overlaps all or a portion of an amino acid sequence corresponding to amino acids 475 to 500 of SEQ ID NO: 1. In some aspects, the epitope overlaps all or a portion of an amino acid sequence corresponding to amino acids 500 to 525 of SEQ ID NO: 1. In some aspects, the epitope overlaps all or a portion of an amino acid sequence corresponding to amino acids 525 to 550 of SEQ ID NO: 1. In some aspects, the epitope overlaps all or a portion of an amino acid sequence corresponding to amino acids 550 to 575 of SEQ ID NO: 1. In some aspects, the epitope overlaps all or a portion of an amino acid sequence corresponding to amino acids 575 to 600 of SEQ ID NO: 1. In some aspects, the epitope overlaps all or a portion of an amino acid sequence corresponding to amino acids 600 to 625 of SEQ ID NO: 1. In some aspects, the epitope overlaps all or a portion of an amino acid sequence corresponding to amino acids 625 to 650 of SEQ ID NO: 1. In some aspects, the epitope overlaps all or a portion of an amino acid sequence corresponding to amino acids 650 to 675 of SEQ ID NO: 1. In some aspects, the epitope overlaps all or a portion of an amino acid sequence corresponding to amino acids 675 to 700 of SEQ ID NO: 1. In some aspects, the epitope overlaps all or a portion of an amino acid sequence corresponding to amino acids 700 to 725 of SEQ ID NO: 1. In some aspects, the epitope overlaps all or a portion of an amino acid sequence corresponding to amino acids 725-750 of SEQ ID NO: 1. In some aspects, the epitope overlaps all or a portion of an amino acid sequence corresponding to amino acids 750 to 775 of SEQ ID NO: 1. In some aspects, the epitope overlaps all or a portion of an amino acid sequence corresponding to amino acids 775 to 800 of SEQ ID NO: 1. In some aspects, the epitope overlaps all or a portion of an amino acid sequence corresponding to amino acids 800 to 825 of SEQ ID NO: 1. In some aspects, the epitope overlaps all or a portion of an amino acid sequence corresponding to amino acids 825 to 832 of SEQ ID NO: 1.

In some aspects, the binding agent is an ABP that specifically binds to basigin (BSG). In some aspects, the binding agent is an ABP that specifically binds to the extracellular domain of BSG. In some aspects, the binding agent, e.g., the ABP, specifically binds to an epitope within the extracellular domain of BSG. In some aspects, the epitope overlaps all or a portion of an amino acid sequence corresponding to amino acids 138 to 323 of SEQ ID NO: 2. In some aspects, the binding agent is an ABP that specifically binds to the extracellular domain of BSG. In some aspects, the epitope overlaps all or a portion of an amino acid sequence corresponding to amino acids 138-150 of SEQ ID NO: 2. In some aspects, the epitope overlaps all or a portion of an amino acid sequence corresponding to amino acids 150 to 175 of SEQ ID NO: 2. In some aspects, the epitope overlaps all or a portion of an amino acid sequence corresponding to amino acids 175 to 200 of SEQ ID NO: 2. In some aspects, the epitope overlaps all or a portion of an amino acid sequence corresponding to amino acids 200 to 225 of SEQ ID NO: 2. In some aspects, the epitope overlaps all or a portion of an amino acid sequence corresponding to amino acids 225 to 250 of SEQ ID NO: 2. In some aspects, the epitope overlaps all or a portion of an amino acid sequence corresponding to amino acids 250 to 275 of SEQ ID NO: 2. In some aspects, the epitope overlaps all or a portion of an amino acid sequence corresponding to amino acids 275 to 300 of SEQ ID NO: 2. In some aspects, the epitope overlaps all or a portion of an amino acid sequence corresponding to amino acids 300 to 323 of SEQ ID NO: 2.

In some aspects, the binding agent is an ABP that specifically binds to immunoglobulin superfamily member 2 (IGSF2). In some aspects, the binding agent is an ABP that specifically binds to the extracellular domain of IGSF2. In some aspects, the binding agent, e.g., the ABP, specifically binds to an epitope within the extracellular domain of IGSF2. In some aspects, the epitope overlaps all or a portion of an amino acid sequence corresponding to amino acids 21 to 954 of SEQ ID NO: 8. In some aspects, the epitope overlaps all or a portion of an amino acid sequence corresponding to amino acids 21 to 50 of SEQ ID NO: 8. In some aspects, the epitope overlaps all or a portion of an amino acid sequence corresponding to amino acids 50 to 75 of SEQ ID NO: 8. In some aspects, the epitope overlaps all or a portion of an amino acid sequence corresponding to amino acids 75 to 100 of SEQ ID NO: 8. In some aspects, the epitope overlaps all or a portion of an amino acid sequence corresponding to amino acids 100 to 125 of SEQ ID NO: 8. In some aspects, the epitope overlaps all or a portion of an amino acid sequence corresponding to amino acids 125 to 150 of SEQ ID NO: 8. In some aspects, the epitope overlaps all or a portion of an amino acid sequence corresponding to amino acids 150 to 175 of SEQ ID NO: 8. In some aspects, the epitope overlaps all or a portion of an amino acid sequence corresponding to amino acids 175 to 200 of SEQ ID NO: 8. In some aspects, the epitope overlaps all or a portion of an amino acid sequence corresponding to amino acids 200 to 225 of SEQ ID NO: 8. In some aspects, the epitope overlaps all or a portion of an amino acid sequence corresponding to amino acids 225 to 250 of SEQ ID NO: 8. In some aspects, the epitope overlaps all or a portion of an amino acid sequence corresponding to amino acids 250 to 275 of SEQ ID NO: 8. In some aspects, the epitope overlaps all or a portion of an amino acid sequence corresponding to amino acids 275 to 300 of SEQ ID NO: 8. In some aspects, the epitope overlaps all or a portion of an amino acid sequence corresponding to amino acids 300 to 325 of SEQ ID NO: 8. In some aspects, the epitope overlaps all or a portion of an amino acid sequence corresponding to amino acids 325 to 350 of SEQ ID NO: 8. In some aspects, the epitope overlaps all or a portion of an amino acid sequence corresponding to amino acids 350 to 375 of SEQ ID NO: 8. In some aspects, the epitope overlaps all or a portion of an amino acid sequence corresponding to amino acids 375 to 400 of SEQ ID NO: 8. In some aspects, the epitope overlaps all or a portion of an amino acid sequence corresponding to amino acids 400 to 425 of SEQ ID NO: 8. In some aspects, the epitope overlaps all or a portion of an amino acid sequence corresponding to amino acids 425-450 of SEQ ID NO: 8. In some aspects, the epitope overlaps all or a portion of an amino acid sequence corresponding to amino acids 450 to 475 of SEQ ID NO: 8. In some aspects, the epitope overlaps all or a portion of an amino acid sequence corresponding to amino acids 475 to 500 of SEQ ID NO: 8. In some aspects, the epitope overlaps all or a portion of an amino acid sequence corresponding to amino acids 500 to 525 of SEQ ID NO: 8. In some aspects, the epitope overlaps all or a portion of an amino acid sequence corresponding to amino acids 525 to 550 of SEQ ID NO: 8. In some aspects, the epitope overlaps all or a portion of an amino acid sequence corresponding to amino acids 550 to 575 of SEQ ID NO: 8. In some aspects, the epitope overlaps all or a portion of an amino acid sequence corresponding to amino acids 575 to 600 of SEQ ID NO: 8. In some aspects, the epitope overlaps all or a portion of an amino acid sequence corresponding to amino acids 600 to 625 of SEQ ID NO: 8. In some aspects, the epitope overlaps all or a portion of an amino acid sequence corresponding to amino acids 625 to 650 of SEQ ID NO: 8. In some aspects, the epitope overlaps all or a portion of an amino acid sequence corresponding to amino acids 650 to 675 of SEQ ID NO: 8. In some aspects, the epitope overlaps all or a portion of an amino acid sequence corresponding to amino acids 675 to 700 of SEQ ID NO: 8. In some aspects, the epitope overlaps all or a portion of an amino acid sequence corresponding to amino acids 700 to 725 of SEQ ID NO: 8. In some aspects, the epitope overlaps all or a portion of an amino acid sequence corresponding to amino acids 725-750 of SEQ ID NO: 8. In some aspects, the epitope overlaps all or a portion of an amino acid sequence corresponding to amino acids 750 to 775 of SEQ ID NO: 8. In some aspects, the epitope overlaps all or a portion of an amino acid sequence corresponding to amino acids 775 to 800 of SEQ ID NO: 8. In some aspects, the epitope overlaps all or a portion of an amino acid sequence corresponding to amino acids 800 to 825 of SEQ ID NO: 8. In some aspects, the epitope overlaps all or a portion of an amino acid sequence corresponding to amino acids 825 to 850 of SEQ ID NO: 8. In some aspects, the epitope overlaps all or a portion of an amino acid sequence corresponding to amino acids 850 to 875 of SEQ ID NO: 8. In some aspects, the epitope overlaps all or a portion of an amino acid sequence corresponding to amino acids 875 to 900 of SEQ ID NO: 8. In some aspects, the epitope overlaps all or a portion of an amino acid sequence corresponding to amino acids 900 to 925 of SEQ ID NO: 8. In some aspects, the epitope overlaps all or a portion of an amino acid sequence corresponding to amino acids 925 to 954 of SEQ ID NO: 8.

In some aspects, the binding agent is an ABP that specifically binds to immunoglobulin superfamily member 3 (IGSF3). In some aspects, the binding agent is an ABP that specifically binds to the extracellular domain of IGSF3. In some aspects, the binding agent, e.g., the ABP, specifically binds to an epitope within the extracellular domain of IGSF3. In some aspects, the epitope overlaps all or a portion of an amino acid sequence corresponding to amino acids 20 to 1124 of SEQ ID NO: 4. In some aspects, the epitope overlaps all or a portion of an amino acid sequence corresponding to amino acids 26 to 50 of SEQ ID NO: 4. In some aspects, the epitope overlaps all or a portion of an amino acid sequence corresponding to amino acids 50 to 75 of SEQ ID NO: 4. In some aspects, the epitope overlaps all or a portion of an amino acid sequence corresponding to amino acids 75 to 100 of SEQ ID NO: 4. In some aspects, the epitope overlaps all or a portion of an amino acid sequence corresponding to amino acids 100 to 125 of SEQ ID NO: 4. In some aspects, the epitope overlaps all or a portion of an amino acid sequence corresponding to amino acids 125 to 150 of SEQ ID NO: 4. In some aspects, the epitope overlaps all or a portion of an amino acid sequence corresponding to amino acids 150 to 175 of SEQ ID NO: 4. In some aspects, the epitope overlaps all or a portion of an amino acid sequence corresponding to amino acids 175 to 200 of SEQ ID NO: 4. In some aspects, the epitope overlaps all or a portion of an amino acid sequence corresponding to amino acids 200 to 225 of SEQ ID NO: 4. In some aspects, the epitope overlaps all or a portion of an amino acid sequence corresponding to amino acids 225 to 250 of SEQ ID NO: 4. In some aspects, the epitope overlaps all or a portion of an amino acid sequence corresponding to amino acids 250 to 275 of SEQ ID NO: 4. In some aspects, the epitope overlaps all or a portion of an amino acid sequence corresponding to amino acids 275 to 300 of SEQ ID NO: 4. In some aspects, the epitope overlaps all or a portion of an amino acid sequence corresponding to amino acids 300 to 325 of SEQ ID NO: 4. In some aspects, the epitope overlaps all or a portion of an amino acid sequence corresponding to amino acids 325 to 350 of SEQ ID NO: 4. In some aspects, the epitope overlaps all or a portion of an amino acid sequence corresponding to amino acids 350 to 375 of SEQ ID NO: 4. In some aspects, the epitope overlaps all or a portion of an amino acid sequence corresponding to amino acids 375 to 400 of SEQ ID NO: 4. In some aspects, the epitope overlaps all or a portion of an amino acid sequence corresponding to amino acids 400 to 425 of SEQ ID NO: 4. In some aspects, the epitope overlaps all or a portion of an amino acid sequence corresponding to amino acids 425-450 of SEQ ID NO: 4. In some aspects, the epitope overlaps all or a portion of an amino acid sequence corresponding to amino acids 450 to 475 of SEQ ID NO: 4. In some aspects, the epitope overlaps all or a portion of an amino acid sequence corresponding to amino acids 475 to 500 of SEQ ID NO: 4. In some aspects, the epitope overlaps all or a portion of an amino acid sequence corresponding to amino acids 500 to 525 of SEQ ID NO: 4. In some aspects, the epitope overlaps all or a portion of an amino acid sequence corresponding to amino acids 525 to 550 of SEQ ID NO: 4. In some aspects, the epitope overlaps all or a portion of an amino acid sequence corresponding to amino acids 550 to 575 of SEQ ID NO: 4. In some aspects, the epitope overlaps all or a portion of an amino acid sequence corresponding to amino acids 575 to 600 of SEQ ID NO: 4. In some aspects, the epitope overlaps all or a portion of an amino acid sequence corresponding to amino acids 600 to 625 of SEQ ID NO: 4. In some aspects, the epitope overlaps all or a portion of an amino acid sequence corresponding to amino acids 625 to 650 of SEQ ID NO: 4. In some aspects, the epitope overlaps all or a portion of an amino acid sequence corresponding to amino acids 650 to 675 of SEQ ID NO: 4. In some aspects, the epitope overlaps all or a portion of an amino acid sequence corresponding to amino acids 675 to 700 of SEQ ID NO: 4. In some aspects, the epitope overlaps all or a portion of an amino acid sequence corresponding to amino acids 700 to 725 of SEQ ID NO: 4. In some aspects, the epitope overlaps all or a portion of an amino acid sequence corresponding to amino acids 725-750 of SEQ ID NO: 4. In some aspects, the epitope overlaps all or a portion of an amino acid sequence corresponding to amino acids 750 to 775 of SEQ ID NO: 4. In some aspects, the epitope overlaps all or a portion of an amino acid sequence corresponding to amino acids 775 to 800 of SEQ ID NO: 4. In some aspects, the epitope overlaps all or a portion of an amino acid sequence corresponding to amino acids 800 to 825 of SEQ ID NO: 4. In some aspects, the epitope overlaps all or a portion of an amino acid sequence corresponding to amino acids 825 to 850 of SEQ ID NO: 4. In some aspects, the epitope overlaps all or a portion of an amino acid sequence corresponding to amino acids 850 to 875 of SEQ ID NO: 4. In some aspects, the epitope overlaps all or a portion of an amino acid sequence corresponding to amino acids 875 to 900 of SEQ ID NO: 4. In some aspects, the epitope overlaps all or a portion of an amino acid sequence corresponding to amino acids 900 to 925 of SEQ ID NO: 4. In some aspects, the epitope overlaps all or a portion of an amino acid sequence corresponding to amino acids 925 to 950 of SEQ ID NO: 4. In some aspects, the epitope overlaps all or a portion of an amino acid sequence corresponding to amino acids 950 to 975 of SEQ ID NO: 4. In some aspects, the epitope overlaps all or a portion of an amino acid sequence corresponding to amino acids 975 to 1000 of SEQ ID NO: 4. In some aspects, the epitope overlaps all or a portion of an amino acid sequence corresponding to amino acids 1000 to 1025 of SEQ ID NO: 4. In some aspects, the epitope overlaps all or a portion of an amino acid sequence corresponding to amino acids 1025 to 1050 of SEQ ID NO: 4. In some aspects, the epitope overlaps all or a portion of an amino acid sequence corresponding to amino acids 1050 to 1075 of SEQ ID NO: 4. In some aspects, the epitope overlaps all or a portion of an amino acid sequence corresponding to amino acids 1075 to 1100 of SEQ ID NO: 4. In some aspects, the epitope overlaps all or a portion of an amino acid sequence corresponding to amino acids 1100 to 1124 of SEQ ID NO: 4.

In some aspects, the binding agent is an ABP that specifically binds to immunoglobulin superfamily member 8 (IGSF8). In some aspects, the binding agent is an ABP that specifically binds to the extracellular domain of IGSF8. In some aspects, the binding agent, e.g., the ABP, specifically binds to an epitope within the extracellular domain of IGSF8. In some aspects, the epitope overlaps all or a portion of an amino acid sequence corresponding to amino acids 28 to 579 of SEQ ID NO: 3. In some aspects, the epitope overlaps all or a portion of an amino acid sequence corresponding to amino acids 28 to 50 of SEQ ID NO: 3. In some aspects, the epitope overlaps all or a portion of an amino acid sequence corresponding to amino acids 50 to 75 of SEQ ID NO: 3. In some aspects, the epitope overlaps all or a portion of an amino acid sequence corresponding to amino acids 75 to 100 of SEQ ID NO: 3. In some aspects, the epitope overlaps all or a portion of an amino acid sequence corresponding to amino acids 100 to 125 of SEQ ID NO: 3. In some aspects, the epitope overlaps all or a portion of an amino acid sequence corresponding to amino acids 125-150 of SEQ ID NO: 3. In some aspects, the epitope overlaps all or a portion of an amino acid sequence corresponding to amino acids 150 to 175 of SEQ ID NO: 3. In some aspects, the epitope overlaps all or a portion of an amino acid sequence corresponding to amino acids 175 to 200 of SEQ ID NO: 3. In some aspects, the epitope overlaps all or a portion of an amino acid sequence corresponding to amino acids 200 to 225 of SEQ ID NO: 3. In some aspects, the epitope overlaps all or a portion of an amino acid sequence corresponding to amino acids 225 to 250 of SEQ ID NO: 3. In some aspects, the epitope overlaps all or a portion of an amino acid sequence corresponding to amino acids 250 to 275 of SEQ ID NO: 3. In some aspects, the epitope overlaps all or a portion of an amino acid sequence corresponding to amino acids 275 to 300 of SEQ ID NO: 3. In some aspects, the epitope overlaps all or a portion of an amino acid sequence corresponding to amino acids 300 to 325 of SEQ ID NO: 3. In some aspects, the epitope overlaps all or a portion of an amino acid sequence corresponding to amino acids 325 to 350 of SEQ ID NO: 3. In some aspects, the epitope overlaps all or a portion of an amino acid sequence corresponding to amino acids 350 to 375 of SEQ ID NO: 3. In some aspects, the epitope overlaps all or a portion of an amino acid sequence corresponding to amino acids 375 to 400 of SEQ ID NO: 3. In some aspects, the epitope overlaps all or a portion of an amino acid sequence corresponding to amino acids 400 to 425 of SEQ ID NO: 3. In some aspects, the epitope overlaps all or a portion of an amino acid sequence corresponding to amino acids 425-450 of SEQ ID NO: 3. In some aspects, the epitope overlaps all or a portion of an amino acid sequence corresponding to amino acids 450 to 475 of SEQ ID NO: 3. In some aspects, the epitope overlaps all or a portion of an amino acid sequence corresponding to amino acids 475 to 500 of SEQ ID NO: 3. In some aspects, the epitope overlaps all or a portion of an amino acid sequence corresponding to amino acids 500 to 525 of SEQ ID NO: 3. In some aspects, the epitope overlaps all or a portion of an amino acid sequence corresponding to amino acids 525 to 550 of SEQ ID NO: 3. In some aspects, the epitope overlaps all or a portion of an amino acid sequence corresponding to amino acids 550 to 579 of SEQ ID NO: 3.

In some aspects, the binding agent is an ABP that specifically binds to integrin beta-1 (ITGB1). In some aspects, the binding agent is an ABP that specifically binds to the extracellular domain of ITGB1. In some aspects, the binding agent, e.g., the ABP, specifically binds to an epitope within the extracellular domain of ITGB1. In some aspects, the epitope overlaps all or a portion of an amino acid sequence corresponding to amino acids 21 to 728 of SEQ ID NO: 5. In some aspects, the epitope overlaps all or a portion of an amino acid sequence corresponding to amino acids 21 to 50 of SEQ ID NO: 5. In some aspects, the epitope overlaps all or a portion of an amino acid sequence corresponding to amino acids 50 to 75 of SEQ ID NO: 5. In some aspects, the epitope overlaps all or a portion of an amino acid sequence corresponding to amino acids 75 to 100 of SEQ ID NO: 5. In some aspects, the epitope overlaps all or a portion of an amino acid sequence corresponding to amino acids 100 to 125 of SEQ ID NO: 5. In some aspects, the epitope overlaps all or a portion of an amino acid sequence corresponding to amino acids 125 to 150 of SEQ ID NO: 5. In some aspects, the epitope overlaps all or a portion of an amino acid sequence corresponding to amino acids 150 to 175 of SEQ ID NO: 5. In some aspects, the epitope overlaps all or a portion of an amino acid sequence corresponding to amino acids 175 to 200 of SEQ ID NO: 5. In some aspects, the epitope overlaps all or a portion of an amino acid sequence corresponding to amino acids 200 to 225 of SEQ ID NO: 5. In some aspects, the epitope overlaps all or a portion of an amino acid sequence corresponding to amino acids 225 to 250 of SEQ ID NO: 5. In some aspects, the epitope overlaps all or a portion of an amino acid sequence corresponding to amino acids 250 to 275 of SEQ ID NO: 5. In some aspects, the epitope overlaps all or a portion of an amino acid sequence corresponding to amino acids 275 to 300 of SEQ ID NO: 5. In some aspects, the epitope overlaps all or a portion of an amino acid sequence corresponding to amino acids 300 to 325 of SEQ ID NO: 5. In some aspects, the epitope overlaps all or a portion of an amino acid sequence corresponding to amino acids 325 to 350 of SEQ ID NO: 5. In some aspects, the epitope overlaps all or a portion of an amino acid sequence corresponding to amino acids 350 to 375 of SEQ ID NO: 5. In some aspects, the epitope overlaps all or a portion of an amino acid sequence corresponding to amino acids 375 to 400 of SEQ ID NO: 5. In some aspects, the epitope overlaps all or a portion of an amino acid sequence corresponding to amino acids 400 to 425 of SEQ ID NO: 5. In some aspects, the epitope overlaps all or a portion of an amino acid sequence corresponding to amino acids 425-450 of SEQ ID NO: 5. In some aspects, the epitope overlaps all or a portion of an amino acid sequence corresponding to amino acids 450 to 475 of SEQ ID NO: 5. In some aspects, the epitope overlaps all or a portion of an amino acid sequence corresponding to amino acids 475 to 500 of SEQ ID NO: 5. In some aspects, the epitope overlaps all or a portion of an amino acid sequence corresponding to amino acids 500 to 525 of SEQ ID NO: 5. In some aspects, the epitope overlaps all or a portion of an amino acid sequence corresponding to amino acids 525 to 550 of SEQ ID NO: 5. In some aspects, the epitope overlaps all or a portion of an amino acid sequence corresponding to amino acids 550 to 575 of SEQ ID NO: 5. In some aspects, the epitope overlaps all or a portion of an amino acid sequence corresponding to amino acids 575 to 600 of SEQ ID NO: 5. In some aspects, the epitope overlaps all or a portion of an amino acid sequence corresponding to amino acids 600 to 625 of SEQ ID NO: 5. In some aspects, the epitope overlaps all or a portion of an amino acid sequence corresponding to amino acids 625 to 650 of SEQ ID NO: 5. In some aspects, the epitope overlaps all or a portion of an amino acid sequence corresponding to amino acids 650 to 675 of SEQ ID NO: 5. In some aspects, the epitope overlaps all or a portion of an amino acid sequence corresponding to amino acids 675 to 700 of SEQ ID NO: 5. In some aspects, the epitope overlaps all or a portion of an amino acid sequence corresponding to amino acids 700 to 728 of SEQ ID NO: 5.

In some aspects, the binding agent is an ABP that specifically binds to integrin alpha-4 (ITGA4). In some aspects, the binding agent is an ABP that specifically binds to the extracellular domain of ITGA4. In some aspects, the binding agent, e.g., the ABP, specifically binds to an epitope within the extracellular domain of ITGA4. In some aspects, the epitope overlaps all or a portion of an amino acid sequence corresponding to amino acids 35 to 977 of SEQ ID NO: 6. In some aspects, the epitope overlaps all or a portion of an amino acid sequence corresponding to amino acids 35 to 50 of SEQ ID NO: 6. In some aspects, the epitope overlaps all or a portion of an amino acid sequence corresponding to amino acids 50 to 75 of SEQ ID NO: 6. In some aspects, the epitope overlaps all or a portion of an amino acid sequence corresponding to amino acids 75 to 100 of SEQ ID NO: 6. In some aspects, the epitope overlaps all or a portion of an amino acid sequence corresponding to amino acids 100 to 125 of SEQ ID NO: 6. In some aspects, the epitope overlaps all or a portion of an amino acid sequence corresponding to amino acids 125 to 150 of SEQ ID NO: 6. In some aspects, the epitope overlaps all or a portion of an amino acid sequence corresponding to amino acids 150 to 175 of SEQ ID NO: 6. In some aspects, the epitope overlaps all or a portion of an amino acid sequence corresponding to amino acids 175 to 200 of SEQ ID NO: 6. In some aspects, the epitope overlaps all or a portion of an amino acid sequence corresponding to amino acids 200 to 225 of SEQ ID NO: 6. In some aspects, the epitope overlaps all or a portion of an amino acid sequence corresponding to amino acids 225 to 250 of SEQ ID NO: 6. In some aspects, the epitope overlaps all or a portion of an amino acid sequence corresponding to amino acids 250 to 275 of SEQ ID NO: 6. In some aspects, the epitope overlaps all or a portion of an amino acid sequence corresponding to amino acids 275 to 300 of SEQ ID NO: 6. In some aspects, the epitope overlaps all or a portion of an amino acid sequence corresponding to amino acids 300 to 325 of SEQ ID NO: 6. In some aspects, the epitope overlaps all or a portion of an amino acid sequence corresponding to amino acids 325 to 350 of SEQ ID NO: 6. In some aspects, the epitope overlaps all or a portion of an amino acid sequence corresponding to amino acids 350 to 375 of SEQ ID NO: 6. In some aspects, the epitope overlaps all or a portion of an amino acid sequence corresponding to amino acids 375 to 400 of SEQ ID NO: 6. In some aspects, the epitope overlaps all or a portion of an amino acid sequence corresponding to amino acids 400 to 425 of SEQ ID NO: 6. In some aspects, the epitope overlaps all or a portion of an amino acid sequence corresponding to amino acids 425-450 of SEQ ID NO: 6. In some aspects, the epitope overlaps all or a portion of an amino acid sequence corresponding to amino acids 450 to 475 of SEQ ID NO: 6. In some aspects, the epitope overlaps all or a portion of an amino acid sequence corresponding to amino acids 475 to 500 of SEQ ID NO: 6. In some aspects, the epitope overlaps all or a portion of an amino acid sequence corresponding to amino acids 500 to 525 of SEQ ID NO: 6. In some aspects, the epitope overlaps all or a portion of an amino acid sequence corresponding to amino acids 525 to 550 of SEQ ID NO: 6. In some aspects, the epitope overlaps all or a portion of an amino acid sequence corresponding to amino acids 550 to 575 of SEQ ID NO: 6. In some aspects, the epitope overlaps all or a portion of an amino acid sequence corresponding to amino acids 575 to 600 of SEQ ID NO: 6. In some aspects, the epitope overlaps all or a portion of an amino acid sequence corresponding to amino acids 600 to 625 of SEQ ID NO: 6. In some aspects, the epitope overlaps all or a portion of an amino acid sequence corresponding to amino acids 625 to 650 of SEQ ID NO: 6. In some aspects, the epitope overlaps all or a portion of an amino acid sequence corresponding to amino acids 650 to 675 of SEQ ID NO: 6. In some aspects, the epitope overlaps all or a portion of an amino acid sequence corresponding to amino acids 675 to 700 of SEQ ID NO: 6. In some aspects, the epitope overlaps all or a portion of an amino acid sequence corresponding to amino acids 700 to 725 of SEQ ID NO: 6. In some aspects, the epitope overlaps all or a portion of an amino acid sequence corresponding to amino acids 725-750 of SEQ ID NO: 6. In some aspects, the epitope overlaps all or a portion of an amino acid sequence corresponding to amino acids 750 to 775 of SEQ ID NO: 6. In some aspects, the epitope overlaps all or a portion of an amino acid sequence corresponding to amino acids 775 to 800 of SEQ ID NO: 6. In some aspects, the epitope overlaps all or a portion of an amino acid sequence corresponding to amino acids 800 to 825 of SEQ ID NO: 6. In some aspects, the epitope overlaps all or a portion of an amino acid sequence corresponding to amino acids 825 to 850 of SEQ ID NO: 6. In some aspects, the epitope overlaps all or a portion of an amino acid sequence corresponding to amino acids 850 to 875 of SEQ ID NO: 6. In some aspects, the epitope overlaps all or a portion of an amino acid sequence corresponding to amino acids 875 to 900 of SEQ ID NO: 6. In some aspects, the epitope overlaps all or a portion of an amino acid sequence corresponding to amino acids 900 to 925 of SEQ ID NO: 6. In some aspects, the epitope overlaps all or a portion of an amino acid sequence corresponding to amino acids 925 to 950 of SEQ ID NO: 6. In some aspects, the epitope overlaps all or a portion of an amino acid sequence corresponding to amino acids 950 to 977 of SEQ ID NO: 6.

In some aspects, the binding agent is an ABP that specifically binds to 4F2 cell-surface antigen heavy chain (SLC3A2). In some aspects, the binding agent is an ABP that specifically binds to the extracellular domain of SLC3A2. In some aspects, the binding agent, e.g., the ABP, specifically binds to an epitope within the extracellular domain of SLC3A2. In some aspects, the epitope overlaps all or a portion of an amino acid sequence corresponding to amino acids 206 to 630 of SEQ ID NO: 7. In some aspects, the epitope overlaps all or a portion of an amino acid sequence corresponding to amino acids 206 to 225 of SEQ ID NO: 7. In some aspects, the epitope overlaps all or a portion of an amino acid sequence corresponding to amino acids 225 to 250 of SEQ ID NO: 7. In some aspects, the epitope overlaps all or a portion of an amino acid sequence corresponding to amino acids 250 to 275 of SEQ ID NO: 7. In some aspects, the epitope overlaps all or a portion of an amino acid sequence corresponding to amino acids 275 to 300 of SEQ ID NO: 7. In some aspects, the epitope overlaps all or a portion of an amino acid sequence corresponding to amino acids 300 to 325 of SEQ ID NO: 7. In some aspects, the epitope overlaps all or a portion of an amino acid sequence corresponding to amino acids 325 to 350 of SEQ ID NO: 7. In some aspects, the epitope overlaps all or a portion of an amino acid sequence corresponding to amino acids 350 to 375 of SEQ ID NO: 7. In some aspects, the epitope overlaps all or a portion of an amino acid sequence corresponding to amino acids 375 to 400 of SEQ ID NO: 7. In some aspects, the epitope overlaps all or a portion of an amino acid sequence corresponding to amino acids 400 to 425 of SEQ ID NO: 7. In some aspects, the epitope overlaps all or a portion of an amino acid sequence corresponding to amino acids 425-450 of SEQ ID NO: 7. In some aspects, the epitope overlaps all or a portion of an amino acid sequence corresponding to amino acids 450 to 475 of SEQ ID NO: 7. In some aspects, the epitope overlaps all or a portion of an amino acid sequence corresponding to amino acids 475 to 500 of SEQ ID NO: 7. In some aspects, the epitope overlaps all or a portion of an amino acid sequence corresponding to amino acids 500 to 525 of SEQ ID NO: 7. In some aspects, the epitope overlaps all or a portion of an amino acid sequence corresponding to amino acids 525 to 550 of SEQ ID NO: 7. In some aspects, the epitope overlaps all or a portion of an amino acid sequence corresponding to amino acids 550 to 575 of SEQ ID NO: 7. In some aspects, the epitope overlaps all or a portion of an amino acid sequence corresponding to amino acids 575 to 600 of SEQ ID NO: 7.

In some aspects, the epitope overlaps all or a portion of an amino acid sequence corresponding to amino acids 600 to 630 of SEQ ID NO: 7.

In some aspects, the binding agent is an ABP that specifically binds to an ATP transporter protein. In some aspects, the binding agent is an ABP that specifically binds to the extracellular domain of an ATP transporter protein. In some aspects, the ATP transporter protein is selected from ATP1A1, ATP1A2, ATP1A3, ATP1A4, ATP1A5, ATP2B1, ATP2B2, ATP2B3, and ATP2B4. In some aspects, the binding agent is an ABP that specifically binds to the extracellular domain of ATP1A1. In some aspects, the binding agent is an ABP that specifically binds to the extracellular domain of ATP1A2. In some aspects, the binding agent is an ABP that specifically binds to the extracellular domain of ATP1A3. In some aspects, the binding agent is an ABP that specifically binds to the extracellular domain of ATP1A4. In some aspects, the binding agent is an ABP that specifically binds to the extracellular domain of ATP1A5. In some aspects, the binding agent is an ABP that specifically binds to the extracellular domain of ATP2B1. In some aspects, the binding agent is an ABP that specifically binds to the extracellular domain of ATP2B2. In some aspects, the binding agent is an ABP that specifically binds to the extracellular domain of ATP2B3. In some aspects, the binding agent is an ABP that specifically binds to the extracellular domain of ATP2B4.

In some aspects, the binding agent is an ABP that specifically binds to CD13 protein. In some aspects, the binding agent is an ABP that specifically binds to the extracellular domain of CD13 protein. In some aspects, the binding agent, e.g., the ABP, specifically binds to an epitope within the extracellular domain of CD13. In some aspects, the epitope overlaps all or a portion of an amino acid sequence corresponding to amino acids 33 to 967 of SEQ ID NO: 9. In some aspects, the epitope overlaps all or a portion of an amino acid sequence corresponding to amino acids 33 to 50 of SEQ ID NO: 9. In some aspects, the epitope overlaps all or a portion of an amino acid sequence corresponding to amino acids 50 to 75 of SEQ ID NO: 9. In some aspects, the epitope overlaps all or a portion of an amino acid sequence corresponding to amino acids 75 to 100 of SEQ ID NO: 9. In some aspects, the epitope overlaps all or a portion of an amino acid sequence corresponding to amino acids 100 to 125 of SEQ ID NO: 9. In some aspects, the epitope overlaps all or a portion of an amino acid sequence corresponding to amino acids 125 to 150 of SEQ ID NO: 9. In some aspects, the epitope overlaps all or a portion of an amino acid sequence corresponding to amino acids 150 to 175 of SEQ ID NO: 9. In some aspects, the epitope overlaps all or a portion of an amino acid sequence corresponding to amino acids 175 to 200 of SEQ ID NO: 9. In some aspects, the epitope overlaps all or a portion of an amino acid sequence corresponding to amino acids 200 to 225 of SEQ ID NO: 9. In some aspects, the epitope overlaps all or a portion of an amino acid sequence corresponding to amino acids 225 to 250 of SEQ ID NO: 9. In some aspects, the epitope overlaps all or a portion of an amino acid sequence corresponding to amino acids 250 to 275 of SEQ ID NO: 9. In some aspects, the epitope overlaps all or a portion of an amino acid sequence corresponding to amino acids 275 to 300 of SEQ ID NO: 9. In some aspects, the epitope overlaps all or a portion of an amino acid sequence corresponding to amino acids 300 to 325 of SEQ ID NO: 9. In some aspects, the epitope overlaps all or a portion of an amino acid sequence corresponding to amino acids 325 to 350 of SEQ ID NO: 9. In some aspects, the epitope overlaps all or a portion of an amino acid sequence corresponding to amino acids 350 to 375 of SEQ ID NO: 9. In some aspects, the epitope overlaps all or a portion of an amino acid sequence corresponding to amino acids 375 to 400 of SEQ ID NO: 9. In some aspects, the epitope overlaps all or a portion of an amino acid sequence corresponding to amino acids 400 to 425 of SEQ ID NO: 9. In some aspects, the epitope overlaps all or a portion of an amino acid sequence corresponding to amino acids 425-450 of SEQ ID NO: 9. In some aspects, the epitope overlaps all or a portion of an amino acid sequence corresponding to amino acids 450 to 475 of SEQ ID NO: 9. In some aspects, the epitope overlaps all or a portion of an amino acid sequence corresponding to amino acids 475 to 500 of SEQ ID NO: 9. In some aspects, the epitope overlaps all or a portion of an amino acid sequence corresponding to amino acids 500 to 525 of SEQ ID NO: 9. In some aspects, the epitope overlaps all or a portion of an amino acid sequence corresponding to amino acids 525 to 550 of SEQ ID NO: 9. In some aspects, the epitope overlaps all or a portion of an amino acid sequence corresponding to amino acids 550 to 575 of SEQ ID NO: 9. In some aspects, the epitope overlaps all or a portion of an amino acid sequence corresponding to amino acids 575 to 600 of SEQ ID NO: 9. In some aspects, the epitope overlaps all or a portion of an amino acid sequence corresponding to amino acids 600 to 625 of SEQ ID NO: 9. In some aspects, the epitope overlaps all or a portion of an amino acid sequence corresponding to amino acids 625 to 650 of SEQ ID NO: 9. In some aspects, the epitope overlaps all or a portion of an amino acid sequence corresponding to amino acids 650 to 675 of SEQ ID NO: 9. In some aspects, the epitope overlaps all or a portion of an amino acid sequence corresponding to amino acids 675 to 700 of SEQ ID NO: 9. In some aspects, the epitope overlaps all or a portion of an amino acid sequence corresponding to amino acids 700 to 725 of SEQ ID NO: 9. In some aspects, the epitope overlaps all or a portion of an amino acid sequence corresponding to amino acids 725-750 of SEQ ID NO: 9. In some aspects, the epitope overlaps all or a portion of an amino acid sequence corresponding to amino acids 750 to 775 of SEQ ID NO: 9. In some aspects, the epitope overlaps all or a portion of an amino acid sequence corresponding to amino acids 775 to 800 of SEQ ID NO: 9. In some aspects, the epitope overlaps all or a portion of an amino acid sequence corresponding to amino acids 800 to 825 of SEQ ID NO: 9. In some aspects, the epitope overlaps all or a portion of an amino acid sequence corresponding to amino acids 825 to 850 of SEQ ID NO: 9. In some aspects, the epitope overlaps all or a portion of an amino acid sequence corresponding to amino acids 850 to 875 of SEQ ID NO: 9. In some aspects, the epitope overlaps all or a portion of an amino acid sequence corresponding to amino acids 875 to 900 of SEQ ID NO: 9. In some aspects, the epitope overlaps all or a portion of an amino acid sequence corresponding to amino acids 900 to 925 of SEQ ID NO: 9. In some aspects, the epitope overlaps all or a portion of an amino acid sequence corresponding to amino acids 925 to 950 of SEQ ID NO: 9. In some aspects, the epitope overlaps all or a portion of an amino acid sequence corresponding to amino acids 950 to 967 of SEQ ID NO: 9.

In some aspects, the binding agent is an ABP that specifically binds to MME protein. In some aspects, the binding agent is an ABP that specifically binds to the extracellular domain of MME protein. In some aspects, the binding agent, e.g., the ABP, specifically binds to an epitope within the extracellular domain of MME. In some aspects, the epitope overlaps all or a portion of an amino acid sequence corresponding to amino acids 52 to 750 of SEQ ID NO: 10. In some aspects, the epitope overlaps all or a portion of an amino acid sequence corresponding to amino acids 52 to 75 of SEQ ID NO: 10. In some aspects, the epitope overlaps all or a portion of an amino acid sequence corresponding to amino acids 75 to 100 of SEQ ID NO: 10. In some aspects, the epitope overlaps all or a portion of an amino acid sequence corresponding to amino acids 100 to 125 of SEQ ID NO: 10. In some aspects, the epitope overlaps all or a portion of an amino acid sequence corresponding to amino acids 125 to 150 of SEQ ID NO: 10. In some aspects, the epitope overlaps all or a portion of an amino acid sequence corresponding to amino acids 150 to 175 of SEQ ID NO: 10. In some aspects, the epitope overlaps all or a portion of an amino acid sequence corresponding to amino acids 175 to 200 of SEQ ID NO: 10. In some aspects, the epitope overlaps all or a portion of an amino acid sequence corresponding to amino acids 200 to 225 of SEQ ID NO: 10. In some aspects, the epitope overlaps all or a portion of an amino acid sequence corresponding to amino acids 225 to 250 of SEQ ID NO: 10. In some aspects, the epitope overlaps all or a portion of an amino acid sequence corresponding to amino acids 250 to 275 of SEQ ID NO: 10. In some aspects, the epitope overlaps all or a portion of an amino acid sequence corresponding to amino acids 275 to 300 of SEQ ID NO: 10. In some aspects, the epitope overlaps all or a portion of an amino acid sequence corresponding to amino acids 300 to 325 of SEQ ID NO: 10. In some aspects, the epitope overlaps all or a portion of an amino acid sequence corresponding to amino acids 325 to 350 of SEQ ID NO: 10. In some aspects, the epitope overlaps all or a portion of an amino acid sequence corresponding to amino acids 350 to 375 of SEQ ID NO: 10. In some aspects, the epitope overlaps all or a portion of an amino acid sequence corresponding to amino acids 375 to 400 of SEQ ID NO: 10. In some aspects, the epitope overlaps all or a portion of an amino acid sequence corresponding to amino acids 400 to 425 of SEQ ID NO: 10. In some aspects, the epitope overlaps all or a portion of an amino acid sequence corresponding to amino acids 425-450 of SEQ ID NO: 10. In some aspects, the epitope overlaps all or a portion of an amino acid sequence corresponding to amino acids 450 to 475 of SEQ ID NO: 10. In some aspects, the epitope overlaps all or a portion of an amino acid sequence corresponding to amino acids 475 to 500 of SEQ ID NO: 10. In some aspects, the epitope overlaps all or a portion of an amino acid sequence corresponding to amino acids 500 to 525 of SEQ ID NO: 10. In some aspects, the epitope overlaps all or a portion of an amino acid sequence corresponding to amino acids 525 to 550 of SEQ ID NO: 10. In some aspects, the epitope overlaps all or a portion of an amino acid sequence corresponding to amino acids 550 to 575 of SEQ ID NO: 10. In some aspects, the epitope overlaps all or a portion of an amino acid sequence corresponding to amino acids 575 to 600 of SEQ ID NO: 10. In some aspects, the epitope overlaps all or a portion of an amino acid sequence corresponding to amino acids 600 to 625 of SEQ ID NO: 10. In some aspects, the epitope overlaps all or a portion of an amino acid sequence corresponding to amino acids 625 to 650 of SEQ ID NO: 10. In some aspects, the epitope overlaps all or a portion of an amino acid sequence corresponding to amino acids 650 to 675 of SEQ ID NO: 10. In some aspects, the epitope overlaps all or a portion of an amino acid sequence corresponding to amino acids 675 to 700 of SEQ ID NO: 10. In some aspects, the epitope overlaps all or a portion of an amino acid sequence corresponding to amino acids 700 to 725 of SEQ ID NO: 10. In some aspects, the epitope overlaps all or a portion of an amino acid sequence corresponding to amino acids 725-750 of SEQ ID NO: 10.

In some aspects, the binding agent is an ABP that specifically binds to ENPP1 protein. In some aspects, the binding agent is an ABP that specifically binds to the extracellular domain of ENPP1 protein. In some aspects, the binding agent, e.g., the ABP, specifically binds to an epitope within the extracellular domain of ENPP1. In some aspects, the epitope overlaps all or a portion of an amino acid sequence corresponding to amino acids 98 to 925 of SEQ ID NO: 11. In some aspects, the epitope overlaps all or a portion of an amino acid sequence corresponding to amino acids 98 to 125 of SEQ ID NO: 11. In some aspects, the epitope overlaps all or a portion of an amino acid sequence corresponding to amino acids 125 to 150 of SEQ ID NO: 11. In some aspects, the epitope overlaps all or a portion of an amino acid sequence corresponding to amino acids 150 to 175 of SEQ ID NO: 11. In some aspects, the epitope overlaps all or a portion of an amino acid sequence corresponding to amino acids 175 to 200 of SEQ ID NO: 11. In some aspects, the epitope overlaps all or a portion of an amino acid sequence corresponding to amino acids 200 to 225 of SEQ ID NO: 11. In some aspects, the epitope overlaps all or a portion of an amino acid sequence corresponding to amino acids 225 to 250 of SEQ ID NO: 11. In some aspects, the epitope overlaps all or a portion of an amino acid sequence corresponding to amino acids 250 to 275 of SEQ ID NO: 11. In some aspects, the epitope overlaps all or a portion of an amino acid sequence corresponding to amino acids 275 to 300 of SEQ ID NO: 11. In some aspects, the epitope overlaps all or a portion of an amino acid sequence corresponding to amino acids 300 to 325 of SEQ ID NO: 11. In some aspects, the epitope overlaps all or a portion of an amino acid sequence corresponding to amino acids 325 to 350 of SEQ ID NO: 11. In some aspects, the epitope overlaps all or a portion of an amino acid sequence corresponding to amino acids 350 to 375 of SEQ ID NO: 11. In some aspects, the epitope overlaps all or a portion of an amino acid sequence corresponding to amino acids 375 to 400 of SEQ ID NO: 11. In some aspects, the epitope overlaps all or a portion of an amino acid sequence corresponding to amino acids 400 to 425 of SEQ ID NO: 11. In some aspects, the epitope overlaps all or a portion of an amino acid sequence corresponding to amino acids 425-450 of SEQ ID NO: 11. In some aspects, the epitope overlaps all or a portion of an amino acid sequence corresponding to amino acids 450 to 475 of SEQ ID NO: 11. In some aspects, the epitope overlaps all or a portion of an amino acid sequence corresponding to amino acids 475 to 500 of SEQ ID NO: 11. In some aspects, the epitope overlaps all or a portion of an amino acid sequence corresponding to amino acids 500 to 525 of SEQ ID NO: 11. In some aspects, the epitope overlaps all or a portion of an amino acid sequence corresponding to amino acids 525 to 550 of SEQ ID NO: 11. In some aspects, the epitope overlaps all or a portion of an amino acid sequence corresponding to amino acids 550 to 575 of SEQ ID NO: 11. In some aspects, the epitope overlaps all or a portion of an amino acid sequence corresponding to amino acids 575 to 600 of SEQ ID NO: 11. In some aspects, the epitope overlaps all or a portion of an amino acid sequence corresponding to amino acids 600 to 625 of SEQ ID NO: 11. In some aspects, the epitope overlaps all or a portion of an amino acid sequence corresponding to amino acids 625 to 650 of SEQ ID NO: 11. In some aspects, the epitope overlaps all or a portion of an amino acid sequence corresponding to amino acids 650 to 675 of SEQ ID NO: 11. In some aspects, the epitope overlaps all or a portion of an amino acid sequence corresponding to amino acids 675 to 700 of SEQ ID NO: 11. In some aspects, the epitope overlaps all or a portion of an amino acid sequence corresponding to amino acids 700 to 725 of SEQ ID NO: 11. In some aspects, the epitope overlaps all or a portion of an amino acid sequence corresponding to amino acids 725-750 of SEQ ID NO: 11. In some aspects, the epitope overlaps all or a portion of an amino acid sequence corresponding to amino acids 750 to 775 of SEQ ID NO: 11. In some aspects, the epitope overlaps all or a portion of an amino acid sequence corresponding to amino acids 775 to 800 of SEQ ID NO: 11. In some aspects, the epitope overlaps all or a portion of an amino acid sequence corresponding to amino acids 800 to 825 of SEQ ID NO: 11. In some aspects, the epitope overlaps all or a portion of an amino acid sequence corresponding to amino acids 825 to 850 of SEQ ID NO: 11. In some aspects, the epitope overlaps all or a portion of an amino acid sequence corresponding to amino acids 850 to 875 of SEQ ID NO: 11. In some aspects, the epitope overlaps all or a portion of an amino acid sequence corresponding to amino acids 875 to 900 of SEQ ID NO: 11. In some aspects, the epitope overlaps all or a portion of an amino acid sequence corresponding to amino acids 900 to 925 of SEQ ID NO: 11.

In some aspects, the binding agent is an ABP that specifically binds to NRP1 protein. In some aspects, the binding agent is an ABP that specifically binds to the extracellular domain of NRP1 protein. In some aspects, the binding agent, e.g., the ABP, specifically binds to an epitope within the extracellular domain of NRP1. In some aspects, the epitope overlaps all or a portion of an amino acid sequence corresponding to amino acids 22 to 856 of SEQ ID NO: 12. In some aspects, the epitope overlaps all or a portion of an amino acid sequence corresponding to amino acids 22 to 50 of SEQ ID NO: 12. In some aspects, the epitope overlaps all or a portion of an amino acid sequence corresponding to amino acids 50 to 75 of SEQ ID NO: 12. In some aspects, the epitope overlaps all or a portion of an amino acid sequence corresponding to amino acids 75 to 100 of SEQ ID NO: 12. In some aspects, the epitope overlaps all or a portion of an amino acid sequence corresponding to amino acids 100 to 125 of SEQ ID NO: 12. In some aspects, the epitope overlaps all or a portion of an amino acid sequence corresponding to amino acids 125 to 150 of SEQ ID NO: 12. In some aspects, the epitope overlaps all or a portion of an amino acid sequence corresponding to amino acids 150 to 175 of SEQ ID NO: 12. In some aspects, the epitope overlaps all or a portion of an amino acid sequence corresponding to amino acids 175 to 200 of SEQ ID NO: 12. In some aspects, the epitope overlaps all or a portion of an amino acid sequence corresponding to amino acids 200 to 225 of SEQ ID NO: 12. In some aspects, the epitope overlaps all or a portion of an amino acid sequence corresponding to amino acids 225 to 250 of SEQ ID NO: 12. In some aspects, the epitope overlaps all or a portion of an amino acid sequence corresponding to amino acids 250 to 275 of SEQ ID NO: 12. In some aspects, the epitope overlaps all or a portion of an amino acid sequence corresponding to amino acids 275 to 300 of SEQ ID NO: 12. In some aspects, the epitope overlaps all or a portion of an amino acid sequence corresponding to amino acids 300 to 325 of SEQ ID NO: 12. In some aspects, the epitope overlaps all or a portion of an amino acid sequence corresponding to amino acids 325 to 350 of SEQ ID NO: 12. In some aspects, the epitope overlaps all or a portion of an amino acid sequence corresponding to amino acids 350 to 375 of SEQ ID NO: 12. In some aspects, the epitope overlaps all or a portion of an amino acid sequence corresponding to amino acids 375 to 400 of SEQ ID NO: 12. In some aspects, the epitope overlaps all or a portion of an amino acid sequence corresponding to amino acids 400 to 425 of SEQ ID NO: 12. In some aspects, the epitope overlaps all or a portion of an amino acid sequence corresponding to amino acids 425-450 of SEQ ID NO: 12. In some aspects, the epitope overlaps all or a portion of an amino acid sequence corresponding to amino acids 450 to 475 of SEQ ID NO: 12. In some aspects, the epitope overlaps all or a portion of an amino acid sequence corresponding to amino acids 475 to 500 of SEQ ID NO: 12. In some aspects, the epitope overlaps all or a portion of an amino acid sequence corresponding to amino acids 500 to 525 of SEQ ID NO: 12. In some aspects, the epitope overlaps all or a portion of an amino acid sequence corresponding to amino acids 525 to 550 of SEQ ID NO: 12. In some aspects, the epitope overlaps all or a portion of an amino acid sequence corresponding to amino acids 550 to 575 of SEQ ID NO: 12. In some aspects, the epitope overlaps all or a portion of an amino acid sequence corresponding to amino acids 575 to 600 of SEQ ID NO: 12. In some aspects, the epitope overlaps all or a portion of an amino acid sequence corresponding to amino acids 600 to 625 of SEQ ID NO: 12. In some aspects, the epitope overlaps all or a portion of an amino acid sequence corresponding to amino acids 625 to 650 of SEQ ID NO: 12. In some aspects, the epitope overlaps all or a portion of an amino acid sequence corresponding to amino acids 650 to 675 of SEQ ID NO: 12. In some aspects, the epitope overlaps all or a portion of an amino acid sequence corresponding to amino acids 675 to 700 of SEQ ID NO: 12. In some aspects, the epitope overlaps all or a portion of an amino acid sequence corresponding to amino acids 700 to 725 of SEQ ID NO: 12. In some aspects, the epitope overlaps all or a portion of an amino acid sequence corresponding to amino acids 725 to 750 of SEQ ID NO: 12. In some aspects, the epitope overlaps all or a portion of an amino acid sequence corresponding to amino acids 750 to 775 of SEQ ID NO: 12. In some aspects, the epitope overlaps all or a portion of an amino acid sequence corresponding to amino acids 775 to 800 of SEQ ID NO: 12. In some aspects, the epitope overlaps all or a portion of an amino acid sequence corresponding to amino acids 800 to 825 of SEQ ID NO: 12. In some aspects, the epitope overlaps all or a portion of an amino acid sequence corresponding to amino acids 825 to 856 of SEQ ID NO: 12.

In particular embodiments, the binding agent is an anti-PTGFRN antibody that was identified and characterized in 4.6.4, 4.6.5, and 4.6.6. (Examples 4-6). In some embodiments, the binding agent is an ABP having an $V_H$ and/or an $V_L$ region of the anti-PTGFRN antibody identified and characterized in 4.6.4, 4.6.5, and 4.6.6. (Examples 4-6). In some embodiments, the binding agent is an ABP which is produced by affinity maturation of the anti-PTGFRN antibody identified and characterized in 4.6.4, 4.6.5, and 4.6.6. (Examples 4-6).

Their $V_H$ and $V_L$ regions may be further subdivided into regions of hypervariability ("hypervariable regions (HVRs);" also called "complementarity determining regions" (CDRs)) interspersed with regions that are more conserved. The more conserved regions are called framework regions (FRs). Each $V_H$ and $V_L$ generally comprises three CDRs and four FRs, arranged in the following order (from N-terminus to C-terminus): FR1-CDR1-FR2-CDR2-FR3-CDR3-FR4. The CDRs are involved in antigen binding, and influence antigen specificity and binding affinity of the antibody. See Kabat et al., Sequences of Proteins of Immunological Interest 5th ed. (1991) Public Health Service, National Institutes of Health, Bethesda, MD, incorporated by reference in its entirety. In some embodiments, the binding agent is an ABP having a CDR1, CDR2, or CDRs of $V_H$ of the anti-PTGFRN antibody identified and characterized in 4.6.4, 4.6.5, and 4.6.6. (Examples 4-6). In some embodiments, the binding agent is an ABP having a CDR1, CDR2, or CDRs of $V_L$ of the anti-PTGFRN antibody identified and characterized in 4.6.4, 4.6.5, and 4.6.6. (Examples 4-6).

In some embodiments, the binding agent comprises a polypeptide having at least 80%, 85%, 90%, 95% or 98% sequence identity to $V_H$ region of the anti-PTGFRN antibody identified and characterized in 4.6.4, 4.6.5, and 4.6.6. (Examples 4-6). In some embodiments, the binding agent comprises a polypeptide having at least 80%, 85%, 90%, 95% or 98% sequence identity to $V_L$ region of the anti-PTGFRN antibody identified and characterized in 4.6.4, 4.6.5, and 4.6.6. (Examples 4-6).

In some embodiments, the binding agent comprises a polypeptide having at least 80%, 85%, 90%, 95% or 98% sequence identity to CDR1, CDR2, or CDR3 of $V_L$ region of the anti-PTGFRN antibody identified and characterized in 4.6.4, 4.6.5, and 4.6.6. (Examples 4-6). In some embodiments, the binding agent comprises a polypeptide having at least 80%, 85%, 90%, 95% or 98% sequence identity to CDR1, CDR2 or CDR3 of $V_L$ region of the anti-PTGFRN antibody identified and characterized in 4.6.4, 4.6.5, and 4.6.6. (Examples 4-6).

In some embodiments, the binding agent competes for binding to PTGFRN with the anti-PTGFRN antibody identified and characterized in 4.6.4, 4.6.5, and 4.6.6. (Examples 4-6).

4.3.3. Administration of a Binding Agent

Some aspects of the present disclosure are directed to methods of treating or preventing cancer metastasis in a subject in need thereof comprising administering to the subject an antibody or antigen binding portion thereof that specifically binds to an extracellular vesicle protein, which comprises PTGFRN, BSG, IGSF2, IGSF3, IGSF8, ITGB1, ITGA4, SLC3A2, or an ATP transporter protein. Certain aspects of the present disclosure are directed to methods of treating or preventing cancer metastasis in a subject in need thereof comprising administering to the subject an antibody or antigen binding portion thereof that specifically binds to an extracellular vesicle protein, which comprises CD13, MME, ENPP1, or NRP1. In some embodiments, the treatment method comprises the step of administering an effective amount of a binding agent to a subject having cancer. In preferred embodiments, the subject can be a human cancer patient.

In some aspects, the method comprises administering to the subject an antibody or antigen binding portion thereof that specifically binds to PTGFRN. In some aspects, the method comprises administering to the subject an antibody or antigen binding portion thereof that specifically binds to BSG. In some aspects, the method comprises administering to the subject an antibody or antigen binding portion thereof that specifically binds to IGSF2. In some aspects, the method comprises administering to the subject an antibody or antigen binding portion thereof that specifically binds to IGSF3. In some aspects, the method comprises administering to the subject an antibody or antigen binding portion thereof that specifically binds to IGSF8 In some aspects, the method comprises administering to the subject an antibody or antigen binding portion thereof that specifically binds to ITGB1. In some aspects, the method comprises administering to the subject an antibody or antigen binding portion thereof that specifically binds to ITGA4. In some aspects, the method comprises administering to the subject an antibody or antigen binding portion thereof that specifically binds to SLC3A2. In some aspects, the method comprises administering to the subject an antibody or antigen binding portion thereof that specifically binds to an ATP transporter protein disclosed herein. In some aspects, the method comprises administering to the subject an antibody or antigen binding portion thereof that specifically binds to CD13. In some aspects, the method comprises administering to the subject an antibody or antigen binding portion thereof that specifically binds to MME. In some aspects, the method comprises administering to the subject an antibody or antigen binding portion thereof that specifically binds to ENPP1. In some aspects, the method comprises administering to the subject an antibody or antigen binding portion thereof that specifically binds to NRP1.

A binding agent can be administered systemically or locally around tumor cells or around advanced or metastatic cancers. A binding agent can be administered intravenously, intrathecally, intracranially, intramuscularly, sublingually, orally, subcutaneously intralymphatically, and/or intraperitoneally. In some embodiments, a binding agent is administered to reduce the cancer load in the patient prior to surgery or other procedures. Alternatively, it is administered after surgery to ensure that any remaining cancer (e.g., cancer that the surgery failed to eliminate) does not survive. In some embodiments, a binding agent is administered to reduce metastatic cancer in a subject with metastatic cancer. In some embodiments, a binding agent is administered to prevent metastatic cancer in a subject without metastatic cancer.

A binding agent is administered in an effective amount. An effective amount of a binding agent can be determined by methods known in the art. For example, a sample taken from a subject before administration of a binding agent, as well as one or more samples taken from the subject concurrently with or subsequent to the administration, can be processed for measurement of EVs.

In some embodiments, an effective amount is an amount sufficient to induce clearance of EVs in the subject. In some embodiments, an effective amount is an amount that induces reduction of the concentration of EVs in the subject by at least 10%, 20%, 30%, 40%, 50%, 60%, 70%, 80%, 90% or 95%. In some embodiments, an effective amount is an amount that induces reduction of the concentration of EVs expressing a targeted EV protein in the subject by at least 10%, 20%, 30%, 40%, 50%, 60%, 70%, 80%, 90% or 95%. In some embodiments, an effective amount is an amount that induces reduction of the concentration of EVs released from cancer cells in the subject by at least 10%, 20%, 30%, 40%, 50%, 60%, 70%, 80%, 90% or 95%. In some embodiments, the concentration of EVs is measured systematically in the blood of the subject, or locally, for example, in a cancer tissue.

In some embodiments, an effective amount is an amount sufficient to induce a desired therapeutic outcome. For example, an effective amount is an amount sufficient to reduce or inhibit growth of tumor or reduce or prevent metastasis.

In some embodiments, a binding agent is administered separately, or in combination with another therapeutic agent. The additional therapeutic agent can be a different cancer drug, another binding agent that binds to a different EV protein, or an agent that facilitates removal of EVs. In some embodiments, the additional therapeutic agent facilitate removal of EVs by binding to a targeting agent and stimulating immune responses, e.g., macrophage. In some embodiments, the additional therapeutic agent binds to a binding agent to facilitate recognition of EVs bound to the binding agent by an immune cell.

A binding agent provided herein and another therapeutic agent can be formulated together in the same dosage form and administered simultaneously. Alternatively, a binding agent and another therapeutic agent can be simultaneously administered, wherein both the agents are present in separate formulations. In another alternative, the therapeutic agent can be administered followed by the other therapeutic agent or vice versa. In the separate administration protocol, the subject therapeutic composition and another therapeutic agent may be administered a few minutes apart, or a few hours apart, or a few days apart.

4.3.4. Ex Vivo Therapy

In some embodiments, the treatment method is an ex vivo therapy comprising the steps of treating a sample from a subject with a binding agent and reintroducing a treated sample to the subject. The sample can be blood or other types of tissue. Specifically, the method can comprise the steps of (a) treating blood from a subject with cancer ex vivo with an effective amount of a binding agent that specifically binds to an EV protein, wherein the EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); and ATP transporter protein, and (b) b. reinfusing treated blood to the subject.

An effective amount of a binding agent for the ex vivo treatment can be determined by methods known in the art. For example, a sample can be analyzed to measure the concentration of EVs before, concurrently with or subsequent to treatment with a binding agent. In some embodiments, an effective amount is an amount sufficient to reduce the concentration of EVs in the blood by at least 10%, 20%, 30%, 40%, 50%, 60%, 70%, 80%, 90% or 95%. In some embodiments, an effective amount is an amount sufficient to reduce the concentration of EVs expressing a targeted EV protein in the blood by at least 10%, 20%, 30%, 40%, 50%, 60%, 70%, 80%, 90% or 95%. In some embodiments, an effective amount is an amount sufficient to reduce the concentration of EVs released from cancer cells in the blood by at least 10%, 20%, 30%, 40%, 50%, 60%, 70%, 80%, 90% or 95%.

In some embodiments, an effective amount is an amount sufficient to induce a desired therapeutic outcome when the treated sample is reintroduced to the subject. For example, an effective amount is an amount sufficient to reduce or inhibit growth of tumor or reduce or prevent metastasis in the subject when the treated sample is reintroduced.

In some embodiments, the sample is incubated with a binding agent for at least 10 minutes, 20 minutes, 30 minutes, 40 minutes, 50 minutes, 1 hour, 2 hours, 3 hours, 6 hours, 12 hours, 24 hours or 48 hours. In some embodiments, the sample is incubated with a binding agent until the concentration of EVs in the blood reduced by at least 10%, 20%, 30%, 40%, 50%, 60%, 70%, 80%, 90% or 95%. In some embodiments, the sample is incubated with a binding agent until the concentration of EVs expressing a targeted EV protein in the blood reduced by at least 10%, 20%, 30%, 40%, 50%, 60%, 70%, 80%, 90% or 95%. In some embodiments, the sample is incubated with a binding agent until the concentration of EVs released from cancer cells in the blood reduced by at least 10%, 20%, 30%, 40%, 50%, 60%, 70%, 80%, 90% or 95%.

In some embodiments, a sample is incubated with a binding agent separately or in combination with another therapeutic agent. The additional therapeutic agent can be another binding agent that binds to a different EV protein, or an agent that facilitates removal of the EVs. In some embodiments, the additional therapeutic agent stimulates immune response to facilitate removal of EVs bound to a targeting agent by an immune cell, e.g., macrophage. In some embodiments, the additional therapeutic agent binds to a binding agent to facilitate recognition of EVs bound to the binding agent by an immune cell.

In some embodiments, the method further comprises the step of removing EVs bound to a binding agent. Thus, the method can comprise the steps of incubating a sample with a binding agent and removing EVs bound to the binding agent.

In some embodiments, a sample is affinity purified using a binding agent. For example, a sample from a subject is applied to a resin that displays a binding agent to remove EVs that selectively bind to the binding agent. The binding agent can be chemically immobilized or coupled to a solid support so that EVs having specific affinity to the binding agent become bound. Various forms of solid support can be used, e.g., a porous agarose bead, a microtiter plate, a magnetic bead, a monolith or a membrane. In some embodiments, the solid support forms a chromatography column and can be used for affinity chromatography of EVs. Various methods of affinity purification known in the art or a modification thereof can be used.

In some embodiments, the treatment methods involve the step of culturing cells or tissues taken from the subject in a laboratory apparatus, under sterile conditions for up to 12, 24, or 36 hours before or after treatment with a binding agent. In some embodiments, the treatment methods involve the step of characterizing cells or tissues before, during or after treatment with a binding agent.

4.4. Pharmaceutical Composition

In another aspect, the present disclosure provides a pharmaceutical composition for treatment of cancer metastasis, comprising a binding agent that specifically binds to an EV protein and an excipient.

4.4.1. Binding Agents

In some embodiments, a pharmaceutical composition comprises an antigen binding protein (ABP) as a binding agent. ABP refers to a protein comprising one or more antigen-binding domains that specifically bind to an antigen or epitope. In some embodiments, the ABP binds the antigen or epitope with specificity and affinity similar to that of naturally occurring antibodies. In some embodiments, the ABP comprises an antibody. In some embodiments, the ABP consists of an antibody. In some embodiments, the ABP consists essentially of an antibody. In some embodiments, the ABP comprises an alternative scaffold. In some embodiments, the ABP comprises an antibody fragment. In some embodiments, the ABP consists of an antibody fragment. In some embodiments, the ABP consists essentially of an antibody fragment.

In some embodiments, the antibody is a monoclonal antibody. In some embodiments, the antibody is selected from a human antibody, a humanized antibody, or a chimeric antibody. In some embodiments, the antibody is a single chain variable fragment (say). In some embodiments, the ABP binds more than one antigen or more than one epitope on a single antigen. In some embodiments, the ABP comprises an antibody fragment. In some embodiments, the ABP comprises an immunoglobulin constant region.

The selected antibody can be further altered, for example, to improve affinity for the target ("affinity maturation"), to humanize the antibody, to improve its production in cell culture, and/or to reduce its immunogenicity in a subject.

The antibody that can be used in various embodiments include immunoglobulin molecules comprising one or more antigen-binding domains that specifically bind to an EV protein. An antibody specifically includes intact antibodies (e.g., intact immunoglobulins), antibody fragments, and multi-specific antibodies. One example of an antigen-binding domain is an antigen-binding domain formed by a $V_H$-$V_L$ dimer. An antibody is one type of ABP.

In some embodiments, a binding agent is an antibody fragment comprising a portion of an intact antibody, such as the antigen-binding or variable region of an intact antibody. Antibody fragments include, for example, Fv fragments, Fab fragments, F(ab')$_2$ fragments, Fab' fragments, scFab fragments, scFv (sFv) fragments, and scFv-Fc fragments.

In some embodiments, an ABP is a multivalent antibody having at least two antigen-binding sites. In some embodiments, two antigen-binding sites bind to two different EV proteins. In some embodiments, two antigen-binding sites bind to an identical EV protein. In some embodiments, one of the two antigen-binding site binds to an EV protein, and the second of the two antigen-binding site binds to a non-EV protein.

In some embodiments, a binding agent is an aptamer, i.e., an oligonucleotide or peptide molecule, that bind to an EV protein. In some embodiments, an aptamer is created by selecting from a large random sequence pool. Various methods known in the art for aptamer selection can be used. For example, peptide aptamer selection can be made using yeast two-hybrid system. Peptide aptamers can also be selected from combinatorial peptide libraries constructed by phage display and other surface display technologies such as mRNA display, ribosome display, bacterial display and yeast display. These experimental procedures are also known as biopannings. In some embodiments, an aptamer is selected from those existing in nature.

In some embodiments, a binding agent is a ligand or a receptor. When an EV protein is a ligand to a target receptor, the target receptor or a modification thereof can be used as a binding agent. When an EV protein is a receptor to a target ligand, the target ligand or a modification thereof can be used as a binding agent.

In some embodiments, a binding agent comprises to a functional group that can be used for clearance of EVs in various embodiments. For example, a binding agent is conjugated to a peptide that facilitates purification or isolation (e.g., poly-His). An antigen binding protein also can be linked to the FLAG peptide Asp-Tyr-Lys-Asp-Asp-Asp-Asp-Lys (DYKDDDDK) as described in Hopp et al., Bio/Technology 6:1204, 1988, and U.S. Pat. No. 5,011,912. The FLAG peptide is highly antigenic and provides an epitope reversibly bound by a specific monoclonal antibody (mAb), enabling rapid assay and facile purification of expressed recombinant protein. Reagents useful for preparing fusion proteins in which the FLAG peptide is fused to a given polypeptide are commercially available (Sigma, St. Louis, MO).

In some embodiments, a binding agent comprises an immunoglobulin constant region. Immunoglobulin constant region that is known to stimulate removal by immune cells, e.g., macrophages, or trigger destruction of the target by stimulating other immune responses such as the complementary pathway can be also used. Such immunoglobulin constant regions are known in the art, for example, as described in Ravetch and Bolland, IgG Fc receptors, Annu Rev Immuno 2001; 19:275-90.

In some embodiments, a binding agent binds to an EV protein with an affinity of a specific range. In some embodiments, a binding agent binds to an EV protein with a K of less than 500 nM, less than 400 nM, less than 300 nM, less than 200 nM, less than 50 nM, less than 40 nM, less than 30 nM, less than 20 nM, less than 10 nM, or less than 5 nM.

In preferred embodiments, a binding agent is specific to an EV protein highly enriched on EV membranes. Such EV proteins can be identified by analyzing highly purified EV with mass spectrometry or other methods known in the art.

The EV proteins include various membrane proteins, such as transmembrane proteins, integral proteins and peripheral proteins, enriched on the EV membranes. They include various CD proteins, transporters, integrins, lectins and cadherins. Specifically, the proteins include, but are not limited to, (1) prostaglandin F2 receptor negative regulator (PTGFRN), (2) basigin (BSG), (3) immunoglobulin superfamily member 3 (IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), (8) a class of ATP transporter proteins (ATP1A1, ATP1A2, ATP1A3, ATP1A4, ATP1B3, ATP2B1, ATP2B2, ATP2B3, ATP2B4), and (9), immunoglobulin superfamily member 2 (IGSF2). Additional EV proteins include CD13, MME, ENPP1, and NRP1.

In some embodiments, the binding agent is an ABP that specifically binds to an EV protein selected from consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-1 (ITGB1); integrin alpha-4 (ITGA4); 4F2 cell-surface antigen heavy chain (SLC3A2); ATP transporter protein; CD13; MME; ENPP1; and NRP1. In some embodiments, the binding agent is an ABP that specifically binds to PTGFRN. In some aspects, the binding agent is an ABP that specifically binds to CD13. In some aspects, the binding agent is an ABP that specifically binds to MME. In some aspects, the binding agent is an ABP that specifically binds to ENPP1. In some aspects, the binding agent is an ABP that specifically binds to NRP1.

In particular embodiments, the binding agent is an anti-PTGFRN antibody that was identified and characterized in 4.6.4, 4.6.5, and 4.6.6. (Examples 4-6). In some embodiments, the binding agent is an ABP having an $V_H$ and/or an $V_L$ region of the anti-PTGFRN antibody identified and characterized in 4.6.4, 4.6.5, and 4.6.6. (Examples 4-6). In some embodiments, the binding agent is an ABP which is produced by affinity maturation of the anti-PTGFRN antibody identified and characterized in 4.6.4, 4.6.5, and 4.6.6. (Examples 4-6).

Their $V_H$ and $V_L$ regions may be further subdivided into regions of hypervariability ("hypervariable regions (HVRs);" also called "complementarity determining regions" (CDRs)) interspersed with regions that are more conserved. The more conserved regions are called framework regions (FRs). Each $V_H$ and $V_L$ generally comprises three CDRs and four FRs, arranged in the following order (from N-terminus to C-terminus): FR1-CDR1-FR2-CDR2-FR3-CDR3-FR4. The CDRs are involved in antigen binding, and influence antigen specificity and binding affinity of the antibody. See Kabat et al., Sequences of Proteins of Immunological Interest 5th ed. (1991) Public Health Service, National Institutes of Health, Bethesda, MD, incorporated by reference in its entirety. In some embodiments, the binding agent is an ABP having a CDR1, CDR2, or CDRs of $V_H$ of the anti-PTGFRN antibody identified and characterized in 4.6.4, 4.6.5, and 4.6.6. (Examples 4-6). In some embodiments, the binding agent is an ABP having a CDR1, CDR2, or CDRs of $V_L$ of the anti-PTGFRN antibody identified and characterized in 4.6.4, 4.6.5, and 4.6.6. (Examples 4-6).

In some embodiments, the binding agent comprises a polypeptide having at least 80%, 85%, 90%, 95% or 98% sequence identity to $V_H$ region of the anti-PTGFRN antibody identified and characterized in 4.6.4, 4.6.5, and 4.6.6. (Examples 4-6). In some embodiments, the binding agent comprises a polypeptide having at least 80%, 85%, 90%, 95% or 98% sequence identity to $V_L$ region of the anti-PTGFRN antibody identified and characterized in 4.6.4, 4.6.5, and 4.6.6. (Examples 4-6).

In some embodiments, the binding agent comprises a polypeptide having at least 80%, 85%, 90%, 95% or 98% sequence identity to CDR1, CDR2, or CDR3 of $V_H$ region of the anti-PTGFRN antibody identified and characterized in 4.6.4, 4.6.5, and 4.6.6. (Examples 4-6). In some embodiments, the binding agent comprises a polypeptide having at least 80%, 85° 2, 90%, 95% or 98% sequence identity to CDR1, CDR2 or CDR3 of $V_L$ region of the anti-PTGFRN antibody identified and characterized in 4.6.4, 4.6.5, and 4.6.6. (Examples 4-6).

In some embodiments, the binding agent competes for binding to PTGFRN with the anti-PTGFRN antibody identified and characterized in 4.6.4, 4.6.5, and 4.6.6. (Examples 4-6).

In some embodiments, a pharmaceutical composition includes a binding agent in an effective amount. In some embodiments, an effective amount is an amount sufficient to induce clearance of EVs when administered to a subject. In some embodiments, an effective amount is an amount that induces reduction of the concentration of EVs in the subject by at least 10%, 20%, 30%, 40%, 50%, 60%, 70%, 80%, 90% or 95%. In some embodiments, an effective amount is an amount that induces reduction of the concentration of EVs expressing a targeted EV protein in the subject by at least 10%, 20%, 30%, 40%, 50%, 60%, 70%, 80%, 90% or 95%. In some embodiments, an effective amount is an amount that induces reduction of the concentration of EVs released from cancer cells in the subject by at least 10%, 20%, 30%, 40%, 50%, 60%, 70%, 80%, 90% or 95%. In some embodiments, the concentration of EVs is measured systematically in the blood of the subject, or locally, for example, in a cancer tissue.

In some embodiments, an effective amount is an amount sufficient to induce a desired therapeutic outcome. For example, an effective amount is an amount sufficient to reduce or inhibit growth of tumor or reduce or prevent metastasis.

In some embodiments, a pharmaceutical composition comprises two or more binding agents. For example, a pharmaceutical composition comprises two or more binding agents, each of the two or more binding agents binds to one of the EV proteins selected from the group consisting of: (1) prostaglandin F2 receptor negative regulator (PTGFRN), (2) basigin (BSG), (3) immunoglobulin superfamily member 3

(IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), (8) a class of ATP transporter proteins (ATP1A1, ATP1A2, ATP1A3, ATP1A4, ATP1B3, ATP2B1, ATP2B2, ATP2B3, ATP2B4), (9), immunoglobulin superfamily member 2 (IGSF2), (10) CD13, (11) MME, (12) ENPP1, and (13) NRP1.

In some embodiments, a pharmaceutical composition further comprises an additional agent. The additional agent can be a cancer drug or an agent that facilitates removal of EVs. In some embodiments, an additional agent facilitates removal of EVs bound to a targeting agent by stimulating immune responses, e.g., macrophage. In some embodiments, the additional therapeutic agent binds to a binding agent to facilitate recognition of EVs bound to the binding agent by an immune cell.

4.4.2. Pharmaceutically Acceptable Carriers

The pharmaceutical composition provided herein further comprises one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose, and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; and (10) coloring agents. In the case of capsules, tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like. Liquid dosage forms for oral administration include pharmaceutically acceptable emulsions, microemulsions, solutions, suspensions, syrups, and elixirs. In addition to the active ingredient, the liquid dosage forms may contain inert diluents commonly used in the art, such as water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor, and sesame oils), glycerol, tetrahydrofuryl alcohol, polyethylene glycols and fatty acid esters of sorbitan, and mixtures thereof. Besides inert diluents, the oral compositions can also include adjuvants such as wetting agents, emulsifying and suspending agents, sweetening, flavoring, coloring, perfuming, and preservative agents.

4.5. Unit Dosage Forms

The pharmaceutical composition can be conveniently presented in unit dosage form. The unit dosage form can be adapted to one or more specific routes of administration of the pharmaceutical composition. For example, the unit dosage form is adapted for intravenous, intrathecal, and/or intraperitoneal administration.

The amount of a binding agent which can be combined with a pharmaceutically acceptable carrier to produce a single dosage form will generally be that amount of the compound which produces a desired outcome, e.g., therapeutic effects.

4.6. Examples

The following examples are put forth so as to provide those of ordinary skill in the art with a complete disclosure and description of how to make and use the presently disclosed compositions disclosure, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations can be used, e.g., bp, base pair(s); kb, kilobase(s); pl, picoliter(s); s or sec, second(s); min, minute(s); h or hr, hour(s); aa, amino acid(s); nt, nucleotide(s); and the like.

The practice of the present disclosure will employ, unless otherwise indicated, conventional methods of protein chemistry, biochemistry, recombinant DNA techniques and pharmacology, within the skill of the art. Such techniques are explained fully in the literature. See, e.g., T. E. Creighton, Proteins: Structures and Molecular Properties (W.H. Freeman and Company, 1993); A L. Lehninger, Biochemistry (Worth Publishers, Inc., current addition); Sambrook, et al., Molecular Cloning: A Laboratory Manual (2nd Edition, 1989); Methods In Enzymology (S. Colowick and N. Kaplan eds., Academic Press, Inc.); Remington's Pharmaceutical Sciences, 21th Edition (Easton, Pennsylvania: Mack Publishing Company, 2005); Carey and Sundberg Advanced Organic Chemistry 3rd Ed. (Plenum Press) Vols A and B (1992).

4.6.1. Example 1: Identification of EV Proteins 4.6.1.1. Collection of Exosomes

Exosomes were collected from the supernatant of high density suspension cultures of HEK293 SF cells after 9 days. The supernatant was filtered and fractionated by anion exchange chromatography and eluted in a step gradient of sodium chloride. The peak fraction with the highest protein concentration contained exosomes and contaminating cellular components. The peak fraction was isolated and further fractionated on an Optiprep™ (60% iodixanol w/v) density gradient by ultracentrifugation.

The exosome fraction was concentrated by ultracentrifugation in a 38.5 mL Ultra-Clear (344058) tube for a SW 32 Ti rotor at 133,900×g for 3 hours at 4° C. The pelleted material was resuspended in 1 mL PBS and 3 mL of Optiprep™, bringing the final iodixanol concentration to 45%. For the Optiprep™ gradient, a 4-tier sterile gradient was prepared with 4 mL of 45% iodixanol containing the resuspended material, 3 mL 30% iodixanol, 2 mL 22.5% iodixanol, 2 mL 17.5% iodixanol, and 1 mL PBS in a 12 mL Ultra-Clear (344059) tube for a SW 41 Ti rotor. The Optiprep™ gradient was ultracentrifuged at 150,000×g for 16 hours at 4° C. to separate the exosome fraction. Ultracentrifugation resulted in a Top Fraction known to contain exosomes, a Middle Fraction containing cell debris of moderate density, and a Bottom Fraction containing high density aggregates and cellular debris (FIG. 1). The exosome layer was then gently collected from the top ~3 mL of the tube.

The exosome fraction was diluted in ~32 mL PBS in a 38.5 mL Ultra-Clear (344058) tube and ultracentrifuged at 133,900×g for 3 hours at 4° C. to pellet the purified exosomes. The pelleted exosomes were then resuspended in a minimal volume of PBS (~200 µL) and stored at 4° C.

4.6.1.2. Sample Preparation for LC-MS/MS Analysis

To determine proteins specific to exosomes, the Top Fraction and Bottom Fraction of the Optiprep™ gradient were analyzed by liquid chromatography-tandem mass spectrometry. All samples were received in either phosphate-buffered saline (PBS) buffer or PBS and 5% sucrose. Prior to analysis, the total protein concentration of each sample was determined by bicinchoninic acid (BCA) assay, after which each sample was appropriately diluted to 125 µg/mL in PBS buffer. Next, 50.0 µL of each sample was added to a separate 1.5 mL microcentrifuge tube containing an equal volume of exosome lysis buffer (60 mM Tris, 400 mM GdmCl, 100 mM EDTA, 20 mM TCEP, 1.0% Triton X-100) followed by the transfer of 2.0 µL 1.0% Triton X-100 solution. All samples were then incubated at 55° C. for 60 minutes.

Protein precipitation was performed by adding 1250 µL of ethanol at −20° C. To improve efficiency, samples were vigorously vortexed for approximately 10 minutes and then incubated at −20° C. for 60 minutes. After incubation, samples were sonicated in a water bath for 5 minutes. Precipitated material was pelleted by centrifuging for 5 minutes at 15,000 g at 4° C. The supernatant was decanted, and the pelleted material was thoroughly dried using nitrogen gas. Pellets were resuspended in 30.0 µL digestion buffer (30 mM Tris, 1.0 M GdmCl, 100 mM EDTA, 50 mM TCEP, pH 8.5) which also reduced disulfide bonds. Free cysteine residues were alkylated by adding 5.0 µL alkylation solution (375 mM iodoacetamide, 50 mM Tris, pH 8.5) and incubating the resulting solution at room temperature in the dark for at least 30 minutes.

After incubation, each sample was diluted using 30.0 µL 50 mM Tris pH 8.5, and proteolytic digestion was initiated by adding 2.0 µg trypsin. All samples were mixed and then incubated overnight at 37° C. After the incubation, trypsin activity was ceased by adding 5.0 µL 10% formic acid. Prior to analysis by LC-MS/MS, each sample was desalted using Pierce C18 spin columns. At the end of this process, each sample was dried down and reconstituted in 50.0 µL of water with 0.1% formic acid and transferred to an HPLC vial for analysis.

4.6.1.3. LC-MS/MS Analysis

Samples were injected into an UltiMate 3000 RSCLnano (Thermo Fisher Scientific) low flow chromatography system, and tryptic peptides were loaded onto an Acclaim PepMap 100 C18 trapping column (75 µm×2 cm, 3 µm particle size, 100 Å pore size, Thermo Fisher Scientific) using loading mobile phase (MPL: water, 0.1% formic acid) at a flowrate of 1.000 µL/min. Peptides were eluted and separated with a gradient of mobile phase A (MPA: water, 0.1% formic acid) and mobile phase B (MPB: acetonitrile, 0.1% formic acid) at a flowrate of 300 nL/min across an EASY-Spray C18 analytical column (75 µm×25 cm, 2 µm particle size, 100 Å pore size, Thermo Fisher Scientific). The stepwise gradient used for elution began at 2% MPB, where it was held for 8 minutes during loading. The percentage MPB then increased from 2-17% over 35 minutes, again from 17-25% over 45 minutes, and finally from 25-40% over 10 minutes. The most hydrophobic species were removed by increasing to 98% MPB over 5 minutes, then holding there for 10 minutes. The total runtime for the method was 135 minutes and allowed sufficient time for column re-equilibration. Wash cycles were performed in between non-identical analytical injections to minimize carry-over.

Mass analyses were performed with a Q Exactive Basic (Thermo Fisher Scientific) mass spectrometer. Precursor ion mass spectra were measured across an m/z range of 400-1600 Da at a resolution of 70,000. The 10 most intense precursor ions were selected and fragmented in the HCD cell using a collision energy of 27, and MS/MS spectra were measured across an m/z range of 200-2000 Da at a resolution of 35,000. Ions with charge states from 2-4 were selected for fragmentation and the dynamic exclusion time was set to 30 seconds. An exclusion list containing 14 common polysiloxanes was utilized to minimize misidentification of known contaminants.

4.6.1.4. Data Processing

Proteins were first identified and quantified (label-free) using Proteome Discoverer software (version 2.1.1.21, Thermo Fisher Scientific) and the Sequest HT algorithm combined with the Target Decoy PSM Validator. Searches were performed against the full Swiss-Prot *Homo sapiens* (taxonomy 9606 version 2017-05-10: 42, 153 entries) reference database, as well as a custom Uniprot database containing Ela proteins (7 entries). The following search parameters were used: enzyme, trypsin; maximum of 2 missed cleavages; minimum peptide length of 6 residues; 10 ppm precursor mass tolerance; and 0.02 Da fragment mass tolerance. The search also included specific dynamic modifications (oxidation of M; deamidation of N or Q; phosphorylation of S, T, or Y; pyro-glutamation of peptide-terminal E; and acetylation of protein N terminus) and static modifications (carbamidomethylation of C).

In the Target Decoy PSM Validator, the maximum delta Cn and both strict and relaxed target false discovery rates (FDRs) were set to 1 because the data were searched again using Scaffold software (version 4.8.2, Proteome Software Inc.). In Scaffold, the data were also searched using the X! Tandem open source algorithm to identify proteins using a protein threshold of 99.0%, a minimum of 2 peptides, and a peptide threshold of 95%.

To determine the identity of novel exosome-specific proteins, total peptide spectral matches (PSMs) were compared for proteins found in the top exosome fraction of the Optiprep™ gradient versus those in the lower fraction. As shown in FIG. 2, there was weak correlation between the top-fraction proteins (Y-axis) and the bottom-fraction proteins (X-axis). Proteins plotted above the dotted line represent exosome-enriched proteins, while those below the dotted line represent contaminant-enriched proteins. Importantly, there were a number of membrane-associated proteins identified that were highly enriched in the exosomes fraction, including (1) prostaglandin F2 receptor negative regulator (PTGFRN), (2) basigin (BSG), (3) immunoglobulin superfamily member 3 (IGSF3), (4) immunoglobulin superfamily member 8 (IGSF8), (5) integrin beta-1 (ITGB1), (6) integrin alpha-4 (ITGA4), (7) 4F2 cell-surface antigen heavy chain (SLC3A2), and (8) a class of ATP transporter proteins (ATP1A1, ATP1A2, ATP1A3, ATP1A4, ATP1B3, ATP2B1, ATP2B2, ATP2B3, ATP2B4). As shown in the tryptic peptide coverage maps in FIGS. 3-5, the mass spectrometry study resulted in broad coverage of PTGFRN (FIG. 3), IGSF8 (FIG. 4), and Basigin (FIG. 5). Together, these results demonstrate that there are numerous transmembrane proteins enriched in purified exosome populations.

4.6.2. Example 2: Verification of EV Proteins

To confirm that the exosome-specific proteins identified in the mass spectrometry studies were highly enriched on the surface of exosomes, protein blotting was carried out on total cell lysate and purified exosome populations from HEK293 cells. As shown in FIG. 6A, the total protein pattern differed substantially between total cell lysate (left) and exosome lysate (right). Specifically, there was a strong band at ~110 kDa in the exosome lysate that was absent in the total cell lysate. Western blotting for PTGFRN revealed a band at the expected size of ~110 kDa in the exosome lysate but not in the cell lysate (FIG. 6B), indicating that PTGFRN is highly enriched in exosomes, and may be visually detectable in total exosome lysate.

The mass spectrometry studies indicated the presence of several novel exosome-associated membrane proteins. To further confirm this association, exosome fractions were purified on self-forming Optiprep™ gradients and analyzed by Western blotting. As shown in FIG. 7A, total protein is detected in all fractions of the gradient and the exosome marker proteins Alix and Syntenin are enriched in fractions 2-6. Importantly, each of the novel surface marker proteins analyzed were enriched in these same fractions, indicating a strong and specific association with exosomes (FIG. 7B). The demonstration that these transmembrane proteins are highly expressed and enriched on exosomes.

4.6.3. Example 3: Detection of EV Proteins on EVs from Cancer Cell Lines

Cell lines of different tissues of origin (HEK293SF, kidney; HT1080, connective tissue; K562, bone marrow; MDA-MB-231, breast; Raji, lymphoblast) were grown to logarithmic phase and transferred to media supplemented with exosome-depleted serum for ~6 days. HT1080 is a fibrosarcoma cell line, K562 is a myelogenous leukemia cell line, MDA-MB-231 is a breast adenocarcinoma cell line, Raji is a lymphoma cell line. Thus, the tested cell lines represent various cancer cell types. Bone marrow-derived mesenchymal stem cells (MSC) were grown on 3D microcarriers for five days and supplemented in serum-free media for three days. Supernatant was isolated, and exosomes were purified using the Optiprep™ density-gradient ultracentrifugation method described above. Each of the purified exosomes was analyzed by LC-MS/MS, the number of peptide spectrum matches (PSMs) for several exosome surface proteins was quantified (PTGFRN, IGSF8, IGSF3, BSG, SLC3A2, ITGB1, CD81, and CD9), and the results are provided in FIG. 9. The tetraspanins CD81 and CD9 were detectable in most purified exosome populations, but were, in some cases, equal to or lower than the other surface markers (e.g., compare CD9 to PTGFRN, BSG, and SLC3A2 in all cell lines). This finding indicates that the newly-identified EV proteins are present on exosomes released from several unrelated cell lines derived from different cancer cells.

4.6.4. Example 4: Isolation and Purification a Binding Agent to EV Proteins Binding agents for exosome proteins are developed by biopanning/directed evolution that elute under mild conditions. Monoclonal or polyclonal antibodies against exosome proteins and variations thereof are also developed by methods known in the art. The methods include traditional methods of animal immunization, recombinant antibody technology, affinity maturation, etc.

Specificity and affinity of the binding agents to EV proteins are tested and binding agents with desired properties are selected.

4.6.4.1. Anti-PTGFRN Antibody

A monoclonal rat antibody against CD315, an alias for PTGFRN (MABT883, Millipore Sigma) was developed. Biotinylated PTGFRN was bound to a Streptavidin probe of an Octet® RED96 (Pall) and incubated in PBS+0.1% Tween 20 with increasing concentrations of the monoclonal rat antibody against CD315. Dose-dependent binding was detected, suggesting specific recognition of PTGFRN by the antibody (FIG. 10). To determine whether the anti-CD315 antibody could bind to exosomes, the anti-CD315 antibody was bound to a Protein L probe and incubated with increasing amounts of Optiprep™ purified HEK293 exosomes (FIG. 11). As shown in FIG. 11, the dose-dependent deflection after incubation with purified exosomes shows that the anti-CD315 antibody can recognize endogenous PTGFRN on the exosome surface. A similar experiment was performed with HEK293 cells stably transfected with full length PTGFRN to generate PTGFRN overexpressing exosomes (PTGFRN++ exosomes). The overexpressing exosomes were incubated with the immobilized anti-CD315 antibody and resulted in a dose-dependent deflection indicating specific binding between the antibody and exosomes (FIG. 12). To compare the extent of antibody binding to native or PTGFRN overexpressing exosomes, 1.1E11 exosomes of each variety were incubated in the presence of the anti-CD315 antibody and measured by BLI. As shown in FIG. 13, the PTGFRN overexpressing exosomes led to a much greater deflection than the native exosomes, indicating that increased levels of PTGFRN leads to greater binding.

4.6.4.2. Domain Recognition by Anti-PTGFRN Antibodies

Full length PTGFRN and a series of truncation mutants were expressed as mono-biotinylated recombinant proteins using the Expi293 system described above (FIG. 14, left). Each of the truncations was incubated with the anti-CD315 antibody and binding was measured by BLI. Only full length PTGFRN bound the anti-CD315 antibody, indicating that the epitope is at the N-terminus of the protein in the first IgV domain.

Polyclonal antibody pools were generated by injecting rabbits with recombinant full-length ecto-domain of PTGFRN similar to construct 1 in FIG. 14 but lacking a biotinylation sequence. Polyclonal antibody pools were purified from terminal bleeds by Protein A and tested for reactivity against PTGFRN truncation fragments. Each of the fragments was analyzed on a denaturing SDS-PAGE mini-PROTEAN® TGX Stain-Free Gel (Bio-Rad, Inc.) confirming expression of correct length proteins (FIG. 15A). Western blotting was then carried out on the samples using the pooled polyclonal rabbit antibodies, and correct sized bands were detected in each lane as well as for control native exosomes, confirming specific reactivity with polyclonal PTGFRN antibodies (FIG. 15B). To confirm this result, each of the biotinylated PTGFRN fragments was analyzed by BLI and the results are provided in FIG. 16. Incubation with the polyclonal antibody pools showed binding in all conditions, demonstrating broad reactivity with the antibodies for each of the IgV domain of PTGFRN.

4.6.5. Example 5: Removal of EVs by Anti-PTGFRN Antibody

Custom monoclonal antibodies against PTGFRN were generated from the immunized rabbits as described in Example 4. To determine whether exosomes could be isolated by pulling PTGFRN, $5 \times 10^{10}$ native or PTGFRN KO exosomes were added to either magnetic Protein A beads (catalog #10001D; Invitrogen) or Protein A beads functionalized with 10 μg of a custom anti-PTGFRN monoclonal antibody. Each exosome-bead mixture was incubated for 30 minutes at room temperature and washed three times with PBS+0.1% v/v TWEEN® 20. Washed beads were eluted by incubating in elution buffer (20 mM glycine pH 3.6, 2× Laemmli sample buffer (catalog #1610737, Bio-Rad, Inc.), 10% β-mercaptoethanol) at 95° C. for 10 minutes and the boiled supernatant was analyzed by PAGE and anti-PTG-FRN Western blotting using a different custom anti-PTG-FRN monoclonal antibody. Total protein analyzed by PAGE showed a band corresponding to the molecular weight of PTGFRN only in the native exosome condition in the presence of the anti-PTGFRN antibody (FIG. 17A). This band was verified as PTGFRN by western blotting (FIG. 17B). HC and LC correspond to the heavy chain and light chain, respectively, of the anti-PTGFRN antibody used for purification. These data demonstrate that PTGFRN-containing exosomes can be purified or removed from a solution by pulling PTGFRN on the exosome surface.

4.6.6. Example 6: Removal of EVs by Anti-PTGFRN Antibody and Macrophages

It is tested whether anti-PTGFRN antibody can induce clearance of EVs in vitro. EVs are stained with fluorescent dye, and then incubated with anti-PTGFRN antibody. Blood cells including macrophages are applied to the EVs incubated with anti-PTGFRN antibody and fluorescent images are collected. The amount of EVs that is incorporated into the macrophages is measured and analyzed by evaluating the fluorescence intensities of the images. Additionally, EVs in the cell culture media, not incorporated into the macrophages, are collected and their amounts are measured and analyzed.

Mechanisms of EV clearance are also studied by testing clearance of EVs in the presence of one or more inhibitors of macrophage activities, e.g., cytochalasin D, which inhibits both phagocytosis and macropinocytosis, and 5-(N-ethyl-N-isopropyl) amiloride (EIPA) which is a macropinocytosis inhibitor. Specifically, macrophages are incubated with an inhibitor prior to application to EVs.

The experimental results show that anti-PTGFRN antibody effectively reduces EVs by inducing internalization of EVs by macrophages. Binding agents to other EV proteins are similarly tested for their capabilities to induce clearance of EVs.

4.6.7. Example 7: Suppression of Metastasis by Administration of Anti-CD315 Antibody A mouse xenograft model of metastatic cancer is developed by implanting tumor cells mixed with 50% extracellular matrix (ECM) gel. At 3, 6, 9, 12, and 15 days after implantation, anti-CD315 antibody is injected intravenously. A day after each injection, blood samples are collected from each mouse and the concentration of EVs in the blood samples are measured. The results show that administration of anti-CD315 antibody reduces amounts of EVs expressing PTGFRN on the surface.

Tumor sizes are also evaluated using in vivo imaging of luciferase-expressing cancer cell bioluminescence by injecting luciferin intraperitoneally. After a month, the tumor tissues are resected from the mice and the estimated tumor volumes are calculated. Metastasis rates are also measured based on bioluminescence, and compared between groups with or without treatment with anti-PTGFRN antibody.

The study show that the numbers and sizes of metastatic foci are significantly reduced in animals treated with anti-PTGFRN antibody. The results suggest that anti-PTGFRN antibody reduces EVs and inhibit pro-metastatic effects of the EVs.

Similar experiments are performed with other binding agents to EV proteins to identify additional binding agents that are effective in inhibiting pro-metastatic effects of EVs.

4.6.8. Example 8: Ex Vivo Treatment of Cancer Metastasis Using Anti-PTGFRN Antibody A mouse xenograft model of metastatic cancer is developed by implanting tumor cells mixed with 50% extracellular matrix (ECM) gel. At 3, 6, 9, 12, and 15 days after implantation, blood samples are collected from each mouse and EVs containing PTGFRN are removed from the blood samples using immunoadsorption technologies. Specifically, the blood samples are reacted with anti-PTGFRN antibody and antigen-antibody complex is removed. After removal of EVs containing PTGFRN, the blood samples are reintroduced to each mouse.

After one, two, three, and four weeks after reinfusion, tumor sizes are evaluated using in vivo imaging of luciferase-expressing cancer cell bioluminescence by injecting luciferin intraperitoneally. The tumor tissues are resected from the mice and the estimated tumor volumes are calculated. Metastasis rates are also measured based on bioluminescence, and compared between groups with or without treatment with the ex vivo treatment using anti-PTGFRN antibody.

The study show that the numbers and sizes of metastatic foci are significantly reduced in animals treated with anti-PTGFRN antibody. The results suggest that anti-PTGFRN antibody inhibits pro-metastatic effects of the EVs.

Similar experiments are performed with other binding agents to EV proteins to identify additional binding agents that are effective in inhibiting pro-metastatic effects of EVs.

5. INCORPORATION BY REFERENCE

All publications, patents, patent applications and other documents cited in this application are hereby incorporated by reference in their entireties for all purposes to the same extent as if each individual publication, patent, patent application or other document were individually indicated to be incorporated by reference for all purposes.

6. EQUIVALENTS

The present disclosure provides, inter alia, compositions of cannabinoid and entourage compositions. The present disclosure also provides method of treating neurodegenerative diseases by administering the cannabinoid and entourage compositions. While various specific embodiments have been illustrated and described, the above specification is not restrictive. It will be appreciated that various changes can be made without departing from the spirit and scope of the disclosure. Many variations will become apparent to those skilled in the art upon review of this specification.

What is claimed is:

1. A method of treating cancer metastasis comprising:
   a. collecting blood from a subject with cancer;
   b. treating the blood ex vivo with an effective amount of a binding agent that specifically binds to extracellular vesicles (EVs) expressing an EV protein, wherein the EV protein is prostaglandin F2 receptor negative regulator (PTGFRN);
   c. removing the EVs expressing the EV protein to reduce a concentration of the EVs expressing the EV protein in the blood;
   d. measuring the concentration of the EVs expressing the EV protein in the blood; and
   e. reinfusing the blood to the subject.

2. The method of claim 1, wherein the concentration of the EVs expressing the EV protein in the blood is reduced by at least 10%.

3. The method of claim 1, wherein the subject has metastatic cancer.

4. The method of claim 3, further comprising measuring metastasis rates of the cancer in the subject.

5. The method of claim 1, wherein the EV protein is expressed on EVs released from cancer cells of the subject.

6. The method of claim 1, wherein the binding agent binds to the EV protein with a KD of less than 50 nM.

7. The method of claim 1, wherein the binding agent comprises an antigen binding protein (ABP).

8. The method of claim 7, wherein the binding agent comprises an antibody, antibody fragment, scFab, or scFv.

9. The method of claim 8, wherein the binding agent is a divalent or a multivalent antibody or antibody fragment.

10. The method of claim 8, wherein the binding agent is a human, humanized, or chimeric antibody or antibody fragment.

11. The method of claim 1, further comprising administering to the subject a second binding agent that specifically binds to a second EV protein, wherein the second EV protein is selected from the group consisting of: prostaglandin F2 receptor negative regulator (PTGFRN); basigin (BSG); immunoglobulin superfamily member 2 (IGSF2); immunoglobulin superfamily member 3 (IGSF3); immunoglobulin superfamily member 8 (IGSF8); integrin beta-I (ITGB I); integrin alpha-4 (ITGA4); 4F2 cell-surface antigen heavy chain (SLC3A2); and ATP transporter protein.

12. The method of claim 11, wherein the administration of the second binding agent is performed concurrently with the administration of the binding agent.

13. The method of claim 11, wherein the administration of the second binding agent is performed separately from the administration of the binding agent.

14. The method of claim 11, wherein the binding agent and the second binding agent are different.

15. The method of claim 1, further comprising evaluating tumor size in the subject.

16. The method claim 1, wherein the blood and the binding agent are incubated for at least 10 minutes.

17. The method claim 1, wherein the EVs expressing the EV protein in the blood are removed using immunoadsorption technologies.

* * * * *